United States Patent [19]
Vondran, Jr.

[11] Patent Number: 6,040,926
[45] Date of Patent: *Mar. 21, 2000

[54] COMMON NON-SYMMETRIC PRUNED RADIAL AND NON-SYMMETRIC PRUNED TETRAHEDRAL INTERPOLATION HARDWARE IMPLEMENTATION

[75] Inventor: Gary L. Vondran, Jr., Winchester, Mass.

[73] Assignee: Hewlett-Packard Company, Palo Alto, Calif.

[*] Notice: This patent is subject to a terminal disclaimer.

[21] Appl. No.: 08/989,998

[22] Filed: Dec. 12, 1997

[51] Int. Cl.[7] .............................. G03F 3/08; H04N 1/46; B41B 15/00
[52] U.S. Cl. ........................... 358/525; 358/518; 395/109
[58] Field of Search ..................... 358/518, 525, 358/428; 395/101, 106, 109; 382/162, 167; 364/723; 348/390

[56] References Cited

U.S. PATENT DOCUMENTS

| | | | |
|---|---|---|---|
| 3,893,166 | 7/1975 | Pugsley | 358/80 |
| 4,275,413 | 6/1981 | Sakamoto et al. | 358/80 |
| 4,477,833 | 10/1984 | Clark et al. | 358/80 |

(List continued on next page.)

FOREIGN PATENT DOCUMENTS

| | | | |
|---|---|---|---|
| 0366309A2 | 5/1990 | European Pat. Off. | H04N 1/46 |
| 0517095A1 | 12/1992 | European Pat. Off. | H04N 5/14 |
| 0601241A1 | 6/1994 | European Pat. Off. | H04N 1/46 |

(List continued on next page.)

OTHER PUBLICATIONS

European Search Report.
UK Search Report.
Patent Application, Title: Method For Multi–Variable, Digital Data Storage And Interpolation; USSN: 08/339,241; Filed: Jul. 20, 1995; Inventor: Jay Godnek.

Kasson et al; Performing Color Space Conversions With Three–Dimensional Linear Interpolation; Jul. 1995.

(List continued on next page.)

*Primary Examiner*—Kimberly A. Williams
*Attorney, Agent, or Firm*—Gregg W. Wisdom

[57] ABSTRACT

New interpolation techniques allow improved efficiency and speed in performing color space conversions. A radial interpolation technique accomplishes an interpolation by generating successive sub-cubes. A value of a vertex of the final sub-cube generated is used as the result of the interpolation. Subcubes are generated by averaging a selected vertex value with the vertex values of each of the remaining vertices. A pruned radial interpolation technique employs a subset of the vertex values of the initially selected cube to generate the result of the interpolation, thereby improving upon the efficiency of the radial interpolation. A tetrahedral interpolation technique accomplishes an interpolation by generating successive subcubes. A value of a vertex of the final sub-cube generated is used as the result of the interpolation. Subcubes are generated by applying a mathematical relationship which allows computation of sub-cube vertex values through a series of logical AND, logical OR and averaging operations. A pruned tetrahedral interpolation technique employs a subset of the vertex values of the initially selected cube to generate the result of the interpolation, thereby improving upon the efficiency of the tetrahedral interpolation. A common hardware implementation of pruned radial interpolation and pruned tetrahedral interpolation uses the common hardware structure of the two techniques with multiplexing of the input vertex values to allow performance of either a pruned radial interpolation or a pruned tetrahedral interpolation. Non-symmetric pruned radial and Non-symmetric pruned tetrahedral interpolation permit interpolation using interpolation data values distributed throughout the color space with a resolution that varies according to characteristics of the color space. Multiplexing of the interpolation data values to the non-symmetric pruned radial interpolation hardware and to the non-symmetric pruned tetrahedral interpolation hardware allows for a common hardware implementation.

18 Claims, 67 Drawing Sheets

U.S. PATENT DOCUMENTS

| | | | |
|---|---|---|---|
| 4,511,989 | 4/1985 | Sakamoto | 364/723 |
| 5,121,196 | 6/1992 | Hung | 358/75 |
| 5,208,872 | 5/1993 | Fisher | 382/42 |
| 5,313,314 | 5/1994 | Ikegami | 358/518 |
| 5,337,166 | 8/1994 | Ikegami | 358/518 |
| 5,345,541 | 9/1994 | Kelley et al. | 345/427 |
| 5,390,035 | 2/1995 | Kasson et al. | 358/518 |
| 5,504,821 | 4/1996 | Kanamori et al. | 382/167 |
| 5,583,666 | 12/1996 | Ellson et al. | 358/518 |
| 5,684,981 | 11/1997 | Jones | 395/516 |

FOREIGN PATENT DOCUMENTS

| | | | |
|---|---|---|---|
| 2104337 | 3/1983 | United Kingdom | H04N 1/46 |
| WO92/01260 | 1/1992 | WIPO . | |
| WO 96/39774 | 12/1996 | WIPO | H04N 1/60 |

OTHER PUBLICATIONS

Stone et al; Color Gamut Mapping And The Printing Of Digital Color Images; Oct. 1988.

Kanamori et al; A Novel Color Transformation Algorithm And Its Applications; 1990.

Hung; Color Rendition Using Three–Dimensional Interpolation; 1988.

Hung; Colorimetric Calibration In Electronic Imaging Devices Using A Look–Up Table Model And Interpolations; Jan. 1993.

Brooktree Corporation; RGB to CMYK Color Space Conversion Considerations; Apr. 1990.

Paeth; Algorithms For Fast Color Correction; 1989.

Kanamori et al; Fast Color Processor With Programmable Interpolation By Small Memory (PRISM); Jul. 1993.

Gennetten; RGB to CMYK Conversion Using 3–D Barycentric Interpolation; Jun. 1993.

Ikegami; New Direct Color Mapping Method For Reducing The Storage Capacity Of Look–Up Table Memory; 1989.

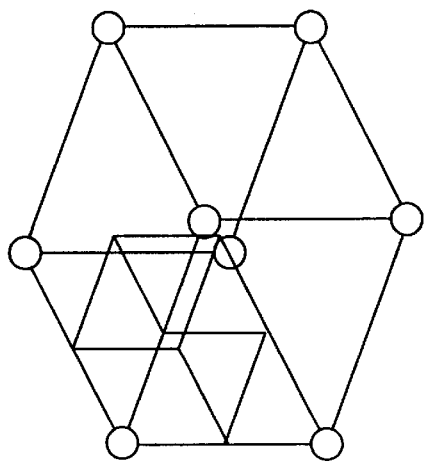
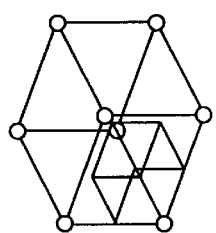
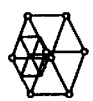
FIG.6A FIG.6B FIG.6C FIG.6D FIG.6E

FIG.23E
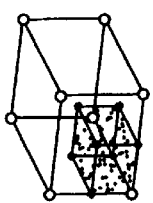
FIG.23D
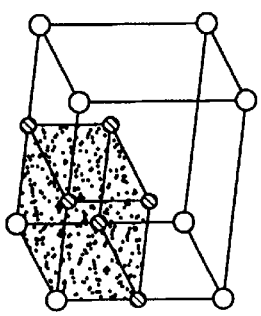
FIG.23C
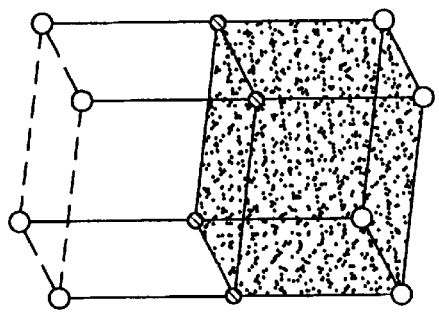
FIG.23B
FIG.23A

```
#define C_INC          1
#define B_INC          C_INC*17
#define A_INC          B_INC*17
#define TABLE_INC      A_INC*17
/******************************************************************/
/** radial_interpolation()                                       **/
/******************************************************************/
void radial_interpolation(unsigned char input[],
unsigned char table[][TABLE_INC], unsigned char output[])
{
    register int        origin, v0, v1, v2, v3 ;
    register int        a, b, c ;
    register int        x, y, z ;
    /******************************************************************/
    /* Snap max value to last table value */
    /******************************************************************/
    a = ( input[0] == 0x0ff ) ? 0x100 : (int) input[0] ;
    b = ( input[1] == 0x0ff ) ? 0x100 : (int) input[1] ;
    c = ( input[2] == 0x0ff ) ? 0x100 : (int) input[2] ;
    /******************************************************************/
    /* Compute indexes into table                                     */
    /******************************************************************/
    origin = A_INC*(a >> 4)
           + B_INC*(b >> 4)
           +       (c >> 4) ;
    v0 = origin + A_INC*( (a & 0x01)      )
               + B_INC*( (b & 0x01)      )
               +       ( (c & 0x01)      ) ;
    v1 = origin + A_INC*( (a & 0x02) >> 1 )
               + B_INC*( (b & 0x02) >> 1 )
               +       ( (c & 0x02) >> 1 ) ;
    v2 = origin + A_INC*( (a & 0x04) >> 2 )
               + B_INC*( (b & 0x04) >> 2 )
               +       ( (c & 0x04) >> 2 ) ;
    v3 = origin + A_INC*( (a & 0x08) >> 3 )
               + B_INC*( (b & 0x08) >> 3 )
               +       ( (c & 0x08) >> 3 ) ;
    /******************************************************************/
    /* Compute x */
    /******************************************************************/
    x = ( ( (int) table[0][origin]
          + (int) table[0][v0]
          + (int) table[0][v1] << 1 )
          + (int) table[0][v2] << 2 )
          + (int) table[0][v3] << 3 )
          + 0x08 ) >> 4 ) ;        /* Round */
    /******************************************************************/
    /* Compute y */
    /******************************************************************/
    y = ( ( (int) table[1][origin]
          + (int) table[1][v0]
          + (int) table[1][v1] << 1 )
          + (int) table[1][v2] << 2 )
          + (int) table[1][v3] << 3 )
          + 0x08 ) >> 4 ) ;        /* Round */
    /******************************************************************/
    /* Compute z */
    /******************************************************************/
    z = ( ( (int) table[2][origin]
          + (int) table[2][v0]
          + (int) table[2][v1] << 1 )
          + (int) table[2][v2] << 2 )
          + (int) table[2][v3] << 3 )
          + 0x08 ) >> 4 ) ;        /* Round */ output[0] = (char) x ;
    output[1] = (char) y ;
    output[2] = (char) z ;
}
```

FIG.38

```vhdl
-- ---------------------------------------
-- Radial Interpolation.                --
-- ---------------------------------------
entity radial is
port (
    -- Input Pixel (a,b,c)                      --
    input:    in  INPUT_ARRAY ;
    -- Vertex Points of Cube from Color Table --
    point:    in  POINT_ARRAY ;
    -- Output Pixel (x,y,z)                    --
    output:   out OUTPUT_ARRAY
);
end radial ;
-- ---------------------------------------
architecture radialrtl of radial is
    signal vertex:      VERTEX_ARRAY ;
    signal point_value: POINT_VALUE_ARRAY ;
begin
-- ---------------------------------------------------
-- Compute selected vertices from slices across input. --
-- ---------------------------------------------------
VERTICIES: process ( input )
begin
    -- For each slice across the input lower bits --
    for i in NUM_INTERP_BITS-1 downto 0 loop
        vertex(i) <= input(0)(i) & input(1)(i)
                                 & input(2)(i);
    end loop ;
end process ;

-- ---------------------------------------------------
-- Select the values of vertices to be used by      --
-- interpolation. The last two vertices are         --
-- always point(0) and the rounding constant.       --
-- ---------------------------------------------------
MUX: process ( vertex, point )
begin
    -- For each output dimension --
    for d in 0 to NUM_OUTPUT_DIMEN-1 loop
        -- Initialize --
        point_value(d) <= (others => (others => '0'));
        -- point_value( 0 : NUM_INTERP_BITS-1 ) --
        for i in 0 to NUM_INTERP_BITS-1 loop
            case vertex(i) is
                when "000" => point_value(d)(i)(7+i downto i)
                                <= point(d)(0) ;
                when "001" => point_value(d)(i)(7+i downto i)
                                <= point(d)(1) ;
                when "010" => point_value(d)(i)(7+i downto i)
                                <= point(d)(2) ;
                when "011" => point_value(d)(i)(7+i downto i)
                                <= point(d)(3) ;
                when "100" => point_value(d)(i)(7+i downto i)
                                <= point(d)(4) ;
                when "101" => point_value(d)(i)(7+i downto i)
                                <= point(d)(5) ;
                when "110" => point_value(d)(i)(7+i downto i)
                                <= point(d)(6) ;
                when others => point_value(d)(i)(7+i downto i)
                                <= point(d)(7) ;
            end case ;
```

FIG.39A

```
-- point(d)(0) --
point_value(d)(NUM_INTERP_BITS)(7 downto 0)
                              <= point(d)(0) ;
-- Rounding constant --
point_value(d)(NUM_INTERP_BITS+1)
             (NUM_INTERP_BITS-1) <= '1' ;
    end loop ;
  end loop ;
end process ;

-- SUM adds the selected vertices values and trun- --
-- cates to eight bits. The process is implemented --
-- to minimize time by successive pairing and      --
-- adding.                                         --
SUM: process ( point_value )
    variable temp:   POINT_VALUES ;
    variable bound:  INTEGER ;
begin
  -- For each output dimension --
  for d in 0 to NUM_OUTPUT_DIMEN-1 loop
    -- Initialize temp and bound. --
    temp := point_value(d) ;
    bound := NUM_INTERP_BITS + 2 ;
    -- Loop for ceil(log2(NUM_INTERP_BITS-1)). --
    for i in 0 to NUM_INTERP_BITS-1 loop
      -- Pair temp array elements and add. --
      for j in 0 to (NUM_INTERP_BITS/2) loop
        -- Step 1: Move temp(even's) --
        if ( 2*j < bound ) then
          temp(j) := temp(2*j) ;
        else
          temp(j) := (others => '0') ;
        end if ;
        -- Step 2: Add temp(odd's) --
        if ( (2*j)+1 < bound ) then
          temp(j) := temp(j)
                   + temp((2*j)+1);
        else
          temp(j) := temp(j) ;
        end if ;
      end loop ;
      -- Set bound for next iteration --
      bound := ( bound / 2 ) + ( bound mod 2 ) ;
    end loop ;
    -- Truncate output. --
    output(d) <= temp(0)(7+NUM_INTERP_BITS
                         downto NUM_INTERP_BITS) ;
  end loop ;
end process ;

end radialrtl;
```

```c
#define C_INC     1
#define B_INC     C_INC*17
#define A_INC     B_INC*17
#define TABLE_INC A_INC*17

/***********************************************************/
/** pruned tetrahedral interpolation()                    **/
/***********************************************************/
void pruned_tetrahedral_interpolation(
    unsigned char input[], unsigned char table[][TABLE_INC],
    unsigned char output[] )
{
register int   a, b, c, x, y, z ;
register char  v0, v1, v2, v3 ;
register char  v1_and_v0, v2_and_v0, v3_and_v0 ;
register char  v1_or_v0,  v2_or_v1,  v3_or_v2 ;
register char  v2_and_v1_and_v0, v3_or_v2_or_v1_or_v0 ;
register char  v2_and_v1_or_v0,  v3_and_v2_or_v1_or_v0 ;
register char  v2_or_v1_and_v0,  v3_or_v2_and_v1_or_v0 ;
register char  v3_and_v2_and_v1_and_v0 ;
register char  v3_and_v2_and_v1_or_v0 ;
register char  v3_and_v2_or_v1_and_v0 ;
register char  v3_and_v2_or_v1_or_v0 ;
register char  v3_or_v2_and_v1_and_v0 ;
register char  v3_or_v2_and_v1_or_v0 ;
register char  v3_or_v2_or_v1_and_v0 ;
register int   index0,  index1,  index2,  index3 ;
register int   index4,  index5,  index6,  index7 ;
register int   index8,  index9,  index10, index11 ;
register int   index12, index13, index14, index15 ;

/***********************************************************/
/* Snap last value to last table value */
/***********************************************************/
a = ( input[0] == 0xOff ) ? 0x100 : (int) input[0] ;
b = ( input[1] == 0xOff ) ? 0x100 : (int) input[1] ;
c = ( input[2] == 0xOff ) ? 0x100 : (int) input[2] ;

/***********************************************************/
/* Compute slices across the input components */
/***********************************************************/
v0  = (  (a & 0x01) << 2 )
    + (  (b & 0x01) << 1 )
    + (  (c & 0x01)      ) ;
v1  = (  (a & 0x02) << 1 )
    + (  (b & 0x02)      )
    + ( ((c & 0x02) >> 1 ) ;
```

```c
v2  = (  (a & 0x04)       )
    + (  (b & 0x04) >> 1 )
    + (  (c & 0x04) >> 2 ) ;
v3  = (  (a & 0x08) >> 1 )
    + (  (b & 0x08) >> 2 )
    + (  (c & 0x08) >> 3 ) ;

/***********************************************************/
/* Compute offset from origin. */
/***********************************************************/
v1_and_v0              = v1 & v0 ;
v1_or_v0               = v1 | v0 ;
v2_and_v1              = v2 & v1 ;
v2_and_v1_and_v0       = v2 & v1_and_v0 ;
v2_and_v1_or_v0        = v2 & v1_or_v0 ;
v2_or_v1               = v2 | v1 ;
v2_or_v1_and_v0        = v2 | v1_and_v0 ;
v2_or_v1_or_v0         = v2 | v1_or_v0 ;
v3_and_v2              = v3 & v2 ;
v3_and_v2_and_v1       = v3 & v2_and_v1 ;
v3_and_v2_and_v1_and_v0 = v3 & v2_and_v1_and_v0 ;
v3_and_v2_and_v1_or_v0 = v3 & v2_and_v1_or_v0 ;
v3_and_v2_or_v1        = v3 & v2_or_v1 ;
v3_and_v2_or_v1_and_v0 = v3 & v2_or_v1_and_v0 ;
v3_and_v2_or_v1_or_v0  = v3 & v2_or_v1_or_v0 ;
v3_or_v2               = v3 | v2 ;
v3_or_v2_and_v1        = v3 | v2_and_v1 ;
v3_or_v2_and_v1_and_v0 = v3 | v2_and_v1_and_v0 ;
v3_or_v2_and_v1_or_v0  = v3 | v2_and_v1_or_v0 ;
v3_or_v2_or_v1         = v3 | v2_or_v1 ;
v3_or_v2_or_v1_and_v0  = v3 | v2_or_v1_and_v0 ;
v3_or_v2_or_v1_or_v0   = v3 | v2_or_v1_or_v0 ;

/***********************************************************/
/* Generate indices into table */
/***********************************************************/
index0 = ( (a >> 4) * A_INC )
       + ( (b >> 4) * B_INC ) + (c >> 4) ;
index1 = index0
       + A_INC*((v3 & 0x0004) >> 2)
       + B_INC*((v3 & 0x0002) >> 1)
       +       ((v3 & 0x0001)     ) ;
index2 = index0
       + A_INC*((v3_and_v2 & 0x0004) >> 2)
       + B_INC*((v3_and_v2 & 0x0002) >> 1)
```

```
       + A_INC*((v3_and_v2 & 0x0001)) ;
index3 = index0
       + A_INC*((v3_and_v2_and_v1 & 0x0004) >> 2)
       + B_INC*((v3_and_v2_and_v1 & 0x0002) >> 1)
       +       ((v3_and_v2_and_v1 & 0x0001)) ;
index4 = index0
       + A_INC*((v3_and_v2_and_v1_and_v0 & 0x0004) >> 2)
       + B_INC*((v3_and_v2_and_v1_and_v0 & 0x0002) >> 1)
       +       ((v3_and_v2_and_v1_and_v0 & 0x0001)) ;
index5 = index0
       + A_INC*((v3_and_v2_and_v1_or_v0 & 0x0004) >> 2)
       + B_INC*((v3_and_v2_and_v1_or_v0 & 0x0002) >> 1)
       +       ((v3_and_v2_and_v1_or_v0 & 0x0001)) ;
index6 = index0
       + A_INC*((v3_and_v2_and_v1 & 0x0004) >> 2)
       + B_INC*((v3_and_v2_and_v1 & 0x0002) >> 1)
       +       ((v3_and_v2_and_v1 & 0x0001)) ;
index7 = index0
       + A_INC*((v3_and_v2_or_v1 & 0x0004) >> 2)
       + B_INC*((v3_and_v2_or_v1 & 0x0002) >> 1)
       +       ((v3_and_v2_or_v1 & 0x0001)) ;
index8 = index0
       + A_INC*((v3_and_v2_or_v1_and_v0 & 0x0004) >> 2)
       + B_INC*((v3_and_v2_or_v1_and_v0 & 0x0002) >> 1)
       +       ((v3_and_v2_or_v1_and_v0 & 0x0001)) ;
index9 = index0
       + A_INC*((v3_or_v2 & 0x0004) >> 2)
       + B_INC*((v3_or_v2 & 0x0002) >> 1)
       +       ((v3_or_v2 & 0x0001)) ;
index10 = index0
       + A_INC*((v3_or_v2_and_v1 & 0x0004) >> 2)
       + B_INC*((v3_or_v2_and_v1 & 0x0002) >> 1)
       +       ((v3_or_v2_and_v1 & 0x0001)) ;
index11 = index0
       + A_INC*((v3_or_v2_and_v1_and_v0 & 0x0004) >> 2)
       + B_INC*((v3_or_v2_and_v1_and_v0 & 0x0002) >> 1)
       +       ((v3_or_v2_and_v1_and_v0 & 0x0001)) ;
index12 = index0
       + A_INC*((v3_or_v2_and_v1 & 0x0004) >> 2)
       + B_INC*((v3_or_v2_and_v1 & 0x0002) >> 1)
       +       ((v3_or_v2_and_v1 & 0x0001)) ;
index13 = index0
       + A_INC*((v3_or_v2_or_v1 & 0x0004) >> 2)
       + B_INC*((v3_or_v2_or_v1 & 0x0002) >> 1)
       +       ((v3_or_v2_or_v1 & 0x0001)) ;
index14 = index0
       + A_INC*((v3_or_v2_or_v1_and_v0 & 0x0004) >> 2)
       + B_INC*((v3_or_v2_or_v1_and_v0 & 0x0002) >> 1)
       +       ((v3_or_v2_or_v1_and_v0 & 0x0001)) ;
index15 = index0
       + A_INC*((v3_or_v2_or_v1_or_v0 & 0x0004) >> 2)
       + B_INC*((v3_or_v2_or_v1_or_v0 & 0x0002) >> 1)
       +       ((v3_or_v2_or_v1_or_v0 & 0x0001)) ;
/****************/
/* Compute x */
/****************/
x = ( ( table[0][index0]  + table[0][index1]
      + table[0][index2]  + table[0][index3]
      + table[0][index4]  + table[0][index5]
      + table[0][index6]  + table[0][index7]
      + table[0][index8]  + table[0][index9]
      + table[0][index10] + table[0][index11]
      + table[0][index12] + table[0][index13]
      + table[0][index14] + table[0][index15]
      + 0x08 ) >> 4 );   /*Round*/
/****************/
/* Compute y */
/****************/
y = ( ( table[1][index0]  + table[1][index1]
      + table[1][index2]  + table[1][index3]
      + table[1][index4]  + table[1][index5]
      + table[1][index6]  + table[1][index7]
      + table[1][index8]  + table[1][index9]
      + table[1][index10] + table[1][index11]
      + table[1][index12] + table[1][index13]
      + table[1][index14] + table[1][index15]
      + 0x08 ) >> 4 );   /*Round*/
/****************/
/* Compute z */
/****************/
z = ( ( table[2][index0]  + table[2][index1]
      + table[2][index2]  + table[2][index3]
```

FIG.40B

```
            + table[2][index4]  + table[2][index5]
            + table[2][index6]  + table[2][index7]
            + table[2][index8]  + table[2][index9]
            + table[2][index10] + table[2][index11]
            + table[2][index12] + table[2][index13]
            + table[2][index14] + table[2][index15]
            + 0x08 ) >> 4 ) ;                        /*Round*/
    /*************************************/
    * Write back results */
    /*************************************/
    output[0] = (char) x ;
    output[1] = (char) y ;
    output[2] = (char) z ;
}
```

FIG.40C

```c
#define f(v, m, N)  ( v | ( N & ~m ) )
/***********************************************************/
/** nonsym_radial_interpolation()                         **/
/***********************************************************/
void nonsym_radial_interpolation( unsigned char input[],
    unsigned char point[][8], unsigned char resolution[] )
    unsigned char output[] )
{
    register unsigned char Amask, Bmask, Cmask ;
    register          int  a, b, c, x, y, z ;
    register unsigned char m0, m1, m2, m3 ;
    register unsigned char v0, v1, v2, v3 ;
    register unsigned char f_v1_v0, f_v2_v1 ;
    register unsigned char f_v2_f_v1_v0, f_v3_v2, f_v3_f_v2_v1 ;
    register unsigned char f_v3_f_v2_v1_v0, f_v3_v1, f_v3_v0 ;
    register unsigned char f_v3_f_v2_v0, f_v3_f_v2_f_v1_v0, f_v3_v1 ;
    resister unsigned char f_v3_f_v1_v0, f_v3_f_v1_v0, f_v3_v0 ;
    /***********************************************/
    /* Generate Masks */
    /***********************************************/
    Amask = ( 1 << resolution[0] ) - 1 ;
    Bmask = ( 1 << resolution[1] ) - 1 ;
    Cmask = ( 1 << resolution[2] ) - 1 ;
    /***********************************************/
    /* Snap last value to last table value */
    /***********************************************/
    a = ( input[0] == 0xOff ) ? 0x100 : (int) input[0] ;
    b = ( input[1] == 0xOff ) ? 0x100 : (int) input[1] ;
    c = ( input[2] == 0xOff ) ? 0x100 : (int) input[2] ;
    /***********************************************/
    /* Compute slices across masks and input components */
    /***********************************************/
    m0 = ( (Amask & 0x01) << 2 )
       + ( (Bmask & 0x01) << 1 )
       + ( (Amask & 0x02) << 1 )
       + ( (Bmask & 0x02) )
       + ( (Amask & 0x04) )
       + ( (Bmask & 0x04) >> 1 ) + (Cmask & 0x01) ;
    m2 = ( (Amask & 0x04)
       + ( (Bmask & 0x04) >> 1 ) + ( (Cmask & 0x02) >> 1 ) ;
    m3 = ( (Amask & 0x08) >> 1 )
       + ( (Bmask & 0x08) >> 2 ) + ( (Cmask & 0x08) >> 3 ) ;

v0 = m0 & ( ( (a & 0x01) << 2 ) + ( (b & 0x01) << 1 ) + ( (c & 0x01) ) ) ;
       + ( (b & 0x01) << 1 ) +        ( (c & 0x01) ) ) ;
    v1 = m1 & ( ( (a & 0x02) << 1 ) + ( (c & 0x02) >> 1 ) ) ;
       +       ( (a & 0x02) ) +
       + (     (b & 0x02) ) +         ( (c & 0x02) >> 1 ) ) ;
    v2 = m2 & (   (a & 0x04)
       + (       (b & 0x04) >> 1 ) + ( (c & 0x04) >> 2 ) ) ;
    v3 = m3 & ( ( (a & 0x08) >> 1 )
       + (       (b & 0x08) >> 2 ) + ( (c & 0x08) >> 3 ) ) ;
    /* Compute offset from origin. */
    /***********************************************/
    f_v1_v0             = f(v1,m1,v0) ;
    f_v2_v1             = f(v2,m2,v1) ;
    f_v2_f_v1_v0        = f(v2,m2,f_v1_v0) ;
    f_v3_v2             = f(v3,m3,v2) ;
    f_v3_f_v2_v1        = f(v3,m3,f_v2_v1) ;
    f_v3_f_v2_f_v1_v0   = f(v3,m3,f_v2_f_v1_v0) ;
    f_v3_v1             = f(v3,m3,v1) ;
    f_v3_f_v1_v0        = f(v3,m3,f_v1_v0) ;
    f_v3_v0             = f(v3,m3,v0) ;
    /***********************************************/
    /* Compute x */
    /***********************************************/
    x = ( ( point[0][f_v3_f_v2_f_v1_v0]
          + point[0][f_v3_f_v2_f_v1_v0]
          + point[0][f_v3_f_v2_v1_v0]
          + point[0][f_v3_f_v1_v0]
          + point[0][f_v3_f_v2_v0]
          + point[0][f_v3_v0]
          + point[0][v0]
          + point[0][f_v3_f_v2_v1]
          + point[0][f_v2_v1] ) ;
```

FIG. 41A

```
            + point[0][f_v3_v1]
            + point[0][v1]
            + point[0][f_v3_v2]
            + point[0][v2]
            + point[0][v3]
            + point[0][0]
            + 0x08 ) >> 4 ) ;
/*******************/
/* Compute y */
/*******************/
y = ( ( point[1][f_v3_f_v2_f_v1_v0]
            + point[1][f_v2_f_v1_v0]
            + point[1][f_v3_f_v1_v0]
            + point[1][f_v1_v0]
            + point[1][f_v3_f_v2_v0]
            + point[1][f_v2_v0]
            + point[1][f_v3_v0]
            + point[1][v0]
            + point[1][f_v3_f_v2_v1]
            + point[1][f_v2_v1]
            + point[1][f_v3_v1]
            + point[1][v1]
            + point[1][f_v3_v2]
            + point[1][v2]
            + point[1][v3]
            + point[1][0]
            + 0x08 ) >> 4 ) ;    /*Round*/
/*******************/
/* Compute z */
/*******************/
z = ( ( point[2][f_v3_f_v2_f_v1_v0]
            + point[2][f_v2_f_v1_v0]
            + point[2][f_v3_f_v1_v0]
            + point[2][f_v1_v0]
            + point[2][f_v3_f_v2_v0]
            + point[2][f_v2_v0]
            + point[2][f_v3_v0]
            + point[2][v0]
            + point[2][f_v3_f_v2_v1]
            + point[2][f_v2_v1]
            + point[2][f_v3_v1]
            + point[2][v1]
            + point[2][f_v3_v2]
            + point[2][v2]
            + point[2][v3]
            + point[2][0]
            + 0x08 ) >> 4 ) ;    /*Round*/
/*******************************/
/* Write back results */
/*******************************/
output[0] = (char) x ;
output[1] = (char) y ;
output[2] = (char) z ;
}
```

FIG.41B

```
-- ----------------------------------------------
-- Pruned Tetrahedral Interpolation              --
-- ----------------------------------------------
entity pruned_tetrahedral is
port (  -- Interpolation Select --
        tetra_not_radial: in STD_LOGIC ;
        -- Input Pixel --
    input:                                                                        -- Vertex Points of Cube from Color Table --
        point:        in POINT_ARRAY ;
        -- Output Pixel --
        output:       out OUTPUT_ARRAY
     ) ;
end pruned_tetrahedral ;
-- ----------------------------------------------
architecture pruned_tetrtl of pruned_tetrahedral is
-- ----------------------------------------------
constant VERTEX_COUNT: INTEGER := 2**NUM_INTERP_BITS;
signal    vertice:         VERTEX_ARRAY ;
signal    point_value:     POINT_VALUE_ARRAY ;
begin
-- ----------------------------------------------
-- Compute vertices.                             --
-- ----------------------------------------------
VERTICIES: process ( tetra_not_radial, input )
    variable vertex:   STD_LOGIC_VECTOR(2 downto 0) ;
    variable templ, temp2:    VERTEX_ARRAY ;
    variable limit, prev_limit: INTEGER ;
begin
    -- Initialize Array --
    limit := 0 ;
    temp2 := ( others => "000" ) ;
    -- For each slice across the interpolate bits --
    for i in 0 to NUM_INTERP_BITS-1 loop
        -- Load slice into limit location --
```

```
        vertex := input(0)(i) & input(1)(i)
                                & input(2)(i) ;
        -- Select Radial or Tetrahedral --
        if ( tetra_not_radial = '0' ) then
            -- ----------
            -- Radial --
            -- ----------
            -- limit is 1, 2, 4, 8 --
            prev_limit := limit ;
            limit := 2**i ;
            -- Assign multiplex selects --
            for j in (VERTEX_COUNT/2)-1 downto 0
            loop
                if ( j < limit ) then
                    temp2(prev_limit + j) := vertex ;
                else
                    temp2 := temp2 ;
                end if ;
            end loop ;
        else
            -- ----------------
            -- Tetrahedral --
            -- ----------------
            -- limit is 0, 2, 6, 14, 30, ... --
            limit := ( 2**(i+1) ) - 2 ;
            -- load slice into limit location --
```

FIG.42A

```
                                                    when "110"  => point_value(d)(i)(7 downto 0)
                                                                                <= point(d)(5) ;
                                                    when others => point_value(d)(i)(7 downto 0)
                                                                                <= point(d)(6) ;
                                                                                <= point(d)(7) ;
                                                    end case ;
                                                end loop ;
                                                point_value(d)(VERTEX_COUNT-1)
                                                                    (7 downto 0) <= point(d)(0) ;
                                                point_value(d)(VERTEX_COUNT)
                                                                    (NUM_INTERP_BITS-1) <= '1' ;
                                            end loop ;
                                        end process ;

-- SUM adds the selected vertices values, and
                                        -- truncates to eight bits. The process is
                                        -- implemented to minimize prop delay by
                                        -- successive pairing and adding.

SUM: process ( point_value )
                                            variable temp: POINT_VALUES ;
                                            variable bound: INTEGER ;
                                        begin
                                            for d in 0 to NUM_OUTPUT_DIMEN-1 loop
                                                temp := point_value(d) ;
                                                bound := VERTEX_COUNT+1 ;
                                                for i in 0 to NUM_INTERP_BITS loop
                                                    for j in 0 to VERTEX_COUNT/2 loop
                                                        if ( 2*j < bound ) then
                                                            temp(j) := temp(2*j) ;
                                                        else
                                                            temp(j) := (others => '0') ;
                                                        end if ;
                                                        if ( (2*j)+1 < bound ) then
```

```
                    temp2(limit) := vertex ;
                    temp1 := temp2 ;
                    -- for all values in temp1 --
                    for j in (VERTEX_COUNT/2)-1 downto 0
                    loop
                        if ( j < limit/2 ) then
                            temp2(2*j) := temp1(limit)
                                        and temp1(j) ;
                            temp2((2*j)+1) := temp1(limit)
                                            or  temp1(j) ;
                        else
                            temp2 := temp2 ;
                        end if ;
                    end loop ;
                end if ;
            end loop ;
            -- Move into index array --
            vertice <= temp2 ;
        end process ;

-- Select the values of vertices to be used by the
        -- interpolation. The last two vertices are always
        -- point(0) and the rounding constant.
        MUX: process ( vertice, point )
        begin
            for d in 0 to NUM_OUTPUT_DIMEN-1 loop
                point_value(d) <= (others => (others => '0'));
                for i in 0 to VERTEX_COUNT-2 loop
                    case vertice(i) is
                        when "000" => point_value(d)(i)(7 downto 0)
                                                <= point(d)(0) ;
                        when "001" => point_value(d)(i)(7 downto 0)
                                                <= point(d)(1) ;
                        when "010" => point_value(d)(i)(7 downto 0)
                                                <= point(d)(2) ;
                        when "011" => point_value(d)(i)(7 downto 0)
                                                <= point(d)(3) ;
                        when "100" => point_value(d)(i)(7 downto 0)
                                                <= point(d)(4) ;
                        when "101" => point_value(d)(i)(7 downto 0)
                                                <= point(d)(0) ;
```

FIG. 42B

```
            temp(j) := temp(j) + temp((2*j)+1) ;
         else
            temp(j) := temp(j) ;
         end if ;
      end loop ;
      bound := ( bound / 2 ) + ( bound mod 2 ) ;
   end loop ;
   output(d) <= temp(0)(7+NUM_INTERP_BITS
                        downto NUM_INTERP_BITS) ;
end loop ;
end process ;
end pruned_tetrtl ;
```

FIG. 42C

```
-- Pruned Tetrahedral Interpolation                              --
-------------------------------------------------------------------
entity pruned_tetrahedral is
port (
    -- Input Pixel --
    input:      in     INPUT_ARRAY ;
    -- Vertex Points of Cube from Color Table --
    point:      in     POINT_ARRAY ;
    -- Output Pixel --
    output:     out    OUTPUT_ARRAY
) ;
end pruned_tetrahedral ;

architecture pruned_tetrt1 of pruned_tetrahedral is
constant VERTEX_COUNT: INTEGER := 2**NUM_INTERP_BITS;
signal    vertex:                VERTEX_ARRAY ;
signal    point_value: POINT_VALUE_ARRAY ;
begin
-- Compute vertices.
VERTICIES: process ( input )
    variable temp1, temp2:   VERTEX_ARRAY ;
    variable limit:          INTEGER ;
begin
    -- Initialize Array :-
    temp2 := ( others => "000" ) ;
    -- For each slice across the interpolate bits --
    for i in 0 to NUM_INTERP_BITS-1 loop
        -- limit is 0, 2, 6, 14, 30, .... --
        limit := ( 2**(i+1) ) - 2 ;
        -- Load slice into limit location --
        temp2(limit) := input(0)(i) & input(1)(i)
                                    & input(2)(i);
        temp1 := temp2 ;
        -- for all values in temp1 --
        for j in (VERTEX_COUNT/2)-1 downto 0 loop
            if ( j < limit/2 ) then
                temp2(2*j)      := temp1(limit) ;
                temp2((2*j)+1)  := temp1(limit)
                            and  templ(j) ;
                                or  templ(j)  ;
            else
                temp2 := temp2 ;
            end if ;
        end loop ;
    -- Move into index array --
    vertex <= temp2 ;
end process ;

-- Select the values of vertices to be used by the       --
-- interpolation.The last two vertices are always        --
-- point(0) and the rounding constant.                    --
MUX: process ( vertex, point )
begin
    -- For each output dimension --
    for d in 0 to NUM_OUTPUT_DIMEN-1 loop
        -- Initialize --
        point_value(d) <= (others => (others => '0' )) ;
```

FIG.43A

```
-- point_value(d)(0 : VERTEX_COUNT-2) --
for i in 0 to VERTEX_COUNT-2 loop
    case vertex(i) is
        when "000" => point_value(d)(i)(7downto 0)
                              <= point(d)(0);
        when "001" => point_value(d)(i)(7 downto 0)
                              <= point(d)(1);
        when "010" => point_value(d)(i)(7 downto 0)
                              <= point(d)(2);
        when "011" => point_value(d)(i)(7 downto 0)
                              <= point(d)(3);
        when "100" => point_value(d)(i)(7 downto 0)
                              <= point(d)(4);
        when "101" => point_value(d)(i)(7 downto 0)
                              <= point(d)(5);
        when "110" => point_value(d)(i)(7 downto 0)
                              <= point(d)(6);
        when others => point_value(d)(i)(7 downto 0)
                              <= point(d)(7);
    end case;
end loop;
-- point(d)(0) --
point_value(d)(VERTEX_COUNT-1)
        (7 downto 0) <= point(d)(0) ;
-- Rounding constant --
point_value(d)(VERTEX_COUNT)
        (NUM_INTERP_BITS-1) <= '1' ;

-- SUM adds the selected vertices values and
-- truncates to eight bits. The process is
-- implemented to minimize prop delay by
-- successive pairing and adding.
SUM: process ( point_value )
    variable temp:      POINT_VALUES ;
    variable bound:     INTEGER ;
begin
    -- For each output dimension --
    for d in 0 to NUM_OUTPUT_DIMEN-1 loop
        -- Initialize temp and bound. --
        temp := point_value(d) ;
        bound := VERTEX_COUNT + 1 ;
        -- Loop for ceil(log2(VERTEX_COUNT)) --
        for i in 0 to NUM_INTERP_BITS loop
            -- Pair temp array elements and add. --
            for j in 0 to VERTEX_COUNT/2 loop
                -- Step 1: Move temp(even's) --
                if ( 2*j < bound ) then
                    temp(j) := temp(2*j) ;
                else
                    temp(j) := (others => '0') ;
                end if ;
                -- Step 2: Add temp(odd's) --
                if ( (2*j)+1 < bound ) then
                    temp(j) := temp(j) + temp((2*j)+1) ;
                else
                    temp(j) := temp(j) ;
                end if ;
```

FIG.43B

```
    end loop ;

-- Set bound for next iteration -- bound := ( bound / 2 ) + ( bound mod 2 ) ;

end loop ;

-- Truncate output. -- output(d) <= temp(0)(7+NUM_INTERP_BITS
                       downto NUM_INTERP_BITS) ;

end loop ;
end process ;

end pruned_tetrt1 ;
```

```vhdl
-------------------------------------------
-- Non-Symmetric Radial Interpolation --
-------------------------------------------
entity nonsym_radial is
port (
    -- Input Pixel --
    input:      in  INPUT_ARRAY ;
    -- Vertex Points of Cube from Color Table --
    point:      in  POINT_ARRAY ;
    -- Lattice Resolution --
    resolution: in  RESOLUTION_ARRAY ;
    -- Output Pixel --
    output:     out OUTPUT_ARRAY
) ;
end nonsym_radial ;

architecture nonsym_radialrtl of nonsym_radial is
constant VERTEX_COUNT: INTEGER := 2**NUM_INTERP_BITS;
signal  mask:        MASK_ARRAY ;
signal  vertex:      VERTEX_ARRAY ;
signal  point_value: POINT_VALUE_ARRAY ;
begin
-------------------------------------------
-- Compute Lattice Resolution Masks --
-------------------------------------------
MASKS: process ( resolution )
    variable top:  INTEGER ;
begin
    -- For each Component --
    for i in 0 to 2 loop
        top := 0 ;
        -- Convert BIT_VECTOR to INTEGER --
        for j in 2 downto 0 loop
            if ( resolution(i)(j) = '1' ) then
                top := top + 2**j ;
            else
                top := top ;
            end if ;
        end loop ;
        -- Generate Mask --
        for j in NUM_INTERP_BITS-1 downto 0 loop
            if ( j < top ) then
                mask(j)(i) <= '1' ;
            else
                mask(j)(i) <= '0' ;
            end if ;
        end loop ;
    end loop ;
end process ;
-------------------------------------------
-- Compute vertices --
-------------------------------------------
VERTICIES: process ( input, mask )
    variable temp1, temp2: VERTEX_ARRAY ;
    variable limit:        INTEGER ;
begin
    -- Initialize Arrays --
    temp2 := ( others => "000" ) ;
    -- For each slice across the interpolate bits --
    for i in 0 to NUM_INTERP_BITS-1 loop
        -- limit is 0, 2, 6, 14, 30, ... --
        limit := ( 2**(i+1) ) - 2 ;
        -- Load slice into limit location --
```

```
          temp2(limit) := mask(i) and ( input(0)(i)
                       & input(1)(i) & input(2)(i) ) ;
          temp1 := temp2 ;
       -- for all values in temp1 --
          for j in (VERTEX_COUNT/2)-1 downto 0 loop
              if ( j < limit/2 ) then
                  -- P'[2*j] = P[j] --
                  temp2(2*j)      := temp1(j) ;
                  -- P'[2*j+1]=v[i]|(P[j] & ~m[i]).--
                  temp2((2*j)+1) := temp1(limit)
                                or ( temp1(j) and not mask[i] );
              else
                  temp2 := temp2 ;
              end if ;
          end loop ;
      -- Move into index array --
          vertex <= temp2 ;
  end process ;

-- Select the values of vertices to be used by the --
  -- interpolation. The last two vertices are always --
  -- point(0) and the rounding constant.             --
  MUX: process ( vertex, point )
  begin
      for d in 0 to NUM_OUTPUT_DIMEN-1 loop
          point_value(d) <= (others => (others => '0'));
          for i in 0 to VERTEX_COUNT-2 loop
              case vertex(i) is
                  when "000" => point_value(d)(i)(7 downto 0)
                                                                <= point(d)(0) ;
                  when "001" => point_value(d)(i)(7 downto 0) <= point(d)(1) ;
                  when "010" => point_value(d)(i)(7 downto 0) <= point(d)(2) ;
                  when "011" => point_value(d)(i)(7 downto 0) <= point(d)(3) ;
                  when "100" => point_value(d)(i)(7 downto 0) <= point(d)(4) ;
                  when "101" => point_value(d)(i)(7 downto 0) <= point(d)(5) ;
                  when "110" => point_value(d)(i)(7 downto 0) <= point(d)(6) ;
                  when others => point_value(d)(i)(7 downto 0) <= point(d)(7) ;
              end case ;
          end loop ;
          point_value(d)(VERTEX_COUNT-1)
                                 (7 downto 0) <= point(d)(0) ;
          point_value(d)(VERTEX_COUNT)
                                 (NUM_INTERP_BITS-1) <= '1' ;
      end loop ;
  end process ;

-- Select the values of vertices to be used by the --
  -- interpolation. The last two vertices are always --
  -- point(0) and the rounding constant.             --
  SUM: process ( point_value )
      variable temp:    POINT_VALUES ;
      variable bound:   INTEGER ;
  begin
      for d in 0 to NUM_OUTPUT_DIMEN-1 loop
          temp := point_value(d) ;
          bound := VERTEX_COUNT + 1 ;
          for i in 0 to NUM_INTERP_BITS loop
              for j in 0 to VERTEX_COUNT/2 loop
                  if ( 2*j < bound ) then
```

FIG.44B

```
            temp(j) := temp(2*j) ;
          else
            temp(j) := (others => '0') ;
          end if ;
          if ( (2*j)+1 < bound ) then
            temp(j) := temp(j) + temp((2*j)+1) ;
          else
            temp(j) := temp(j) ;
          end if ;
        end loop ;
        bound := ( bound / 2 ) + ( bound mod 2 ) ;
      end loop ;
      output(d) <= temp(0)(7+NUM_INTERP_BITS
                           downto NUM_INTERP_BITS) ;
    end loop ;
  end process ;

end nonsym_radialrtl ;
```

FIG. 44C

```
#define g(v, m, N)   ( ( v |  ~m ) & N )
#define h(v, N)      ( ( v |   N ) )
/****************************************************/
/** nonsym_pruned_tetrahedral()                    **/
/****************************************************/
void nonsym_pruned_tetrahedral( unsigned char input[],
    unsigned char point[][8], unsigned char resolution[],
    unsigned char output[] )
{
    register unsigned char Amask, Bmask, Cmask ;
    register          int a,b,c,x,y,z ;
    register unsigned char m0, m1, m2, m3 ;
    register unsigned char v0, v1, v2, v3 ;
    register unsigned char g_v1_v0, h_v1_v0 ;
    register unsigned char g_v2_v1, g_v2_g_v1_v0, h_v2_g_v1_v0 ;
    register unsigned char g_v2_h_v1_v0, h_v2_h_v1_v0 ;
    register unsigned char h_v3_v2, g_v3_g_v2_v1 ;
    register unsigned char g_v3_g_v2_g_v1_v0 ;
    register unsigned char g_v3_g_v2_h_v1_v0 ;
    register unsigned char g_v3_h_v2_g_v1_v0 ;
    register unsigned char g_v3_h_v2_h_v1_v0 ;
    register unsigned char h_v3_g_v2_g_v1_v0 ;
    register unsigned char h_v3_g_v2_h_v1_v0 ;
    register unsigned char h_v3_h_v2_g_v1_v0 ;
    register unsigned char h_v3_h_v2_h_v1_v0 ;
    /* Generate Masks */
    /**********************/
    Amask = ( 1 << resolution[0] ) - 1 ;
    Bmask = ( 1 << resolution[1] ) - 1 ;
    Cmask = ( 1 << resolution[2] ) - 1 ;
    /* Snap last value to last table value */
    /***************************************/
    a = ( ( input[0] == 0x0ff ) ? 0x100 : (int) input[0] ) ;
    b = ( ( input[1] == 0x0ff ) ? 0x100 : (int) input[1] ) ;
    c = ( ( input[2] == 0x0ff ) ? 0x100 : (int) input[2] ) ;
    /****************************************************************/
    /*Compute slices across masks and input components */
    /****************************************************************/
    m0 = ( ( (Amask & 0x01) << 2 )
         + ( (Bmask & 0x01) << 1 )     + (Cmask & 0x01);
         + ( (Amask & 0x02) << 1 )
    m1 = ( ( (Bmask & 0x02)       )    + ( (Cmask & 0x02) >> 1 ) );
         + ( (Amask & 0x04)       )
    m2 = ( ( (Bmask & 0x04) >> 1 )     + ( (Cmask & 0x04) >> 2 );
         + ( (Amask & 0x08) >> 1 )
    m3 = ( ( (Bmask & 0x08) >> 2 )     + ( (Cmask & 0x08) >> 3 );
    v0 = m0 & ( ( (a & 0x01) << 2 ) +      (c & 0x01) )  ;
         + ( (b & 0x01) << 1 ) +
    v1 = m1 & ( ( (a & 0x02) << 1 ) + ( (c & 0x02) >> 1 ) )  ;
         + (  (b & 0x02)       ) +
    v2 = m2 & (   (a & 0x04)        + ( (c & 0x04) >> 2 ) )  ;
         + ( (b & 0x04) >> 1 ) +
    v3 = m3 & (  ((a & 0x08) >> 1 ) + ( (c & 0x08) >> 3 ) )  ;
         + ( (b & 0x08) >> 2 ) +
    /*********************************************/
    /* Compute offset from origin. */
    /*********************************************/
    g_v1_v0              = g(v1,m1,v0) ;
    h_v1_v0              = h(v1,v0) ;
    g_v2_v1              = g(v2,m2,v1) ;
    g_v2_g_v1_v0         = g(v2,m2,g_v1_v0) ;
    h_v2_g_v1_v0         = h(v2,g_v1_v0) ;
    g_v2_h_v1_v0         = g(v2,m2,h_v1_v0) ;
    h_v2_h_v1_v0         = h(v2,h_v1_v0) ;
    g_v3_v2              = g(v3,m3,v2) ;
    g_v3_g_v2_v1         = g(v3,m3,g_v2_v1) ;
    g_v3_g_v2_g_v1_v0    = g(v3,m3,g_v2_g_v1_v0) ;
    g_v3_g_v2_h_v1_v0    = g(v3,m3,g_v2_h_v1_v0) ;
    g_v3_h_v2_g_v1_v0    = g(v3,m3,h_v2_g_v1_v0) ;
    g_v3_h_v2_h_v1_v0    = g(v3,m3,h_v2_h_v1_v0) ;
```

FIG.45A

```
g_v3_h_v2_g_v1_v0    = g(v3,m3,h_v2_g_v1_v0);
g_v3_h_v2_h_v1_v0    = g(v3,m3,h_v2_h_v1_v0);
h_v3_v2              = h(v3,v2);
h_v3_g_v2_v1         = h(v3,g_v2_v1);
h_v3_g_v2_h_v1_v0    = h(v3,g_v2_h_v1_v0);
h_v3_h_v2_v1         = h(v3,h_v2_v1);
h_v3_h_v2_g_v1_v0    = h(v3,h_v2_g_v1_v0);
h_v3_h_v2_h_v1_v0    = h(v3,h_v2_h_v1_v0);
/**********/
/* Compute x */
/**********/
x = ( ( point[0][0]
      + point[0][v3]
      + point[0][g_v3_v2]
      + point[0][g_v3_g_v2_v1]
      + point[0][g_v3_g_v2_h_v1_v0]
      + point[0][g_v3_h_v2_v1]
      + point[0][g_v3_h_v2_g_v1_v0]
      + point[0][g_v3_h_v2_h_v1_v0]
      + point[0][h_v3_v2]
      + point[0][h_v3_g_v2_v1]
      + point[0][h_v3_g_v2_h_v1_v0]
      + point[0][h_v3_h_v2_v1]
      + point[0][h_v3_h_v2_g_v1_v0]
      + point[0][h_v3_h_v2_h_v1_v0]
      + 0x08 ) >> 4 );         /*Round*/
/**********/
/* Compute y */
/**********/
y = ( ( point[1][0]
      + point[1][v3]
      + point[1][g_v3_v2]
      + point[1][g_v3_g_v2_v1]
      + point[1][g_v3_g_v2_h_v1_v0]
      + point[1][g_v3_h_v2_v1]
      + point[1][g_v3_h_v2_g_v1_v0]
      + point[1][g_v3_h_v2_h_v1_v0]
      + point[1][h_v3_v2]
      + point[1][h_v3_g_v2_v1]
      + point[1][h_v3_g_v2_h_v1_v0]
      + point[1][h_v3_h_v2_v1]
      + point[1][h_v3_h_v2_g_v1_v0]
      + point[1][h_v3_h_v2_h_v1_v0]
      + 0x08 ) >> 4 );         /*Round*/
/**********/
/* Compute z */
/**********/
z = ( ( point[2][0]
      + point[2][v3]
      + point[2][g_v3_v2]
      + point[2][g_v3_g_v2_v1]
      + point[2][g_v3_g_v2_h_v1_v0]
      + point[2][g_v3_h_v2_v1]
      + point[2][g_v3_h_v2_g_v1_v0]
      + point[2][g_v3_h_v2_h_v1_v0]
      + point[2][h_v3_v2]
      + point[2][h_v3_g_v2_v1]
      + point[2][h_v3_g_v2_h_v1_v0]
      + point[2][h_v3_h_v2_v1]
      + point[2][h_v3_h_v2_g_v1_v0]
      + point[2][h_v3_h_v2_h_v1_v0]
      + 0x08 ) >> 4 );         /*Round*/
/***********************/
/* Write back results */
/***********************/
output[0] = (char) x;
output[1] = (char) y;
output[2] = (char) z;
}
```

FIG. 45B

```
-------------------------------------------------
-- Non-Symmetric Pruned Tetrahedral Interpolation --
-------------------------------------------------
entity nonsym_pruned_tetrahedral is
port (
    -- Input Pixel --
    input:       in    INPUT_ARRAY ;
    -- Vertex Points of Cube from Color Table --
    point:       in    POINT_ARRAY ;
    -- Lattice Resolution --
    resolution:  in    RESOLUTION_ARRAY ;
    -- Output Pixel --
    output:      out   OUTPUT_ARRAY ;
) ;
end nonsym_pruned_tetrahedral ;

architecture nonsym_tetrtl of nonsym_pruned_tetrahedral is
    constant VERTEX_COUNT: INTEGER := 2**NUM_INTERP_BITS;
    signal   mask:         MASK_ARRAY ;
    signal   vertex:       VERTEX_ARRAY ;
    signal   point_value:  POINT_VALUE_ARRAY ;
begin
    -- Compute Lattice Resolution Masks --
    MASKS: process ( resolution )
        variable top:  INTEGER ;
    begin
        -- Convert BIT_VECTOR to INTEGER --
        for j in 2 downto 0 loop
            if ( resolution(i)(j) = '1' ) then
                top := top + 2**j ;
            else
                top := top ;
            end if ;
        end loop ;
        -- Generate Mask --
        for j in NUM_INTERP_BITS-1 downto 0 loop
            if ( j <= top ) then
                mask(j)(i) <= '1' ;
            else
                mask(j)(i) <= '0' ;
            end if ;
        end loop ;
    end process ;

-- Compute vertices --
    VERTICIES: process ( input, mask )
        variable temp1, temp2:  VERTEX_ARRAY ;
        variable limit:         INTEGER ;
    begin
        -- Initialize Arrays --
        temp2 := ( others => "000" ) ;
        -- For each slice across the interpolate bits --
        for i in 0 to NUM_INTERP_BITS-1 loop
            -- limit is 0, 2, 6, 14, 30, ....
            limit := ( 2**(i+1) ) - 2 ;
```

FIG.46A

```
-- Load slice into limit location
temp2(limit) := mask(i) and ( input(0)(i)
                & input(1)(i) & input(2)(i) ) ;
temp1 := temp2 ;
-- for all values in temp1 --
for j in (VERTEX_COUNT/2)-1 downto 0 loop
    if ( j < limit/2 ) then
        -- P'[2*j]=(v[i] | ~m[i]) & P[j]--
        temp2(2*j)   := ( templ(limit)
                or not mask(i) ) and templ(j) ;
        -- P'[2*j+1] = v[i] | P[j] --
        temp2(2*j+1) := v[i] | P[j] .
        temp2((2*j)+1) := templ(limit)
                or templ(j) ;
    else
        temp2 := temp2 ;
    end if ;
end loop ;
-- Move into index array --
vertex <= temp2 ;
end process ;

MUX: process ( vertex, point )
begin
    for d in 0 to NUM_OUTPUT_DIMEN-1 loop
        point_value(d) <= (others => '0');
        for i in 0 to VERTEX_COUNT-2 loop
            case vertex(i) is
                when "000" => point_value(d)(i)(7 downto 0)
                                <= point(d)(0) ;
                when "001" => point_value(d)(i)(7 downto 0)
                                <= point(d)(1) ;
                when "010" => point_value(d)(i)(7 downto 0)
                                <= point_value(d)(i)(7 downto 0)
                                <= point(d)(2) ;
                when "011" => point_value(d)(i)(7 downto 0)
                                <= point(d)(3) ;
                when "100" => point_value(d)(i)(7 downto 0)
                                <= point(d)(4) ;
                when "101" => point_value(d)(i)(7 downto 0)
                                <= point(d)(5) ;
                when "110" => point_value(d)(i)(7 downto 0)
                                <= point(d)(6) ;
                when others => point_value(d)(i)(7 downto 0)
                                <= point(d)(7) ;
            end case ;
        end loop ;
        point_value(d)(VERTEX_COUNT-1)
                    (7 downto 0) <= point(d)(0) ;
        point_value(d)(VERTEX_COUNT)
                    (NUM_INTERP_BITS-1) <= '1' ;
    end loop ;
end process ;

-- Select the values of vertices to be used by the --
-- interpolation. The last two vertices are always --
-- point(0) and the rounding constant.            --
SUM: process ( point_value )
    variable   temp:    POINT_VALUES ;
    variable   bound:   INTEGER ;
begin
    for d in 0 to NUM_OUTPUT_DIMEN-1 loop
        temp := point_value(d) ;
        bound := VERTEX_COUNT+1 ;
        for i in 0 to NUM_INTERP_BITS loop
            for j in 0 to VERTEX_COUNT/2 loop
```

FIG.46B

```
                if ( 2*j < bound ) then
                    temp(j) := temp(2*j) ;
                else
                    temp(j) := (others => '0') ;
                end if ;
                if ( (2*j)+1 < bound ) then
                    temp(j) := temp(j) + temp((2*j)+1) ;
                else
                    temp(j) := temp(j) ;
                end if ;
            end loop ;
            bound := ( bound / 2 ) + ( bound mod 2 ) ;
        end loop ;
        output(d) <= temp(0)(7+NUM_INTERP_BITS
                              downto NUM_INTERP_BITS) ;

end loop ;
end process ;

-------------------------------------------
end nonsym_pruned_tetrt1 ;
-------------------------------------------
```

FIG.46C

```vhdl
-- ------------------------------------------------
-- Non-Symmetric Pruned Tetrahedral Interpolation --
-- ------------------------------------------------
entity nonsym_radial_tetr is
port (
    -- Interpolation Select --
    tetra_not_radial: in STD_LOGIC ;
    -- Input Pixel --
    input:           in INPUT_ARRAY ;
    -- Vertex Points of Cube from Color Table --
    point:           in POINT_ARRAY ;
    -- Lattice Resolution --
    resolution:      in RESOLUTION_ARRAY ;
    -- Output Pixel --
    output:          out OUTPUT_ARRAY
) ;
end nonsym_pruned_tetrahedral ;
-- ------------------------------------------------
architecture nonsym_radial_tetrt1 of nonsym_radial_tetr is
constant VERTEX_COUNT: INTEGER := 2**NUM_INTERP_BITS;
signal mask:         MASK_ARRAY ;
signal vertex:       VERTEX_ARRAY ;
signal point_value:  POINT_VALUE_ARRAY ;
begin
-- Compute Lattice Resolution Masks --
MASKS: process ( resolution )
    variable top:    INTEGER ;
begin
    for i in 0 to 2 loop
        top := 0 ;
        for j in 2 downto 0 loop
            if ( resolution(i)(j) = '1' ) then
                top := top + 2**j ;
            else
                top := top ;
            end if ;
        end loop ;
        for j in NUM_INTERP_BITS-1 downto 0 loop
            if ( j < top ) then
                mask(j)(i) <= '1' ;
            else
                mask(j)(i) <= '0' ;
            end if ;
        end loop ;
    end loop ;
end process ;
-- Compute vertices.
VERTICIES: process ( tetra_not_radial, input, mask )
    variable temp1, temp2:  VERTEX_ARRAY ;
    variable limit:         INTEGER ;
begin
    temp2 := ( others => "000" ) ;
    for i in 0 to NUM_INTERP_BITS-1 loop
        limit := ( 2**(i+1) ) - 2 ;
        temp2(limit) := mask(i) and ( input(0)(i)
                       & input(1)(i) & input(2)(i) ) ;
        temp1 := temp2 ;
        for j in (VERTEX_COUNT/2)-1 downto 0 loop
            if ( j < limit/2 ) then
                -- Select Radial or Tetrahedral--
                if ( tetra_not_radial = '0' ) then
                    -- Radial --
                    -- P'[2*j] = P[j] --
                    temp2(2*j)   := temp1(j) ;
                    -- P'[2*j+1]=v[i]|(P[j]&~m[i])
```

FIG.47A

```vhdl
              temp2((2*j)+1) := temp1(limit)
                  or (temp1(j) and not mask(i));
            else
            -----------------------------------------
            -- NonSym Pruned Tetrahedral  --
            -----------------------------------------
            -- P'[2*j]=(v[i]|~m[i]&P[j]--
            -----------------------------------------
              temp2(2*j)    := ( temp1(limit)
                  or not mask(i) ) and templ(j);
            -----------------------------------------
            -- P'[2*j+1] = v[i]|P[j]  --
            -----------------------------------------
              temp2((2*j)+1) := temp1(limit)
                  or templ(j) ;
            end if ;
          end if ;
          temp2 := temp2 ;
        end loop ;
      end loop ;
      vertex <= temp2 ;
end process ;

-- Select the values of vertices to be used by the   --
-- interpolation. The last two vertices are always   --
-- point(0) and the rounding constant.               --
MUX: process ( vertex, point )
begin
  for d in 0 to NUM_OUTPUT_DIMEN-1 loop
    point_value(d) <= (others => (others => '0'));
    for i in 0 to VERTEX_COUNT-2 loop
      case vertex(i) is
        when "000" => point_value(d)(i)(7 downto 0)
                          <= point(d)(0)
        when "001" => point_value(d)(i)(7 downto 0)
                          <= point(d)(1)
        when "010" => point_value(d)(i)(7 downto 0)
                          <= point(d)(2)
        when "011" => point_value(d)(i)(7 downto 0)
                          <= point(d)(3)
        when "100" => point_value(d)(i)(7 downto 0)
                          <= point(d)(4)
        when "101" => point_value(d)(i)(7 downto 0)
                          <= point(d)(5)
        when "110" => point_value(d)(i)(7 downto 0)
                          <= point(d)(6)
        when others => point_value(d)(i)(7 downto 0)
                          <= point(d)(7)
      end case ;
    end loop ;
    point_value(d)(VERTEX_COUNT-1)
                 (7 downto 0) <= point(d)(0) ;
    point_value(d)(VERTEX_COUNT)
                 (NUM_INTERP_BITS-1) <= '1' ;
  end loop ;
end process ;

-- Select the values of vertices to be used by the   --
-- interpolation. The last two vertices are always   --
-- point(0) and the rounding constant.               --
SUM: process ( point_value )
  variable temp:   POINT_VALUES ;
  variable bound:  INTEGER ;
begin
  for d in 0 to NUM_OUTPUT_DIMEN-1 loop
    temp := point_value(d) ;
    bound := VERTEX_COUNT + 1 ;
    for j in 0 to NUM_INTERP_BITS loop
      for i in 0 to VERTEX_COUNT/2 loop
        if ( 2*j < bound ) then
          temp(j) := temp(2*j) ;
        else
          temp(j) := (others => '0') ;
```

FIG. 47B

```
            end if ;
            if ( (2*j)+1 < bound ) then
                temp(j) := temp(j) + temp((2*j)+1)
            else
                temp(j) := temp(j) ;
            end if ;
        end loop ;
        bound := ( bound / 2 ) + ( bound mod 2 ) ;
    end loop ;
    output(d) <= temp(0)(7+NUM_INTERP_BITS
                   downto NUM_INTERP_BITS) ;
    end loop ;
end process ;

end nonsym_radial_tetrt1 ;
```

FIG. 47C

COMMON NON-SYMMETRIC PRUNED RADIAL AND NON-SYMMETRIC PRUNED TETRAHEDRAL INTERPOLATION HARDWARE IMPLEMENTATION

CROSS REFERENCE TO RELATED APPLICATIONS

This application includes subject matter related to the co-pending application Ser. No. 08/989,929 entitled: "RADIAL AND PRUNED RADIAL INTERPOLATION" the co-pending patent application Ser. No. 08/989,961 entitled: "TETRAHEDRAL AND PRUNED TETRAHEDRAL INTERPOLATION" the co-pending patent application Ser. No. 08/990,016 entitled: "COMMON PRUNED RADIAL AND PRUNED TETRAHEDRAL INTERPOLATION HARDWARE IMPLEMENTATION" the co-pending patent application Ser. No. 08/989,962 entitled "NON-SYMMETRIC RADIAL AND PRUNED RADIAL INTERPOLATION" and the co-pending patent application Ser. No. 08/990,000 entitled: "NON-SYMMETRIC TETRAHEDRAL AND PRUNED TETRAHEDRAL INTERPOLATION" each incorporated by reference herein and filed on Dec. 12, 1997.

FIELD OF THE INVENTION

This invention relates to the transformation of data, and more particularly to the transformation of data from a first space to a second space, such as in the conversion from a first color space to a second color space.

BACKGROUND OF THE INVENTION

Colorimetry has long been recognized as a complex science. In general, it has been found possible and convenient to represent color stimuli vectors in a three-dimensional space, called tristimulus space. Essentially, as defined in 1931 by the Commission Internationale L'Eclairage (CIE), three primary colors (X, Y, Z) can be combined to define all light sensations we experience with our eyes (that is, the color matching properties of an ideal trichromatic observer defined by specifying three independent functions of wavelength that are identified with the ideal observer's color matching functions form an international standard for specifying color). The fundamentals of such three-dimensional constructs are discussed in the literature, such as *Principles of Color Technology*, by Billmeyer and Saltzman, published by John Wiley & Sons, Inc., NY, copyright 1981 (2nd. ed.) and *Color Science: Concepts and Methods, Quantitative Data and Formulae*, by Wyszecki and Stiles, published John Wiley & Sons, Inc., copyright 1982 (2d ed.), incorporated herein by reference in pertinent parts, particularly pages 119–130.

Trichromatic model systems—such as red, green, blue (RGB); cyan, magenta, yellow (CMY); hue, saturation, value (HSV); hue, lightness, saturation (HLS); luminance, red-yellow scale, green-blue scale (La*b*); luminance, red-green scale, yellow-blue scale (Luv); YIQ used in commercial color television broadcasting; and the like—provide alternatives for the system designer. See such works as Fundamentals of Interactive Computer Graphics, by Foley and Van Dam, Addison-Wesley Publishing Company, incorporated herein by reference in pertinent parts, particularly pages 606–621, describing a variety of tri-variable color models.

Color transformation between model systems in digital data processing presents many problems to the original equipment manufacturer. The translation of data from one system to another system is difficult because the relationship between the systems are generally non-linear. Therefore, a crucial problem is the maintaining of color integrity between an original image from an input device (such as a color scanner, CRT display, digital camera, computer software/firmware generation, and the like) and a translated copy at an output device (such as a CRT display, color laser printer, color ink-jet printer, and the like).

For example, computer artists want the ability to create a color image on a computer video and have a printer provide the same color in hard copy. Or, an original color photograph may be digitized with a scanner; resultant data may be transformed for display on a video monitor or reproduced as a hard copy by a laser, ink-jet or thermal transfer printer. As discussed in the reference materials cited, colors can be constructed as renderings of the additive primary colors, red, green, and blue (RGB), or of the subtractive primary colors, cyan, magenta, yellow and black (CMYK). A transformation may require going from an RGB color space, for example, a computer video monitor, to a CMYK color space, for example, a laser printer hard copy. A transformation from one color space to another requires complex, non-linear computations in multiple dimensions. Some transform operations could be accomplished through matrix multiplication However, a difficulty in this method of color space conversion results from imperfections in the dyes, phosphors, and toners used for the production of the colors. An additional complication is that different types of media produce different color responses from printing with the same mixes of colorants. As a result, a purely mathematical color space conversion method does not provide acceptable color reproduction.

It has been recognized that superior results in color space conversion are obtained using a look up table scheme based upon a set of empirically derived values. Typically the RGB color space used for video displays use eight bits to represent each of the primary colors, red, green, and blue. Therefore, twenty four bits are required to represent each picture element. With this resolution, the RGB color space would consist of $2^{24}$ or 16,777,216 colors. Performing a color space conversion from each of these points in the RGB color space to generate the four CMYK (to maintain black color purity in printing, a separate black is usually provided rather than printing with all three of cyan, magenta, and yellow colorants to generate what is commonly known as process black) color space components would require a look-up table with $4 \times 2^{24}$ or 67,108,864 bytes of data. The empirical construction of a look-up table with this number of entries is too costly.

In making the transform from one color space to another, a number of interpolation schemes well known in the field of color space conversion may be employed. Methods of performing color space conversion using trilinear interpolation, prism interpolation, and tetrahedral interpolation are disclosed in the published article PERFORMING COLOR SPACE CONVERSIONS WITH THREE DIMENSIONAL LINEAR INTERPOLATION, JOURNAL OF ELECTRONIC IMAGING, July 1995 Vol. 4(3), the disclosure of which is incorporated herein by reference. U.S. Pat. No. 3,893.166 (the disclosure of which is incorporated herein by reference), issued to Pugsley, discloses a scheme for translation between color spaces which uses a look-up table to access values used in an interpolation.

Conversion of large amounts of data between color spaces, such as is required for color printing, is a time consuming operation using the prior art methods of interpolation. The use of the computationally intensive prior art methods of interpolation for the color space conversion process makes high rates of data throughput difficult to achieve. A need exists for an interpolation method and an interpolation apparatus that will enable a reduction in the computations required for performing a conversion between color spaces.

SUMMARY OF THE INVENTION

Accordingly, a common non-symmetric pruned radial and non-symmetric pruned tetrahedral interpolator for interpolating between interpolation data values uses input data values each having d components to generate output data values. The d components are represented, correspondingly, by d sets of bits each partitioned to form d sets of lower order bits each having, respectively, $n_1, n_2, n_3, \ldots n_d$ of the bits. The common non-symmetric pruned radial and non-symmetric pruned tetrahedral interpolator includes a first set of $2^n-1$ multiplexers each configured for receiving one of a first set of control inputs and having a multiplexer output, where n equals the greatest of the $n_1, n_2, n_3, \ldots n_d$. Each of the multiplexers of the first set is used for selecting from the interpolation data values responsive to the one of the first set of control inputs. The common non-symmetric pruned radial and non-symmetric pruned tetrahedral interpolator further includes a second set of $2^n-2$ multiplexers each having a multiplexer output. Each of the multiplexer output of the second set is coupled to one of the multiplexers of the first set of multiplexers. The second set of multiplexers is used to supply $2^n-2$ of the first set of control inputs by each of the second set of multiplexers selecting between one of a first set of values and one of a second set of values, responsive to one of a second set of control inputs. Determining the first set of values includes using a first function and determining the second set of values includes using a second function and a third function. The common non-symmetric pruned radial and non-symmetric pruned tetrahedral interpolator includes a means for adding configured for receiving the multiplexer output of the first set of multiplexers.

A common non-symmetric pruned radial and non-symmetric pruned tetrahedral interpolator for interpolating between interpolation data values uses input data values each having three components to generate output data values. The components are represented by three sets of bits each partitioned to form three sets of lower order bits, each having, respectively, $n_1, n_2, n_3$ of the bits, and three sets of higher order bits. The common non-symmetric pruned radial and non-symmetric pruned tetrahedral interpolator includes a first multiplexer having a first multiplexer output and configured for receiving a first control input and the interpolation data values. The first multiplexer is used for selecting from the interpolation data values responsive to the first control input. The common non-symmetric pruned radial and non-symmetric pruned tetrahedral interpolator further includes a second multiplexer having a second multiplexer output and configured for receiving a second control input and the interpolation data values. The second multiplexer is used for selecting from the interpolation data values responsive to the second control input. The common non-symmetric pruned radial and non-symmetric pruned tetrahedral interpolator further includes a third multiplexer having a third multiplexer output and configured for receiving a third control input and the interpolation data values. The third multiplexer is used for selecting from the interpolation data values responsive to the third control input. The common non-symmetric pruned radial and non-symmetric pruned tetrahedral interpolator further includes a fourth multiplexer having a fourth multiplexer output coupled to the second multiplexer to supply the second control input. The fourth multiplexer is used for selecting from a first value determined from a first function and a second value determined from a second function and a third function. The common non-symmetric pruned radial and non-symmetric pruned tetrahedral interpolator further includes a fifth multiplexer having a fifth multiplexer output coupled to the third multiplexer to supply the third control input. The fifth multiplexer is used for selecting from a third value determined from the first function and a fourth value determined from the second function and the third function. The common non-symmetric pruned radial and non-symmetric pruned tetrahedral interpolator further includes a means for adding coupled to the first, the second, and the third multiplexer output and configured for receiving one of the interpolation data values determined from the three sets of higher order bits.

DESCRIPTION OF THE DRAWINGS

A more thorough understanding of the invention may be had from the consideration of the following detailed description taken in conjunction with the accompanying drawings in which:

FIG. 6a through 6e shows a graphical representation of multiple iterations of the cube subdivision process used in radial interpolation.

FIGS. 23a through 23e shows a graphical representation of a non-symmetric interpolation process.

FIG. 38 includes a C code listing of a method for implementing pruned radial interpolation in software.

FIG. 39 includes a VHDL listing used for generating a hardware implementation of pruned radial interpolation.

FIG. 40 includes a C code listing of a method for implementing pruned tetrahedral interpolation in software.

FIG. 41 includes a VHDL listing used for generating a hardware implementation of pruned tetrahedral interpolation.

FIG. 42 includes a VHDL listing used for generating a hardware implementation of common pruned radial interpolation and pruned tetrahedral interpolation.

FIG. 43 includes a C code listing of a method for implementing non-symmetric pruned radial interpolation in software.

FIG. 44 includes a VHDL listing used for generating a hardware implementation of non-symmetric pruned radial interpolation.

FIG. 45 includes a C code listing of a method for implementing non-symmetric pruned tetrahedral interpolation in software.

FIG. 46 includes a VHDL listing used for generating a hardware implementation of non-symmetric pruned tetrahedral interpolation.

FIG. 47 includes a VHDL listing used for generating a hardware implementation of common non-symmetric pruned radial and non-symmetric pruned tetrahedral interpolation.

DETAILED DESCRIPTION OF THE PREFERRED EMBODIMENT

The present invention is not limited to the specific exemplary embodiments illustrated herein. In addition, although several embodiments of sub-cube interpolation will be discussed in the context of a color laser printer, one of ordinary skill in the art will recognize after understanding this specification that the disclosed embodiments of sub-cube interpolation have applicability in any interpolative data transformation between spaces. For example, the interpolations required for the rendering of three dimensional graphics could advantageously use the disclosed interpolation techniques.

Sub-cube interpolation using tetrahedral interpolation to generate each of the vertices of the successive sub-cubes is taught in U.S. Pat. No. 5,748,176 the disclosure of which is incorporated by reference herein. However, the method for generation of the sub-cube vertex values disclosed in this patent requires a large number of computations. A need exists for a method of generating the sub-cube vertex values which is more computationally efficient.

Figure 1A:
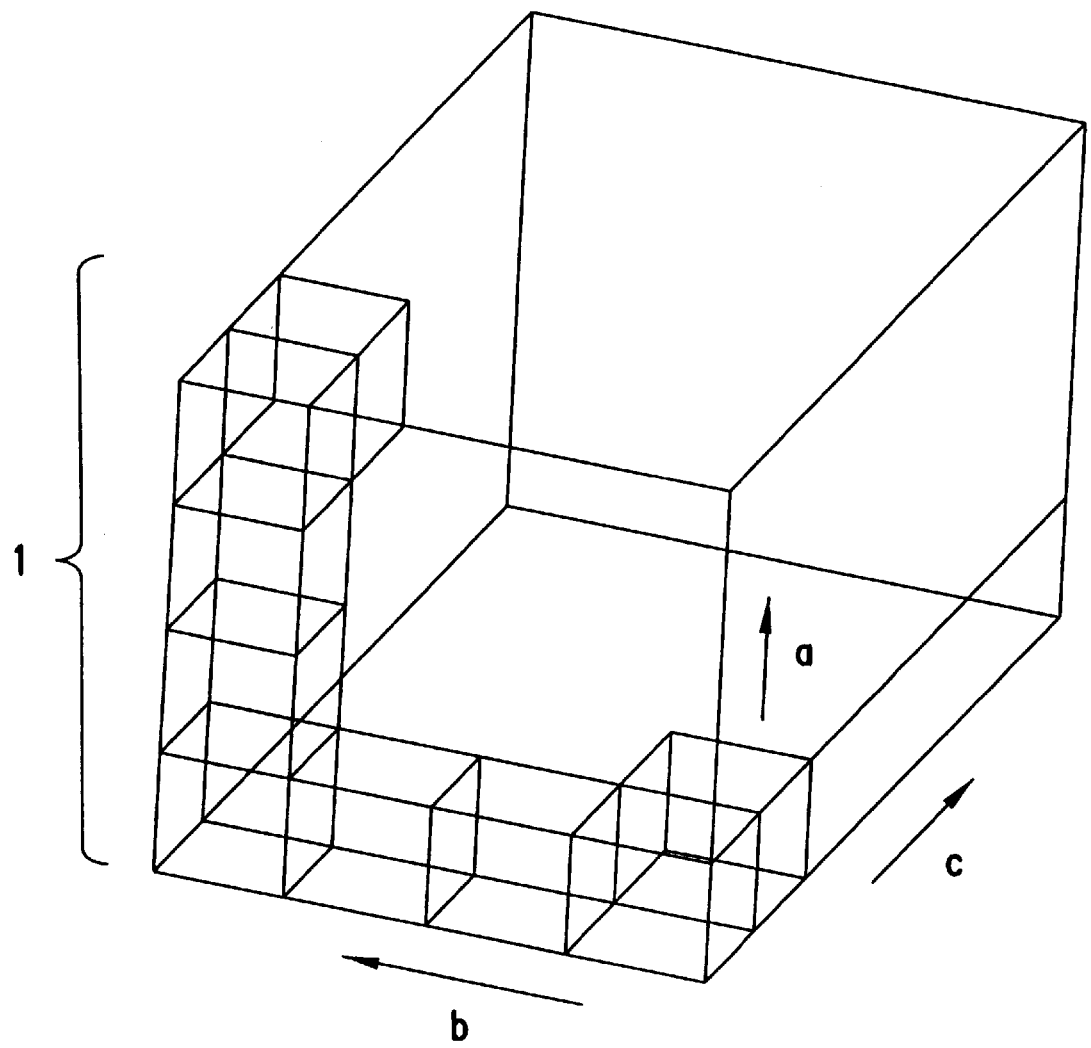
FIG. 1a is a representation of output color space values used for interpolation in a cubic lattice. The vertices of the each of the cubes forming the cubic lattice represent values of the output color space.

Shown in FIG. 1a is a cubic lattice 1. The cubic lattice is formed of a multiplicity of cubes with the vertices of the cubes representing values in the output color space. The input color space values are each partitioned into an upper portion and a lower portion. The upper portion of each of the input color space values serves as an index to address the vertex values of the cubic lattice 1 used for interpolation. The lower portion of each of the input color space values is used to interpolate between the output color space values accessed using the upper portion of the input color space value. Each of the dimensions of the cubic lattice 1 correspond to one of the components of the input color space value. The values associated with the vertices of cubic lattice 1 are used to generate output color space values.

Each of the output color space values has multiple components corresponding to the dimensions of the output color space. Conversion is done from the input color space values to components of the output color space values. Conversion to each output color space value component uses a distinct set of vertex values. For the case in which there are three components to each of the output color space values, there are three sets of vertex values used for the color space conversion. For this case, it would be possible to regard each vertex value as formed of three values with each of the three values selected from one of the three sets. Viewing the vertex values in this way, the conversion to each of the components of the output color space values would be performed in parallel. It is also possible to perform the conversion to each of the output color space components serially. Done in this manner, the conversion can be viewed as using three separate cubic lattices, one corresponding to each set of vertex values.

Figure 1B:
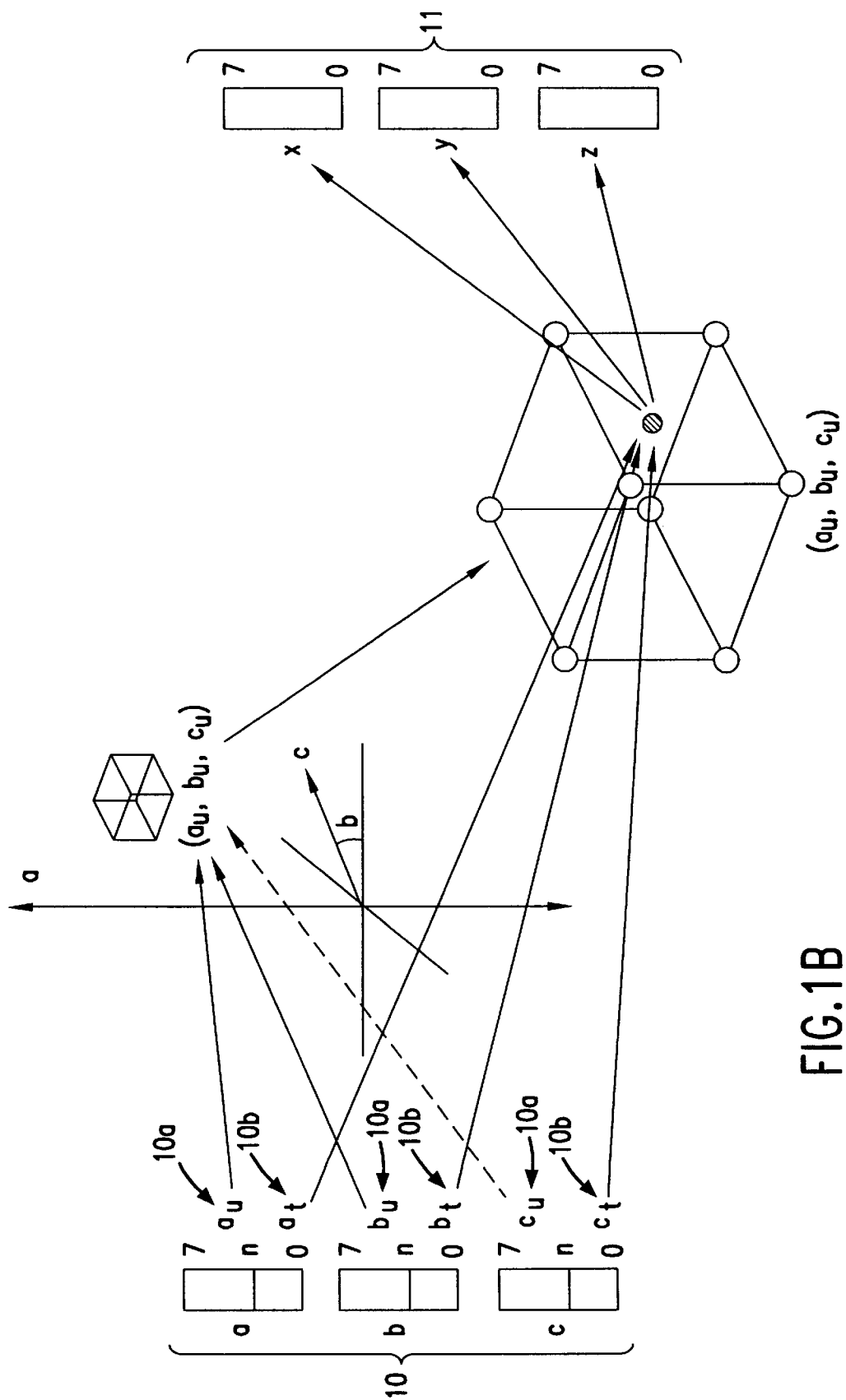
FIG. 1b is a graphical representation of a color space conversion process from a color expressed in a cylindrical coordinate to a color expressed in a rectangular coordinate.
Figure 2D:
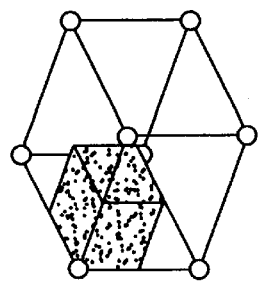
FIGS. 2a through 2d are a graphical representation of the selection of a single sub-cube using the corresponding bits from the lower order bits of the input color space value.
Figure 2C:
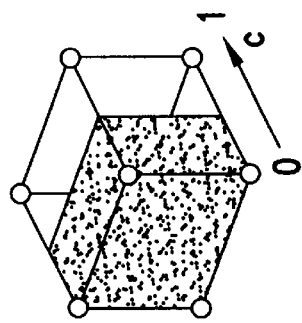
Figure 2B:
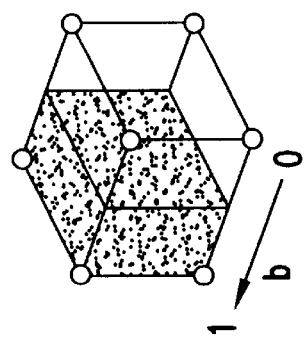
Figure 2A:
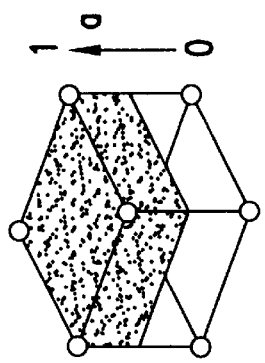
Figure 3D:
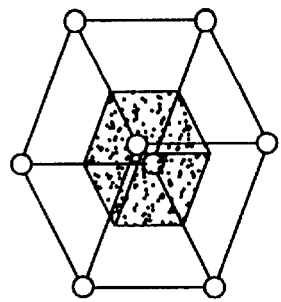
FIGS. 3a through 3h show the eight possible sub-cubes which can be selected from a cube using the corresponding bits from the lower order bits of the input color space value.
Figure 3H:
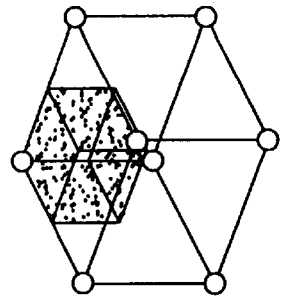
Figure 3C:
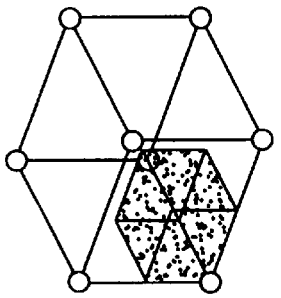
Figure 3G:
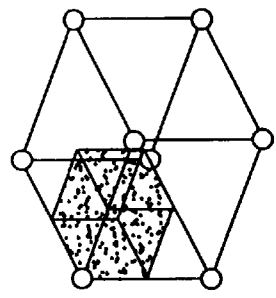
Figure 3B:
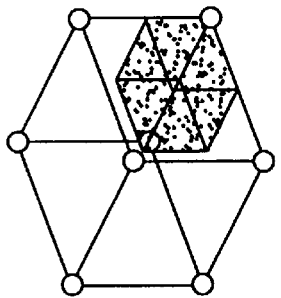
Figure 3F:
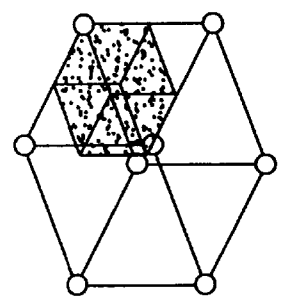
Figure 3A:
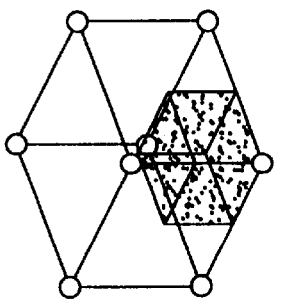
Figure 3E:
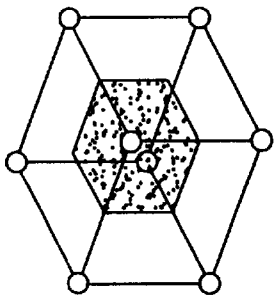

Shown in FIG. 1b is a general graphical representation of the interpolation process. Consider, for example the conversion of an input color space value (a, b, c) 10, representing a color in a cylindrical color space, to an output color space value (x, y, z) representing that same color in a Cartesian color space. In this example, each of a, b, and c are represented by eight bits. Each of the three groups of eight bits can be partitioned, for example, into four upper bits 10a (represented by $a_u$, $b_u$, and $c_u$) and four lower bits 10b (represented by $a_l$, $b_l$, and $c_l$). The three groups of four upper bits 10a are used as an index into the cubic lattice 1 to retrieve the eight values corresponding to the vertices of a cube within the cubic lattice 1 that will be used as interpolation data values. The three groups of four lower bits 10b are then used to interpolate between the eight interpolation data values corresponding to the vertices of the cubic lattice 1 to generate a component of the output color space value 11.

One of ordinary skill in the art will recognize that other partitions of the bits of the input color space value 10 are possible. The particular partition of the bits will depend upon such things as the size of the memory available to store the values of the output color space used for the interpolation and the amount of change in the output color space value that occurs between vertices of cubic lattice 1. A tradeoff exists between the accuracy of the interpolation and the size of the memory used to store the output color space values used as the interpolation data values. If the characteristics of the output color space are such that it changes relatively linearly throughout the color space, then fewer vertices in cubic lattice 1 are necessary to deliver an acceptable level of interpolation accuracy.

The index formed by $a_u$, $b_u$, and $c_u$ serves as an entry point into the cubic lattice. The index addresses one vertex of the eight vertices of the cube used as the interpolation data values. Each of the vertices of the cube corresponds to a value used for interpolating to generate one component of the output color space value 11. The eight associated vertices of a cube in the cubic lattice 1 have the following relative addresses:

$(a_u, b_u, c_u)$ $(a_u+1, b_u, c_u)$ $(a_u, b_u+1, c_u)$ $(a_u, b_u, c_u+1)$ $(a_u+1, b_u+1, c_u)$ $(a_u+1, b_u, c_u+1)$ $(a_u, b_u+1, c_u 1)$ $(a_u+1, b_u+1, c^u+1)$

The cube subdivision interpolation method disclosed in the U.S. Pat. No. 5,748,176 performs an interpolation by generating a sub-cube using the values associated with the vertices of the previously generated sub-cube. The initial cube formed by the vertex values associated with the three groups of upper order bits ($a_u$, $b_u$, $c_u$) 10a is used to generate the first sub-cube. This initial cube can be divided into eight sub-cubes. The three groups of lower order bits $10_b$ ($a_l$, $b_l$, $c_l$) are used to select one of the eight possible sub-cubes formed for the next iteration of sub-cube division. These three groups of lower order bits 10b identify in which of the eight possible sub-cubes the result of the interpolation will be located. When the sub-cube which contains the result of the interpolation is identified, this sub-cube is used to generate the next sub-cube which contains the result of the interpolation. This process is successively repeated until the last sub-cube containing the result of the interpolation is generated. One of the values associated with a vertex of this last sub-cube generated is used as the result of the interpolation.

FIGS. 2a through 2d graphically represent the selection of a sub-cube using the three groups of lower order bits 10b ($a_l$, $b_l$, $c_l$). For purposes of explaining the sub-cube selection, consider the case in which the lower order bits 10b for each component of the input color space value consists of four bits. Shown in each of FIGS. 2a through 2d are the axes corresponding to the a, b, and c components of the input color space value. Each of these axes corresponds to a dimension of the input color space. Sub-cubes are designated using one corresponding bit (corresponding in the sense that they are coefficients of the same power of 2) from the lower order bits 10b of each component of the input color space value. Each bit position of the lower order bits 10b of each component can be viewed as dividing the cube in half along the dimension corresponding to the component. The value of the bit for each component determines which half of the cube is selected in the corresponding dimension, for the purpose of determining in which sub-cube the result of the interpolation is located. The selected sub-cube will be the volume defined by the intersection of the cube halves selected by the corresponding bits of each component of the lower order bits 10b of the input color space value. If the bit of the lower order bits 10b for the component is a "1", a corner of the selected cube half is displaced one half the length along the corresponding axis from the origin of the cube. If the bit of the component is a "0", the corner of the selected cube half includes the origin of the cube. Shown in FIGS. 3a through 3h are the eight possible sub-cubes defined by the common intersection of the cube halves designated by the corresponding bit from each of $a_l$, $b_l$, and $c_l$.

Figure 4:
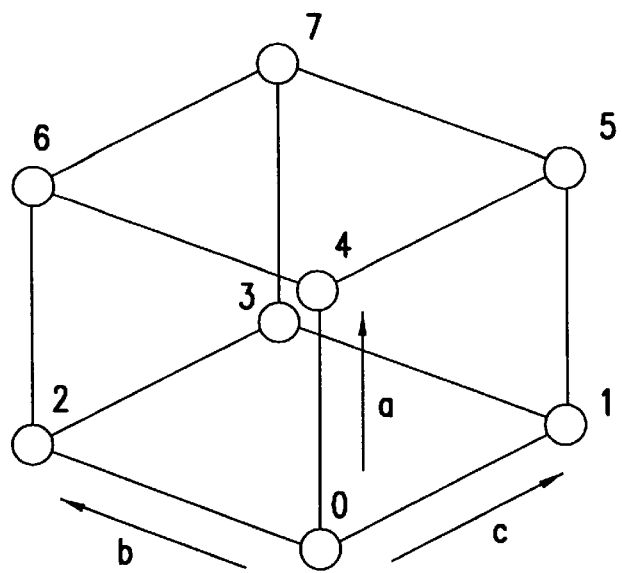
FIG. 4 shows the numbering of the vertices of the cube for the purposes of selecting the sub-cube containing the result of the interpolation using the corresponding bits of the lower order bits.

By numbering the vertices of the cubes in a manner that is consistent with the assignment of the groups of lower order bits 10b of the components of the input color space value to the axes, the vertex of the cube used to generate the sub-cube associated with a vertex of the sub-cube to be generated, is designated by the binary value formed by combining the corresponding bits from each of the groups of lower order bits 10b of the components. Shown in FIG. 4 is a cube with the axes labeled and with the vertices numbered. The cube used to generate a sub-cube and the generated sub-cube share a vertex. With this assignment of vertex numbers, the number of the vertex of the cube used to generate the sub-cube which is included within the sub-cube generated is the binary value formed from the corresponding bits of $a_l$, $b_l$, and $c_l$ for a given bit position.

An example will be explained to illustrate the interpolation using the sub-cube generation. Assume that the following values are used for $a_l$, $b_l$, and $c_l$:

TABLE 1

$a_l$=1010

$b_l$=1110

$c_l$=0011

With these values assigned to $a_l$, $b_l$, and $c_l$, the vertex number 6 (computed by selecting the most significant bit from each of $a_l$, $b_l$, and $c_l$ and concantenating these into a binary value) of the cube used to generate the first sub-cube is also a vertex of the first sub-cube. The vertex of the first sub-cube included within the second sub-cube generated is vertex number 2 (computed by selecting the second most significant bit from each of $a_l$, $b_l$, and $c_l$ and concantenating these into a binary value). The vertex of the second sub-cube included with the third sub-cube generated is vertex number 7 (computed by selecting the third most significant bit from each of $a_l$, $b_l$, and $c_l$ and concantenating these into a binary value). The vertex of the third sub-cube included with the fourth sub-cube generated is vertex number 1 (computed by selecting the fourth most significant bit from each of $a_l$, $b_l$, and $c_l$ and concantenating these into a binary value). The vertex values of the first sub-cube are generated with the vertex values accessed using the upper order bits ($a_u$, $b_u$, $c_u$) 10a of the components of the input color space value. The vertex values of the second sub-cube are generated using the vertex values generated for the first sub-cube. The vertex values of the third sub-cube are generated using the vertex values generated for the second sub-cube. Finally, the vertex values of the fourth sub-cube are generated using the vertex values generated for the third sub-cube. In sub-cube interpolation, the value associated with the vertex numbered 0 of the final sub-cube generated is the value used as the result of the interpolation. This result is one component of the output color space value. This sub-cube generation procedure could be applied with an arbitrary number of bits used to specify each component of the lower order bits 10b of the input color space value.

A variety of methods have been previously employed for the generation of the sub-cube values. These methods include tetrahedral, pyramid, PRISM, and Trilinear. Radial sub-cube generation is a new method of sub-cube generation which achieves a substantial reduction in the computational complexity required to generate the sub-cubes. It should be recognized that each interpolation method can generate different results because the interpolation process is an approximation of the color space conversion. Depending upon the location in the color space where the conversion is performed and the preferred characteristics of the result, one method may yield more desirable results than another.

Figure 5:
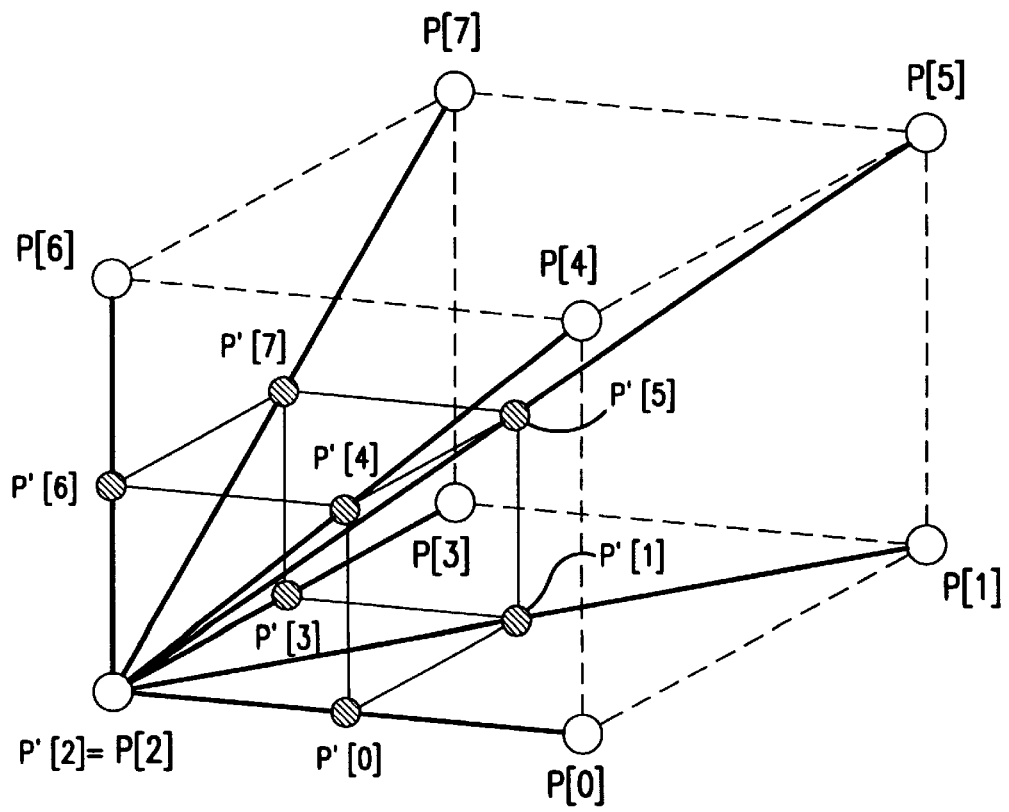
FIG. 5 is a graphical representation of the radial sub-cube generation process.

Shown in FIG. 5 is a graphical representation of the radial sub-cube generation method. Clearly explaining the radial sub-cube generation process requires some notational definition. As was previously the case, $a_l$, $b_l$, and $c_l$ designate the lower order bits 10b of the respective a, b, and c components of input color space value. The value of the variable i will be used to designate the bit position within the lower order bits 10b ($a_l$, $b_l$, $c_l$), as shown below, for the case in which four bits are used to designate each component of the lower order bits 10b. The maximum value of i (a value of 3) corresponds to the most significant bit position of the lower order bits 10b. The minimum value of i (a value of 0) corresponds to the least significant bit position of the lower order bits 10b. As one of ordinary skill in the art will recognize, this notation is easily adapted for a different number of bits used for each component of the lower order bits 10b. For n bits used to represent the lower order bits 10b, the value of i ranges from n−1 to 0.

TABLE 2

| i: | 3 | 2 | 1 | 0 |
|---|---|---|---|---|
| $a_1$: | 1 | 0 | 1 | 0 |
| $b_1$: | 1 | 1 | 1 | 0 |
| $c_1$: | 0 | 0 | 1 | 1 |

Using this notation, the value of i indirectly indicates the iteration of the sub-cube generation. A value of i equal to 3, corresponds to generation of the first sub-cube. This first sub-cube includes vertex number 6 from the cube formed by accessing the values of cubic lattice 1 using the upper order bits 10a. For the value of i equal to 0, the fourth sub-cube is generated. This fourth sub-cube includes vertex number 1 from the third sub-cube generated. To determine the vertex number of the cube used to generate the sub-cube which is included within the sub-cube, the following equation is used:

$$v(i) = 4a_l(i) + 2b_l(i) + c_l(i) \qquad \text{eqn. 1a}$$

In equation 1a, v(i) represents the vertex number of the cube included within the generated sub-cube. Each of the $a_l(i)$, $b_l(i)$, and $c_l(i)$ represents the binary value associated with the "ith" position in the respective component of the lower order bits 10b. For each value of i, equation 1a yields the correct number of the vertex of the cube used to generate the sub-cube which will be included within the desired sub-cube. The values which i may assume include the integers from n−1 to 0 inclusive, where n is the number of bits used to specify each of the components of the lower order bits 10b of the input color space value. The value of the vertex having the number v(i) is designated by P[v(i)]. Equation 1a can be generalized for input color space value 10 formed from d components. Given below is a generalized expression for v[i]:

$$v[i] = 2^{d-1} \times 1b_1[i] + 2^{d-2} \times 1b_2[i] + 2^{d-3} \times 1b_3[i] + \ldots + 2^{d-d} \times 1b_d[i] \qquad \text{eqn. 1b}$$

In equation 1b, each of the "1b" represent the lower order bits 10b one of the d components of the input color space value 10. As in equation 1a, the values of i include the integers from n−1 to 0 inclusive.

The values associated with the eight vertices of the sub-cube are generated from the cube as shown in table 3. Those vertex values designated by P'[sub-cube vertex number] represent sub-cube vertex values and those vertex values designated by P [cube vertex number] represent the vertex values of the cube used to generate the sub-cube vertex values. A given value of a sub-cube vertex is generated by averaging the corresponding vertex value of the cube from which the sub-cube is generated with the value of the vertex of the cube used to generate the sub-cube included within the sub-cube (this is the value designated by P[v(i)].

TABLE 3

$P'[7] = (P[7] + P[v(i)]) \div 2$ $P'[6] = (P[6] + P[v(i)]) \div 2$ $P'[5] = (P[5] + P[v(i)]) \div 2$ $P'[4] = (P[4] + P[v(i)]) \div 2$ $P'[3]=(P[3]+P[v(i)])\div 2$ $P'[2]=(P[2]+P[v(i)])\div 2$ $P'[1]=(P[1]+P[v(i)])\div 2$ $P'[0]=(P[0]+P[v(i)])\div 2$ Shown in FIG. 6a through FIG. 6e is a graphical representation of multiple iterations of the sub-cube division process used in radial interpolation. The values used for the components of the lower order bits 10b of the input color space value in the example of FIG. 6 are the same as those shown in Table 2. The values of the vertices of the cube used for generation of the first sub-cube (these values are accessed using the higher order bits 10a of the input color space value) are loaded from a color table stored in memory. After the final iteration of sub-cube division, vertex number 0 of the final sub-cube is used as the result of the interpolation process. To prevent the accumulation of rounding errors during the actual computation of the sub-cube vertex values, the required division by 2 for each iteration of sub-cube generation is performed only on the values of the vertices of the final sub-cube generated. When the division is performed in this manner, the divisor used is $2^n$, where n is the number of bits assigned to each component of the lower order bits 10b. Division by $2^n$ can be performed easily by performing a right shift operation. For the case in which n=4, this divisor is 16. With the division operation not performed until after the generation of the final sub-cube vertex values, the sub-cube generation process reduces to a series of additions of selected vertex values of the generated sub-cubes.

Figure 7:
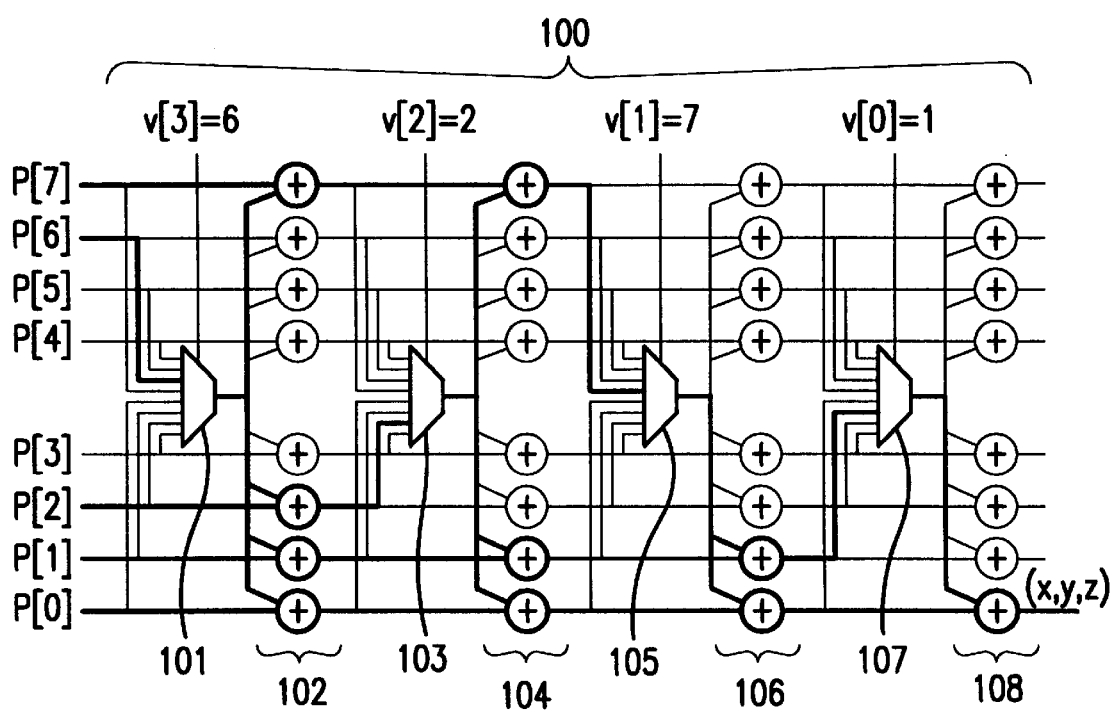
FIG. 7 shows a hardware implementation of a radial interpolator.

Shown in FIG. 7 is a hardware implementation of a radial interpolator 100. In addition, FIG. 7 illustrates the progression of the radial interpolation through radial interpolator 100 using values for v[i] corresponding to lower order bits 10b of table 2. Each of the values (P[0] through P[7]) associated with the eight vertices selected using upper order bits 10a is coupled to a multiplexer input of first multiplexer 101. The value of v[i], for i equal to 3, is coupled to the control input of first multiplexer 101. The value of v[i], for i equal to 3, is used to select the value associated with the vertex of the cube selected using upper order bits 10a that will be included in the first sub-cube generated. The output of first multiplexer 101 is coupled to a first input of each adder of a first set of adders 102 composed of eight adders. The second input of each adder of the first set of adders 102 is coupled to one of the values selected using upper order bits 10a. First multiplexer 101 and first set of adders 102 form a first stage of radial interpolator 100. It can be seen, that with this configuration of multiplexer 101 and first set of adders 102, the averaging operations of table 3 (without the division by two, which, as previously mentioned, is delayed until all the iterations of radial interpolation are completed) for a single iteration of radial interpolation are completed. A second, third, and fourth stage of radial interpolator 100 are formed from, respectively, a second multiplexer 103 and second set of adders 104, a third multiplexer 105 and third set of adders 106, and a fourth multiplexer 107 and fourth set of adders 108. The control inputs of the second 103, third 105, and fourth 107 multiplexer inputs are coupled to, respectively, v[i=2], v[i=1], and v[i=0]. The second, third, and fourth stages of radial interpolator perform successive iterations of radial interpolation with each iteration using the relationships of table 3 (again delaying the division by two until completion of all iterations).

Figure 8:
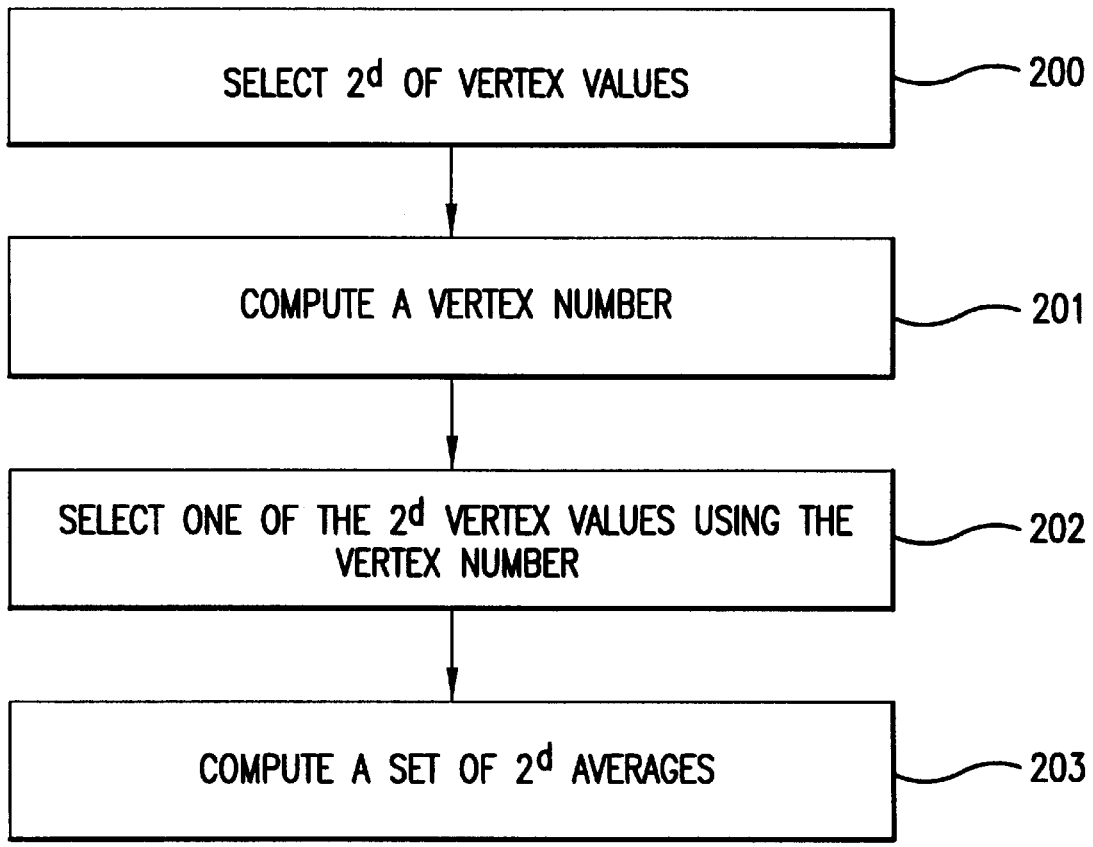
FIG. 8 is a high level flow diagram of a generalized method for performing radial interpolation.

Shown in FIG. 8 is high level flow diagram of a method for performing a single iteration of radial interpolation. First, $2^d$ of interpolation data values are selected 200 using upper order bits 10a. For the case in which the radial interpolation is used for color space conversion, the interpolation data values correspond to vertex values of the selected cube. In addition, for color space conversion d is typically equal to 3, the number of components of the input color space value 10. After vertex values are selected 200, the vertex number of the vertex value required for that iteration is computed 201. For d equals 3, equation 1 a is used to compute 201 the required vertex number. Depending on the iteration of radial interpolation, the value of i used to compute v[i] can range from i=3 to i=0. After computation 201 of the vertex number, one of the $2^d$ of interpolation data values is selected 202 using the computed vertex number. Finally a set of $2^d$ averages is computed 203 according to the relationships of table 3. To avoid rounding errors the required divisions by 2 for averaging are delayed until all iterations of interpolation are performed.

Figure 9:
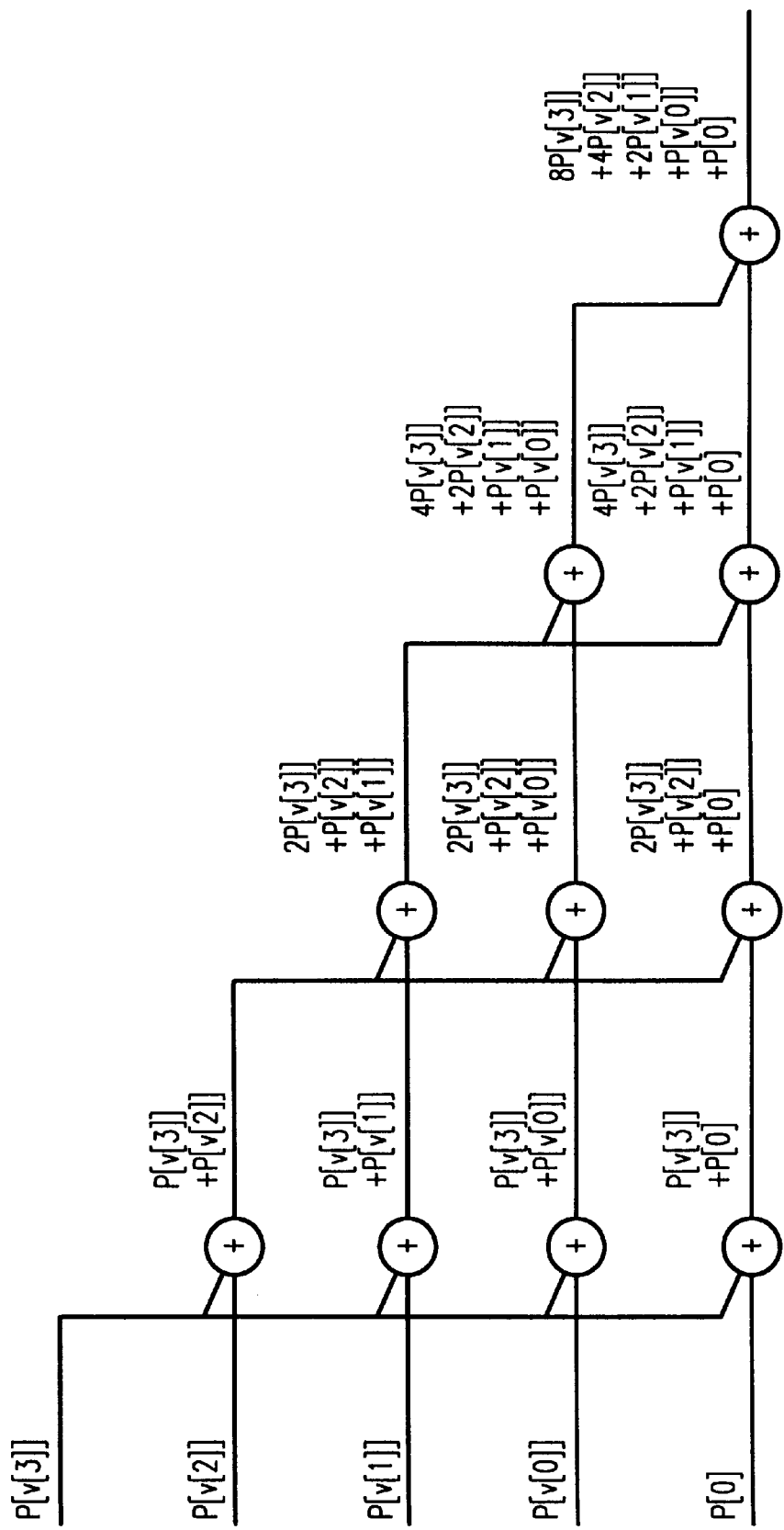
FIG. 9 is a diagrammatic representation of the computations required for generation of the sub-cubes in pruned radial interpolation.

It was recognized that the number of computations required to perform radial interpolation as shown in FIG. 7 could be substantially reduced. Examination of the radial interpolation process of FIG. 7 reveals that determination of the interpolation result does not require the use of all eight of the vertex values accessed by the upper order bits 10a, nor does it require the use of all the adders shown in FIG. 7. Shown in FIG. 9 is a diagrammatic representation of pruned radial interpolation. FIG. 9 can be understood by working backward from the interpolation result shown in FIG. 7 to determine the values of the vertices (accessed using the upper order bits 10a) that are required to generate the result. As previously mentioned, the value of vertex number 0 (P[0]) of the final sub-cube generated is used as the result of the interpolation. Using the equations listed in table 3 (without the division by 2), the vertices of the sub-cube immediately previous to the final sub-cube that are used to compute the value of vertex number 0 of the final sub-cube can be determined. Similarly, the equations listed in table 3 can be used to determine the vertices of the sub-cube two previous to the final sub-cube that are necessary to compute the needed vertices of the sub-cube immediately previous to the final sub-cube.

This method for determining the vertices of each of the sub-cubes necessary to compute P[0] of the final sub-cube is performed with each value of i from 0 to 3 for the case in which n=4. If this is done, the result shows that the values used to compute P[0] of the final sub-cube consist of only some of the values corresponding to the vertices of the cube accessed by the higher order bits 10a of the input color space value. As a result, only 10 of the 32 adders of FIG. 7 are used for computing a interpolation result from a given input color space value 10. For the values of the lower order bits 10b shown in table 2, the vertex numbers of the cube accessed by the higher order bits 10a to which the values used to compute P[0] of the final sub-cube correspond are: 0, 6, 2, 7, and 1. The values of the vertices of the cube accessed by the higher order bits 10b corresponding to this are: P[0], P[6], P[2], P[7], and P[1]. In general, the values of the vertices of the cube accessed using the higher order bits 10a that are used to compute P[0] of the final sub-cube are P[0], P[v(i=3)], P[v(i=2)], P[v(i=1)], P[v(i=0)]. The general expression which can be derived for n=4 is:

$$P[0]_{Final\ Sub-cube}=(\{8\times P[v(i=3)]\}+\{4\times P[v(i=2)]\}+\{2\times P[v(i=1)]\}+P[v(i=0)]+P[0])\div 16 \qquad \text{eqn. 2}$$

Equation 2 is an expression for computing a result using pruned radial interpolation with n=4. A generalized expression for the pruned radial interpolation is:

$$P[0]_{Final\ Sub\text{-}cube} = \left\{ \sum_{i=0}^{n-1} (2^i \times P[v(i)]) + P[0] \right\} \div 2^n \qquad \text{eqn. 3}$$

Equation 3 can be used to generalize the computation of the pruned radial interpolation result. It should be noted that in equation 2 and the generalized expression in equation 3, the value associated with vertex number 0 of the cube selected using higher order bits 10a is always used. Had the value of a vertex number other than vertex number 0 of the final sub-cube generated been used as the result of the interpolation, the value of that vertex number of the originally selected cube would be used in place of P[0].

The hardware functional blocks required to perform the pruned radial interpolation include adders and multiplexers. With D dimensions in the output color space and n bits representing each group of lower order bits 10b of the input color space value, the requirements of the hardware implementation of the pruned radial interpolation can be computed as:

# of Adders=$D \times (n+1)$ \qquad eqn. 4 # of Multiplexers=$D \times n$ \qquad eqn. 5

It should be noted that extra adder specified in equation 4 is used for the purpose of rounding. Additional operations which must be performed by the hardware include multiplication, division, and concatenation. The multiplication and division operations by a power of two can be performed by shifting bit positions. In hardware, this shifting is accomplished by connecting a line corresponding to a bit to a higher order position for multiplication or to a lower order position for division. In hardware, concatenation is accomplished by grouping lines, corresponding to bit positions, together. Therefore, the multiplication, division, and concatenation operations can be performed without the necessity of adding additional hardware.

To generate the gate level design necessary to implement the pruned radial interpolation in hardware, a commonly used hardware description language, such as VHDL, may be used. Included in FIG. 39 is a listing of the VHDL code which can generate a hardware implementation of pruned radial interpolation.

Figure 10:
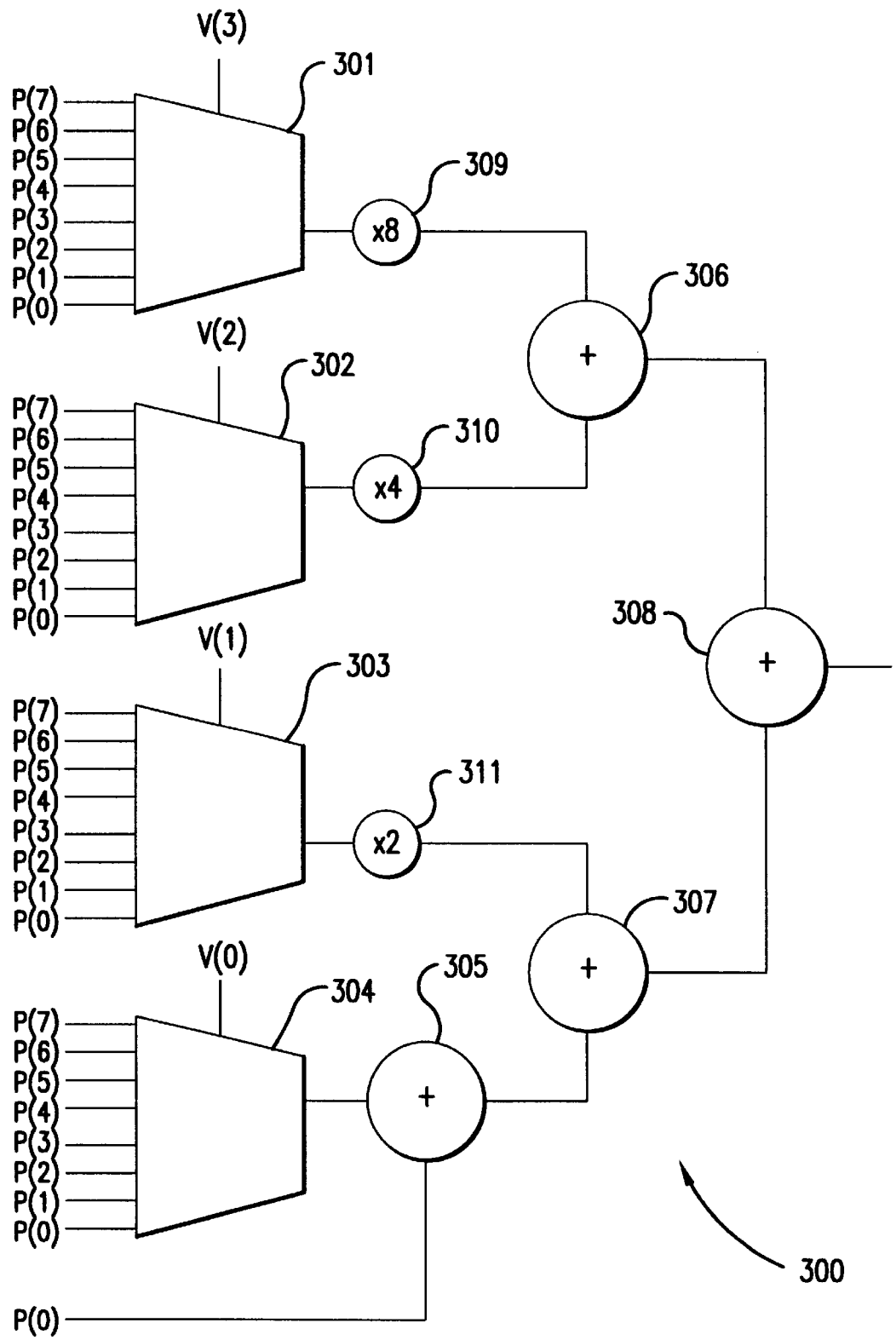
FIG. 10 shows a hardware implementation of pruned radial interpolation.

Shown in FIG. 10 is a hardware implementation of a pruned radial interpolator 300 for n equal to 4. It should be noted that the hardware implementation shown in FIG. 10 can be used to generate a single component of the output color space value 11. This same hardware could be used repetitively for an additional (D−1) passes to generate the remaining D−1 components of the output color space value 11. Or, there could be an additional (D−1) replications of the hardware implementation shown in FIG. 10 to generate each of D components simultaneously. Pruned radial interpolator 300 is a hardware implementation of equation 2 without the division by 16. The division by 16 could be accomplished by bit shifting the result of the additions. Selection of four of the five vertex values (P[6], P[2], P[7], and P[1]) used to compute the interpolation result requires four multiplexers 301–304.

The four required additions are accomplished using four adders 305–308. The fifth vertex value required for computation of the interpolation result, P[0], is hard wired into the inputs of one of the adders. It should be noted that because of the associative property of addition, the hardware implementation of FIG. 10 may be implemented so that the additions are performed in a number of different orders. The order shown in FIG. 10 minimizes propagation delay through the adders. Furthermore, other means for adding may be used. For example, a single adder that had a sufficient number of inputs could be used. Or, a microprocessor could be used to accomplish the additions.

The three multiplication operations 309–311 correspond to multiplication by the coefficients 8, 4, and 2 of the first three terms on the right side of equation 2. It should be noted that multiplication operations 309–311 are accomplished in hardware by routing of the lines corresponding to the bit positions on each of the respective multiplexer outputs. Therefore, these multiplications are implemented without additional hardware cost. It is possible to implement the multiplications through the routing of lines because all of the coefficients are powers of 2.

One of ordinary skill in the art will recognize that the hardware implementation shown in FIG. 10 is adaptable for values of n greater than 4 or less than 4. Consider the hardware implementation of a pruned radial interpolator for n equal to 1. This hardware implementation of pruned radial interpolation would be useful for an interpolation which performs a single iteration of cube subdivision and then selects one of the vertex values of the generated sub-cube as the interpolation result. This hardware implementation of pruned radial interpolation requires only a single multiplexer and a single adder (of course the rounding at the end requires an additional adder but this additional adder is not shown in FIG. 10).

Figure 11:
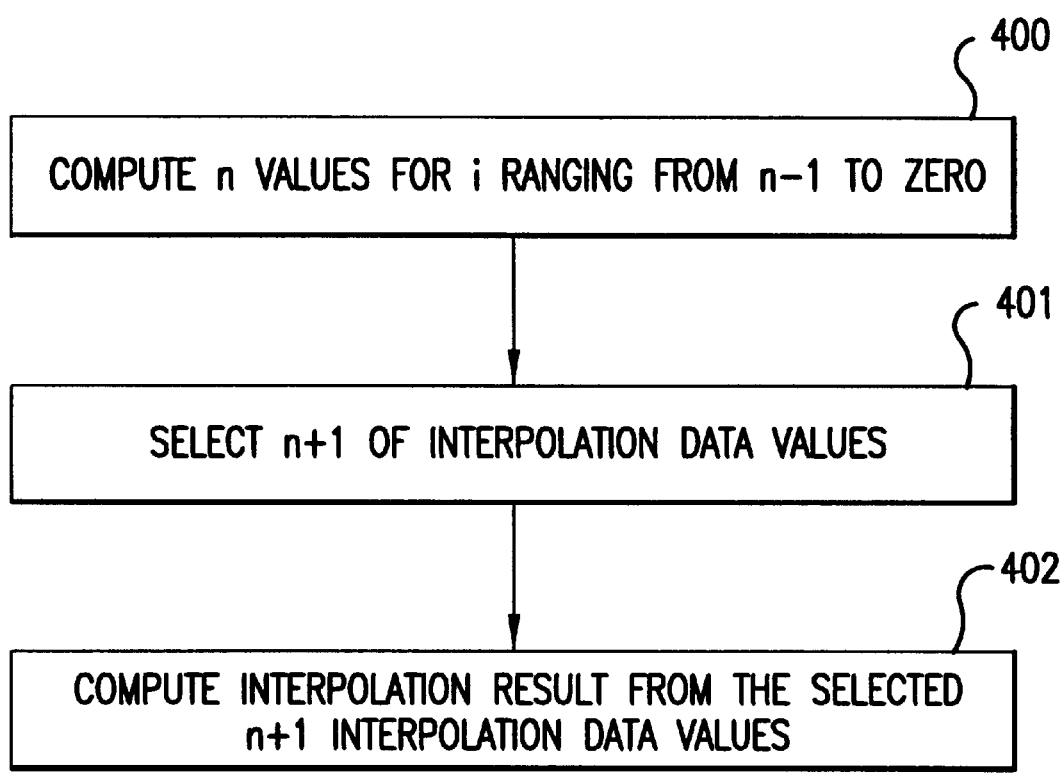
FIG. 11 is a high level flow diagram of a generalized method for performing pruned radial interpolation.

Shown in FIG. 11 is a high level flow diagram of a generalized method of pruned radial interpolation for input color space values 10 having d components with each set of lower order bits 10b having n bits. First, n values are computed 400 using equation 1b, Next, n+1 interpolation data values (which correspond to vertex values in a color space conversion) are selected 401 using the computed n values and higher order bits 10a. Finally, the interpolation result is computed 402 by multiplying and adding the selected n+1 interpolation data values according to equation 3.

A software implementation of the pruned radial interpolation is computationally very efficient. With d input dimensions, D output dimensions and $2^n$ values between vertices of cubic lattice 1, the number of computations required to generate an interpolation result can be computed as:

# of ALU operations=$2 \times n \times (d+D-1)+D$ \qquad eqn. 6

The number of memory accesses required to generate the interpolation result can be computed as:

# of memory accesses=$D \times (n+1)$ \qquad eqn. 7

It should be noted that, unlike many other interpolation methods, both the number of ALU operations and the number of memory accesses are linear in D, d, and, n which results in the relative computational efficiency of pruned radial interpolation.

Figure 12:
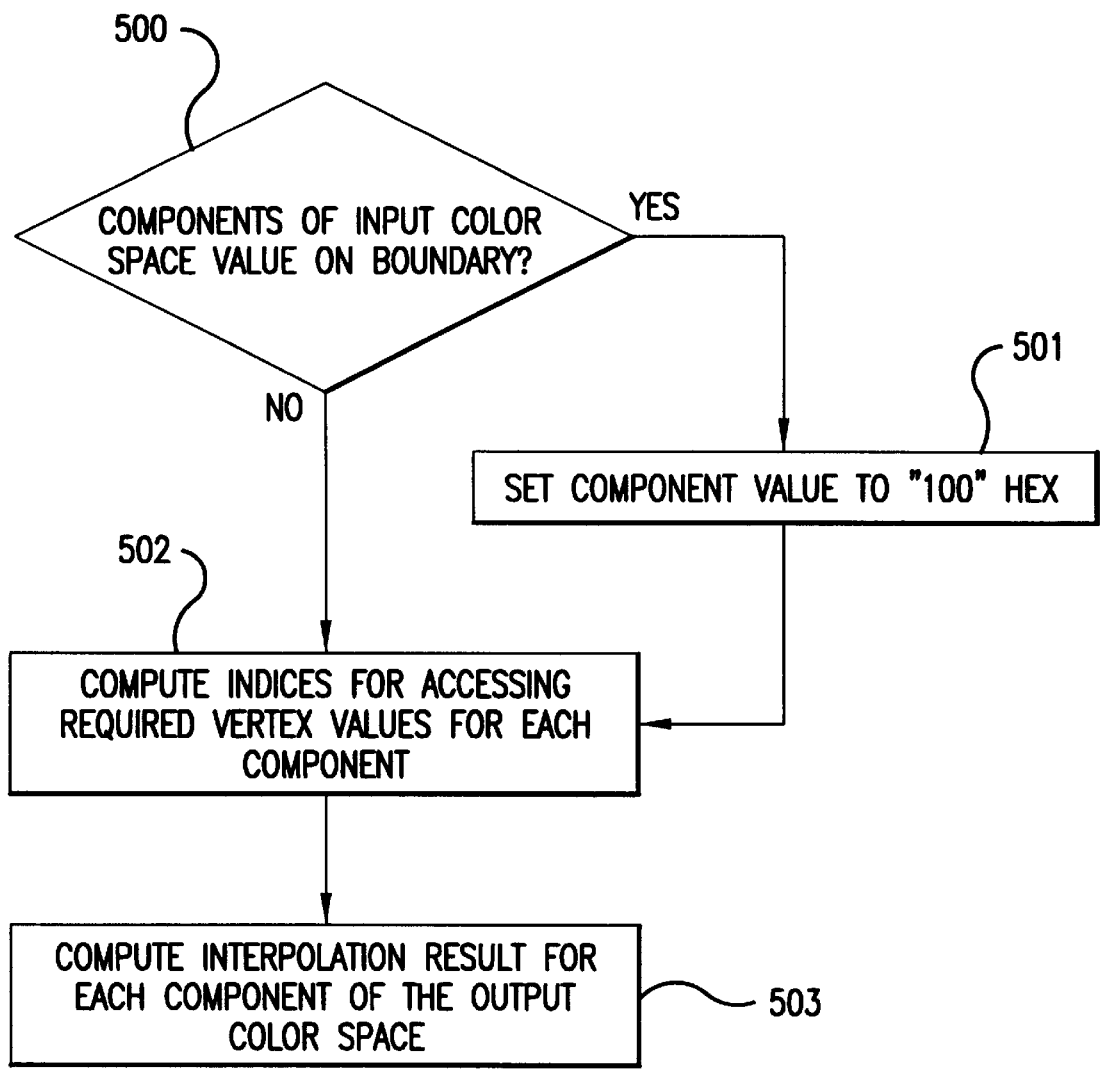
FIG. 12 is a high level flow diagram of a method implemented in software for performing pruned radial interpolation.

Shown in FIG. 12 is a high level flow diagram of a method implemented in software to perform the pruned radial interpolation. First, a determination 500 is made if any one of the components of the input color space value (a, b, c) 10 corresponds to a location on an outer boundary of the cubic lattice 1. This is the case if any one or more of the components of the input color space value has a value of FF hexadecimal. If this is the case, then, for purposes of generating the index into the cubic lattice 1 to retrieve the necessary vertex values, the components of the input color space value 10 which have a value of FF hexadecimal are assigned 501 a value of 100 hexadecimal.

Assignment of a value of 100 hexadecimal to those input color space values of FF hexadecimal is done to address a special case in the interpolation. To illustrate this special case, consider the representation of the input color space values 10 by eight bits for each component, with each component partitioned into four upper order bits and four lower order bits. With this partitioning, the higher order bits can form the index values 00, 10, 20, 30, . . . F0 hexadecimal for each component. The four lower order bits for each component will be used to interpolate between the output color space values 11 accessed using the index values. The difference between the pair of output color space values 11 accessed using successive index values from 00 hexadecimal to F0 hexadecimal is spanned in 16 equal increments. With each successive increment, the associated value is increased $1/16$ of the difference between the accessed pair of output color space values 11, when going from the lower output color space value to the higher output color space value. For example, after 5 increments, the associated value is $5/16$ of the difference between the accessed pair of output color space values 11. Using the four lower order bits, the value associated with the corresponding number of increments is added to the output color space value 11 selected using the higher order bits to generate the interpolation result. However a problem arises between index values F0 and FF (index value 100 does not exist in the table) for each component of the input color space value 10. Between F0 and FF there are only 15 increments and the output color space value 11 accessed by FF corresponds to an outer boundary of the output color space. However, the interpolation process is designed to operate on 16 increments between the output color space values 11 accessed using the index values. To address this problem, the output color space values 11 corresponding to the index value FF are mapped to a location having and address of 100 hexadecimal. This mapping effectively distributes the difference in the output color space values 11 corresponding to index values F0 and FF hexadecimal over 16 increments instead of 15. Because of this, there will be slight errors resulting from the interpolation between index values F0 and FF. Although not shown in the hardware block diagrams, the handling of this special case in the interpolation is performed in the hardware implementations of the various interpolator embodiments.

After any necessary reassignment of input color space value 10, the indices used to access the values corresponding to the required vertices of the selected cube in cubic lattice 1 are computed 502. Finally, the values for each component of the output color space value (x, y, z) 11 are computed 503. Provided in FIG. 38 of this specification is the code of an implementation in C, for n=4, of the high level method of pruned radial interpolation shown in FIG. 12.

It should be recognized that a number of possible processor specific optimizations of the software for performing pruned radial interpolation can be performed. For example, by combining all the components of each output color space values 11 into a single word, the number of memory accesses required to perform the conversion to the output color space value 11 can be reduced. Another possible optimization exploits the ability of the ALU to perform 32 bit operations. By assigning bits 0–7 of an ALU word to handle the computation of the y component of the output color space value and bits 16–23 to handle the computation of the x component of the output color space value, a single sequence of shifts and adds can be used to generate the x and y components in parallel. It is also possible to implement pruned radial interpolation in hardware. The computational efficiencies which existed in the software implementation of pruned radial interpolation are present in the hardware implementation as reduced hardware requirements.

Tetrahedral interpolation partitions the cube accessed by the higher order bits 10a of the color space input value into a number of tetrahedrons used for generation of the sub-cube containing the result of the interpolation. The resulting sub-cube is then partitioned into tetrahedrons. Two of these tetrahedrons are then used to generate yet another sub-cube containing the result of the interpolation. The successive division of generated sub-cubes into tetrahedrons is performed n times, where n is the number of bits used to represent each of the components of the lower order bits 10b of the input color space value 10.

Figure 13:
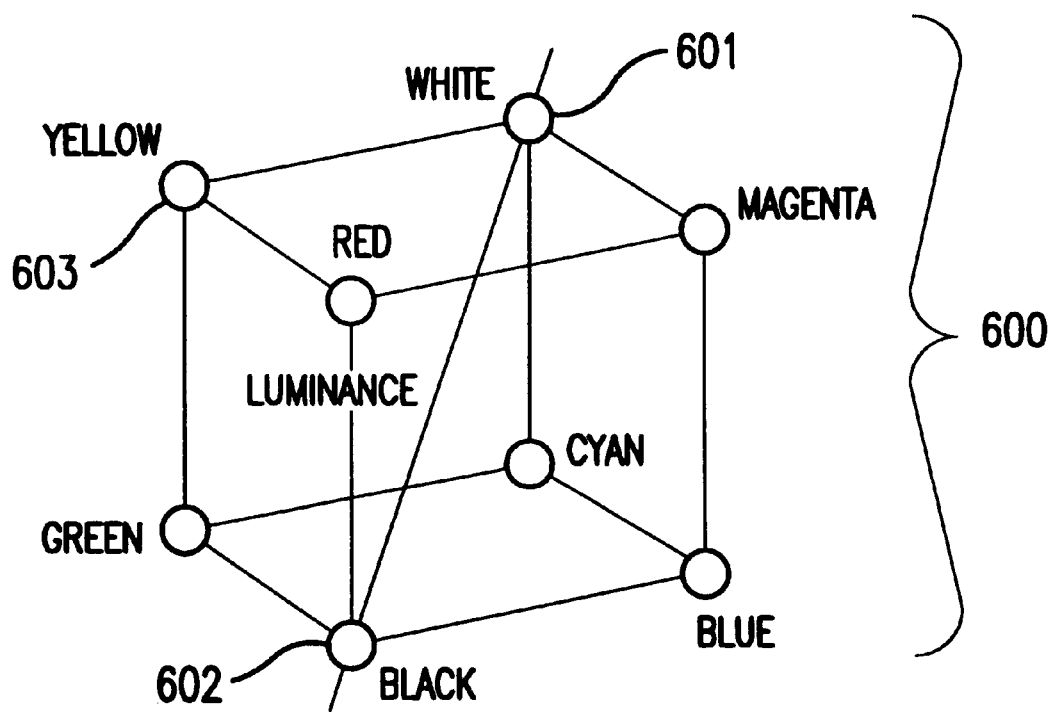
FIG. 13 is a representation of the outer bounds of a CMY and a RGB color space showing the colors at the outer bounds of the color spaces.

Shown in FIG. 13 is representation of the outer bounds of a CMY or a RGB color space. As can be seen from FIG. 13, the vertices of the cube 600 formed by the outer bounds of these color spaces include values corresponding to the constituent colors of each of the color spaces. A characteristic of the CMY and RGB color spaces is that the diagonal connected between the white 601 and black 602 vertices of the color space corresponds to the luminance axis. Points along the luminance axis have values which correspond to various shades of gray. As previously mentioned, the higher order bits 10a of the input color space value 10 are used to access eight associated values forming a cube located within cube 600. Analogous to the cube 600 representing the CMY or RGB color space, each of the selected cubes can be regarded as a kind of miniature color space, with the values corresponding to each of the eight vertices having colors which are weighted toward the colors of the corresponding vertices of cube 600. For example, the vertex of the selected cube spatially corresponding to the yellow vertex 603 is the vertex having a value closest to the value for the color yellow within in the selected cube. The other seven vertices of the selected cube can be viewed similarly. The diagonal connecting vertex 0 and vertex 7 serves to define a constant chromance line between the colors associated with the vertices of the selected cube.

Certain artifacts can arise from the reproduction of colors in the printing process. These artifacts are visually perceptible as colors which deviate from those specified by the color space value input to the printing process. The artifacts are particularly noticeable for input color space values located near the luminance axis. Input color space values near the luminance axis correspond to shades of gray with small amounts of color. Factors in the color reproduction process which may push the resulting color farther off the luminance axis than intended are easily perceived in a gray field. The artifacts appear as colors in fields which should include only various shades of gray along the luminance axis. The artifacts can arise from, among other things, the characteristics of the process used for printing (such as an electrophotographic or inkjet printing process) or characteristics of the colorants (such as toner or ink) used in the printing process. Variability in the parameters of the printing process result in the reproduction of colors off the luminance axis when the result should have been gray.

Tetrahedral interpolation, in some circumstances, reduces the degree to which these types of artifacts are perceivable. The reduction in print artifacts occurs because the value of one vertex of the sub-cube generated from the tetrahedron is computed using the values associated with vertex number 0 and vertex number 7. As previously mentioned, the diagonal formed between vertex number 0 and vertex number 7 defines a constant chromance line for the selected cube.

Computing a vertex of the sub-cube along this mid-point color boundary line produces a weighting in the interpolation which tends to reduce the rate of change in the output color space value as the input color space value 10 moves off the diagonal of the cube selected by the higher order bits 10a. This in turn tends to somewhat compensate for the variability in printing process parameters which produce non-gray output with gray input color space values.

Figure 14:
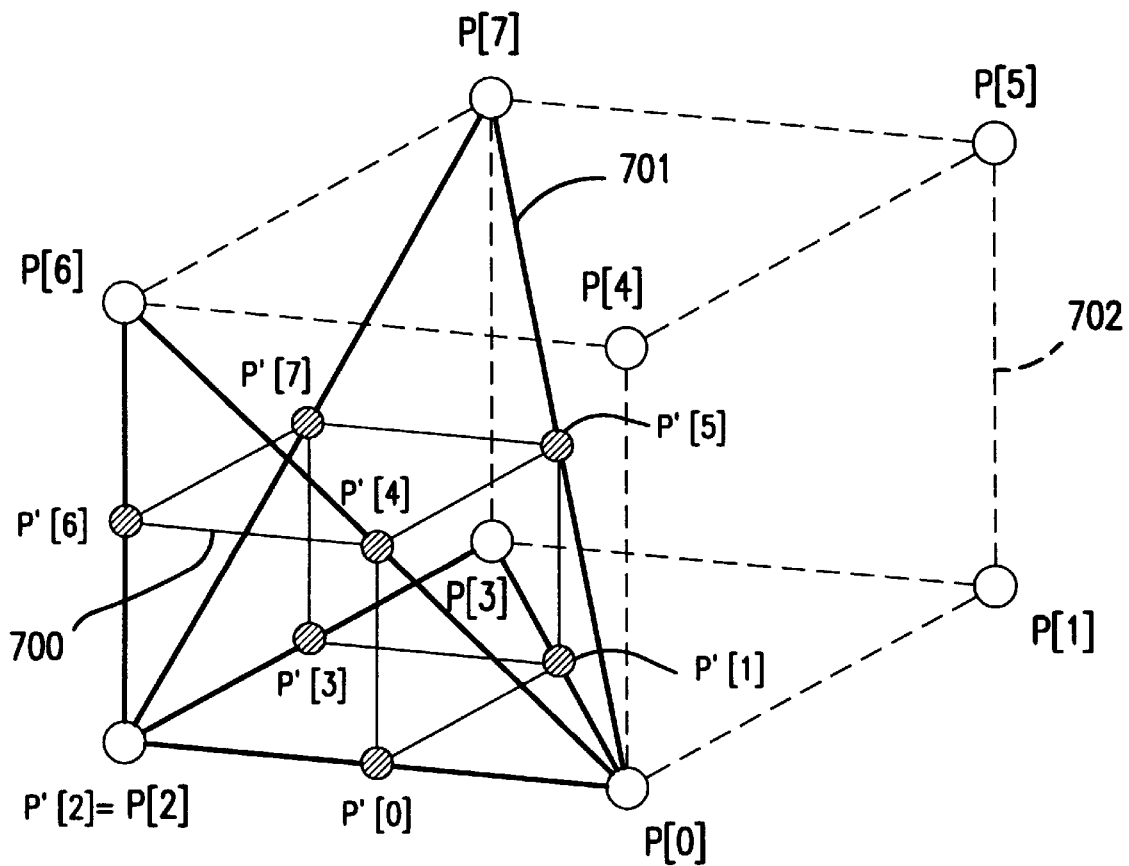
FIG. 14 is a graphical representation of the generation of a sub-cube from two tetrahedrons.

Shown in FIG. 14 is a graphical representation of the generation of a sub-cube 700 from a tetrahedron 701. Each value of a vertex of the tetrahedron 701 used to compute the value of a vertex of the sub-cube 700 is also a value of a vertex of the cube 702 from which the tetrahedron 701 was partitioned. Let P[k] denote the value associated with vertex k of a cube. Let P'[k] denote the value associated with vertex k of a sub-cube included within the cube having vertex k. It can be shown that the value P'[k] is computed as:

$$P'[k] = \{P[k \& v(i)] + P[k|v(i)]\} \div 2 \qquad \text{eqn. 8}$$

"&" represents the bitwise AND operation
"|" represents the bitwise OR operation
"k" represents the vertex number
$v(i) = 4 \times a(i) + 2 \times b(i) + c(i)$
i represents the bit position in the lower order bits 10b in the input color space value The sub-cube generation that can be accomplished using equation 8 provides a new method of computing vertex values for a tetrahedral interpolation. By using equation 8, the indices used to access the values of the vertices used for computing the sub-cube vertex values can be computed. This provides an advantage over interpolation methods that require accessing of a look-up table in order to determine the indices used to access the vertex values. The use of a look-up table requires memory accesses. As a result, using a look-up table to generate the indices requires a significantly greater number of machine cycles than would be required using the processor to compute the indices. Therefore, using equation 8 to compute the indices used to access the vertex values provides a substantial speed advantage in tetrahedral interpolation over previous methods of performing tetrahedral interpolation. Furthermore, implementing equation 8 in hardware for computation of the multiplexer control inputs used to select the vertex values provides a simpler hardware implementation of tetrahedral interpolation.

Figure 15:
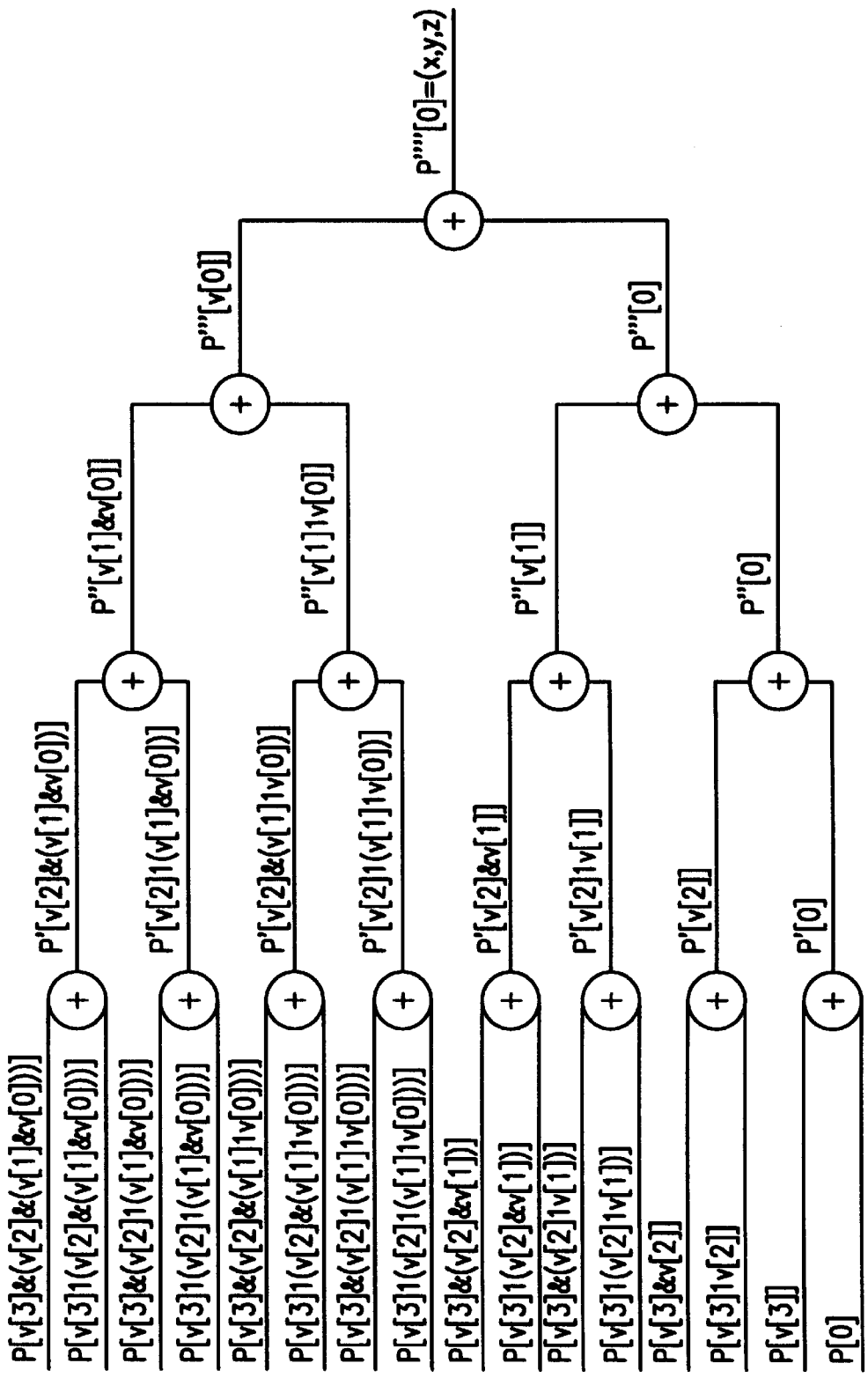
FIG. 15 is a diagrammatic representation of the computations required for generation of the sub-cubes in pruned tetrahedral interpolation.

As was the case for pruned radial interpolation, the value of vertex number 0 of the last sub-cube generated is the result in the tetrahedral interpolation. It was recognized that not all the values of the vertices of all of the sub-cubes generated were required to generate the result of the interpolation. This led to the development of a further improvement in tetrahedral interpolation referred to as pruned tetrahedral interpolation. Shown in FIG. 15 is a diagrammatic representation of pruned tetrahedral interpolation. In FIG. 15, the prime indicator associated with the term representing the value of each vertex indicates the level of sub-cube generation. For example, terms designated as P'[ ] represent vertex values after the first cube subdivision iteration, terms designated as P"[ ] represent vertex values after the second cube subdivision iteration. This method of designating vertex values applies for the generation of successive sub-cubes. FIG. 15 represents the pruned tetrahedral interpolation using 4 bits for the lower order bits 10b of the input color space value 10. The terms shown in FIG. 15 can be generated by starting with the end result of the interpolation P""[0], and determining, successively, using equation 8, the values of the vertices of the previous sub-cube required to generate the values of the vertices of the current sub-cube until the values required to generate the current sub-cube are obtained by accessing the values of the vertices in cubic lattice 1 using higher order bits 10a. As was the case for pruned radial interpolation, the divide by 2 operation is not performed until the value of vertex number 0 of the final sub-cube is obtained in order to prevent the accumulation of rounding errors.

Pruned tetrahedral interpolation provides a substantial computational savings over tetrahedral interpolation. With d input dimensions, D output dimensions, and n lower order bits 10b, the number of computations required to perform the pruned tetrahedral interpolation is computed as:

$$\text{\# of ALU Operations} = n \times [(2 \times d) - 1] + 2 \times \left[ \sum_{i=1}^{n-1} (2^i - 1) + D \times (2^n + 1) \right] \qquad \text{eqn. 9}$$

$$\text{\# of Memory Accesses} = D \times [\min(2^d, 2^n)] \qquad \text{eqn. 10}$$

It should be noted that, for these equations, the computations vary linearly as a function of d and D for the number of ALU operations, exponentially as a function of d for the number of memory accesses, and exponentially as a function of n for the number of memory accesses. As shown in FIG. 15, pruned tetrahedral interpolation is implemented so that $2^n$ memory references are required. However, it is possible to implement pruned tetrahedral interpolation so that the number of memory references required is a maximum of $2^d$, which for d=3, is the number of vertices within a cube. This is done by recognizing that redundancy exists in the $2^n$ memory accesses. By using some of the accessed vertex values for multiple of the input values required in FIG. 15 fewer memory accesses are required. Comparing equations 9 and 10 with equations 4 and 5 it can be seen that, with all other things equal, pruned tetrahedral interpolation is more computationally costly than radial interpolation.

Figure 16:
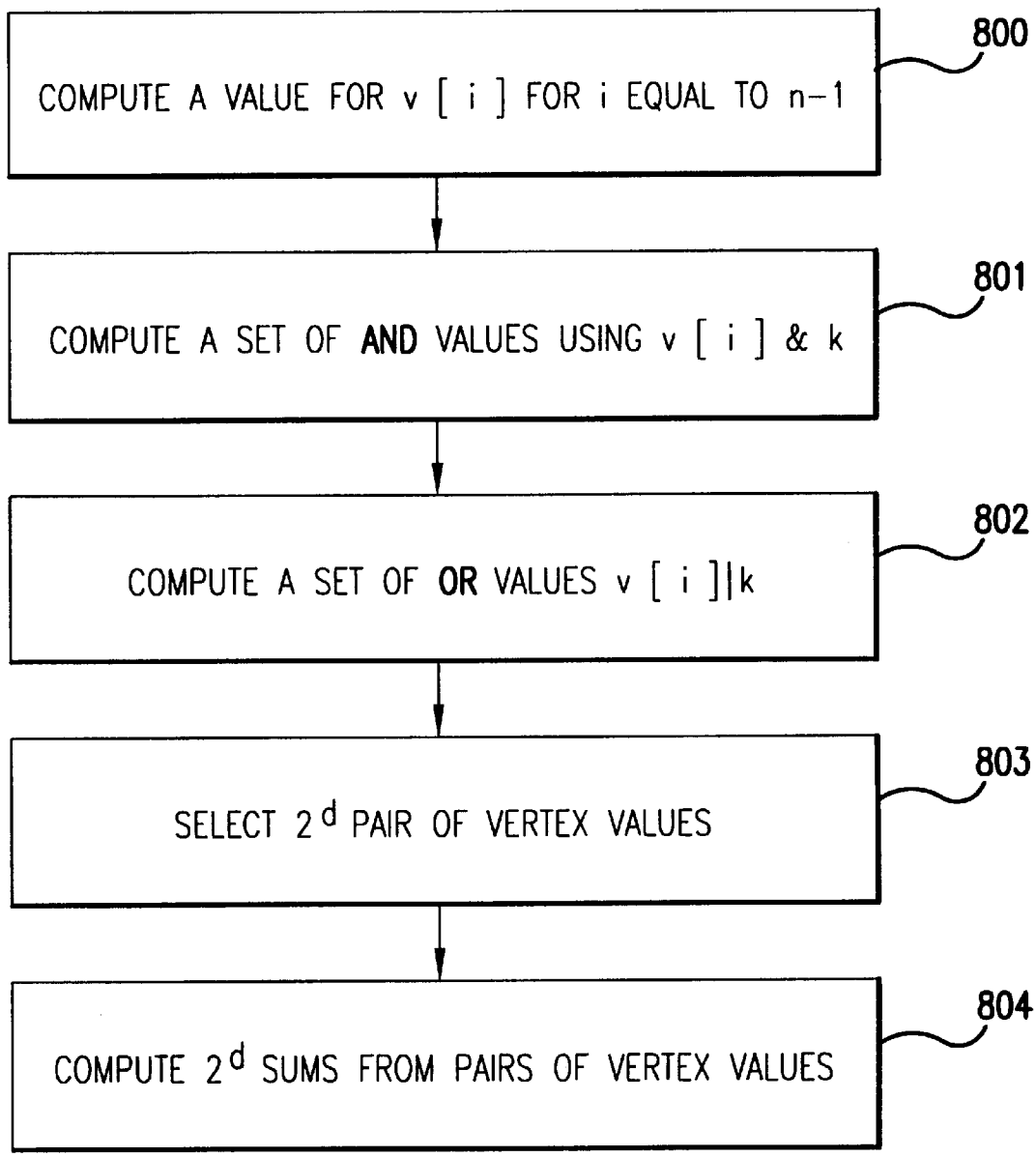
FIG. 16 is a high level flow diagram of a generalized method for performing tetrahedral interpolation.

Shown in FIG. 16 is a high level flow diagram of a generalized method for performing tetrahedral interpolation. For this method, the input color space values 10 are formed of d components. Each of the d components is partitioned into a set of higher order bits 10a and lower order bits 10b. Each of the d sets of lower order bits 10b is formed of n bits. The d sets of lower order bits are each designated as $1b_1$, $1b_2, 1b_3, \ldots, 1b_d$. The bit position of each of the lower order bits is designated from the most significant bit to the least significant bit by a value of i ranging, correspondingly from n−1 to 0. First, a value is computed 800 according to $v[i] = 2^{d-1} \times 1b_1[i] + 2^{d-2} \times 1b_2[i] + 2^{d-3} \times 1b_3[i] + \ldots + 2^{d-d} 1b_d[i]$ for i equal to n−1. Next, a set of AND values is computed 800 according to v[i] & k, for the value of k ranging from $2^d - 1$ to 0, where "&" represents the bitwise AND operation. Then, a set of OR values is computed 802 according to v[i]|k for the value of k ranging from $2^d - 1$ to 0, where "|" represents the bitwise OR operation. Next, $2^d$ pairs of the vertex values are selected 803 using the set of AND values and the set of OR values. Each of the pairs are selected using an AND value and an OR value computed for a corresponding value of k. Finally, a set of $2^d$ sums is computed 804 by summing each of the $2^d$ pairs of vertex values.

The method shown in FIG. 16 is for a single iteration of tetrahedral interpolation. Performing successive iterations would require computing additional values of v[i], computing additional AND and OR values, selecting values from $2^d$ sums computed in the previous iteration using the additionally computed AND and OR values, and computing additional sets of $2^d$ sums. After the final iteration of tetrahedral interpolation, each of the final $2^d$ sums is divided by $2^n$ (not shown in FIG. 16), where n is the number of iterations, and one of the resulting values is selected as the result of the interpolation. The division by $2^n$ is done after the final iteration, instead of dividing by two after each iteration, to prevent round-off error accumulation.

Figure 17A:
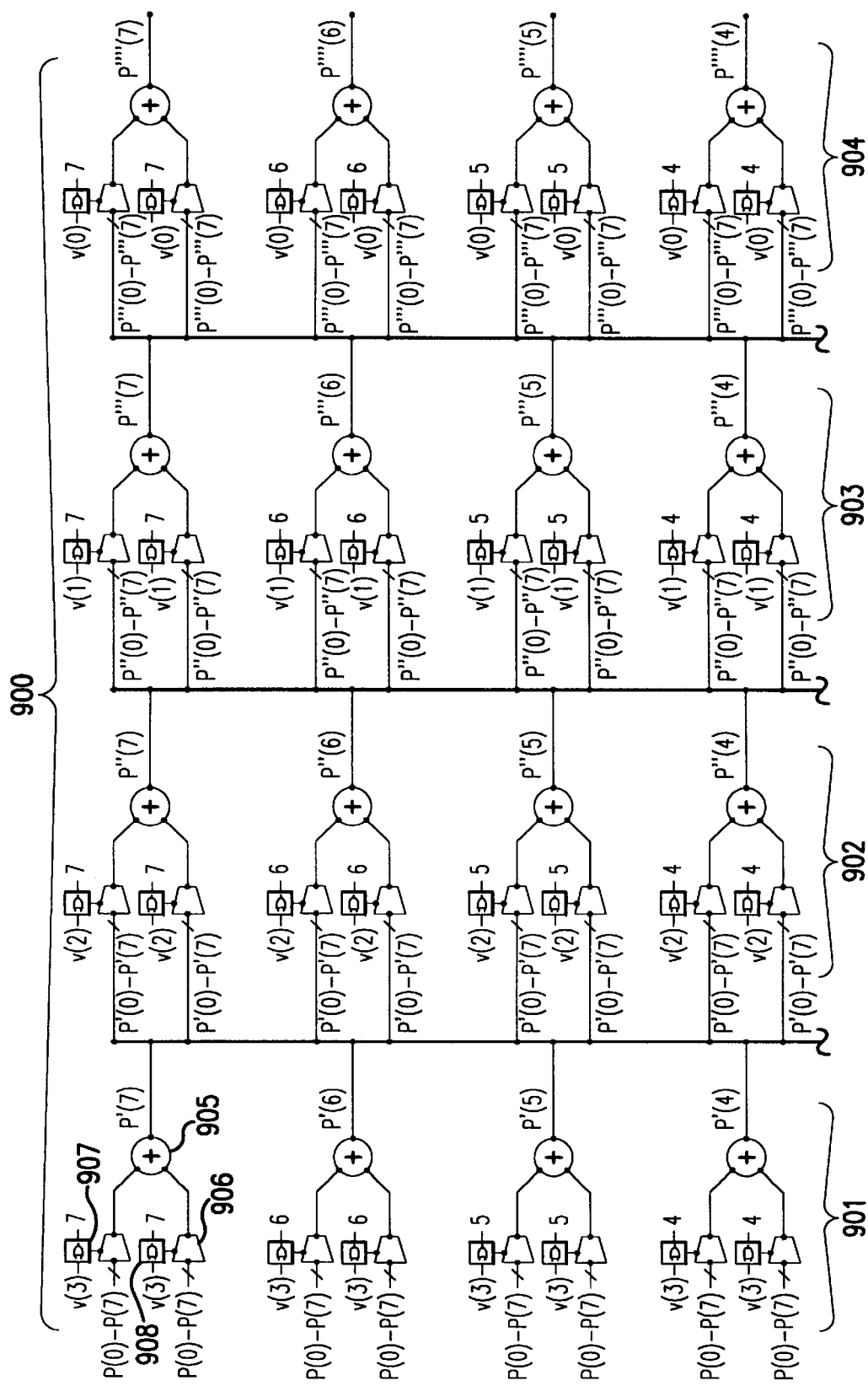
FIG. 17 shows a hardware implementation of tetrahedral interpolation.
Figure 17B:
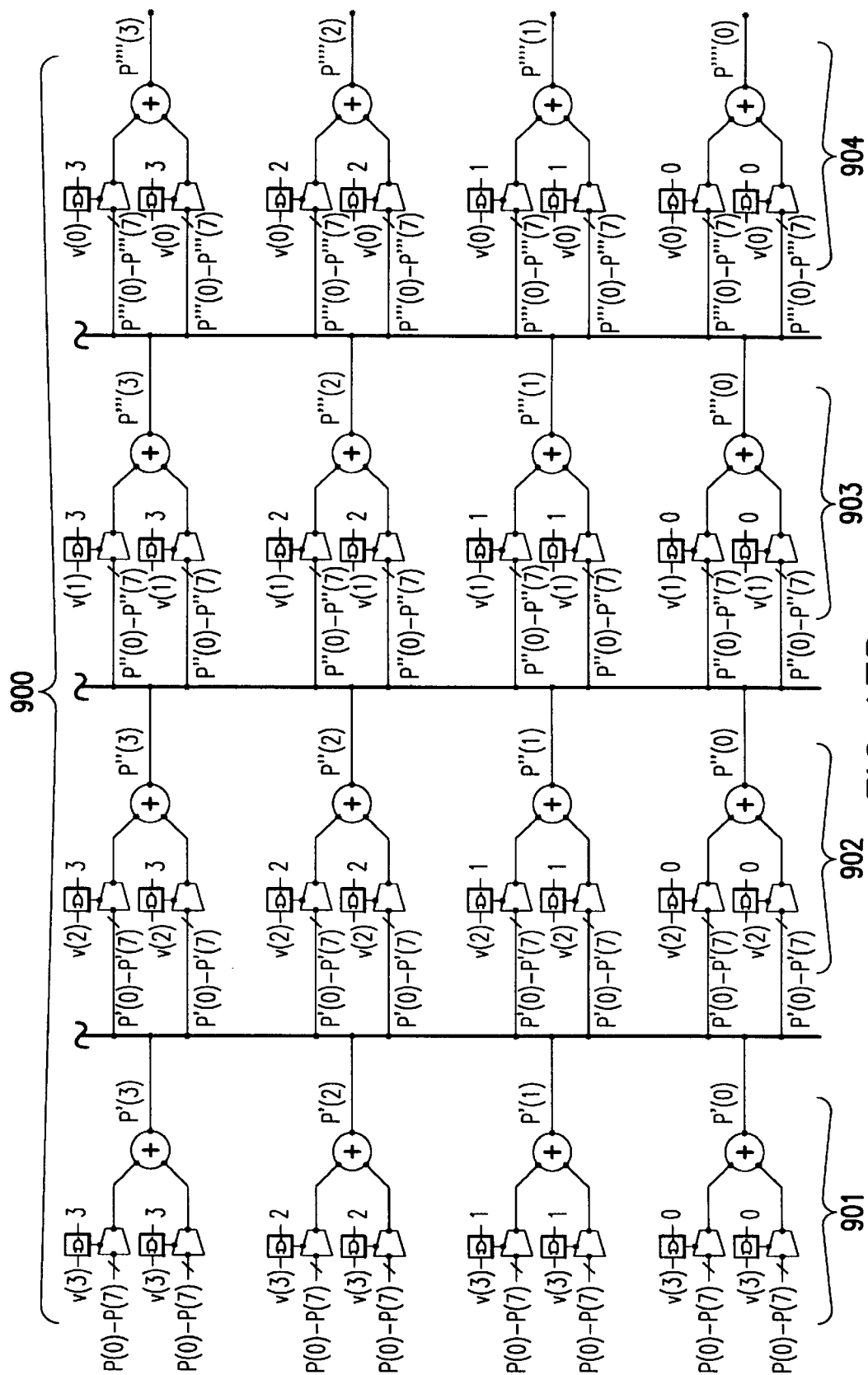

Shown in FIG. 17 is a hardware implementation of a tetrahedral interpolator 900 for conversion of input color space values 10 to a component of output color space values 11. This same hardware could be used repetitively for an additional (D−1) passes to generate the remaining D−1 components of the output color space value 11. Or, there could be an additional (D−1) replications of part of the hardware implementation shown in FIG. 17 to generate each of D components simultaneously. The hardware used for generating multiplexer control inputs could be used for each of the D replications. The tetrahedral interpolator 900 shown in FIG. 17 corresponds to d=3 and n=4 for the input color space value 10. The hardware implementation shown in FIG. 17 implements equation 8 for the generation of the sub-cube vertex values. The tetrahedral interpolator 900 of FIG. 17 is formed from a first, second, third, and fourth stage 901–904. Each of the four stages 901–904 includes $2^3$ adders, one of which is labeled as 905. Each of the four stages 901–904 further includes $2 \times 2^3$ multiplexers, one of which is labeled as 906, arranged as $2^3$ pairs of multiplexers. Finally, each of the four stages 901–904 includes $2^3$ bitwise OR blocks, one of which is labeled as 907, band $2^3$ bitwise AND blocks, one of which is labeled as 908.

Each of stages 901–904 performs an iteration of interpolation. Some interpolation applications may require that only a single iteration of interpolation be performed. For a single iteration of interpolation n=1. This corresponds to a hardware implementation of tetrahedral interpolator 900 using only first stage 901. An additional stage would be added for each additional iteration of interpolation required for the particular application.

Each of the inputs of the multiplexers in the first stage 901 are connected to the eight vertex values selected using higher order bits 10*a*. The two outputs of each pair of multiplexers in first stage 901 are connected to the first and second inputs of the corresponding adder. The output of each of the adders of the first stage 901 is the vertex value of the first sub-cube. As previously mentioned, the division by two for each iteration of sub-cube generation is deferred until the last sub-cube is generated. The vertex values of the last sub-cube generated are divided by $2^n$, where n is the number of bits in the lower order bits of the input color space value and n corresponds to the number of stages in the tetrahedral interpolator. The inputs of each multiplexer for the second, third, and fourth stages 902–904 are coupled to the outputs of the adders of the previous stage.

The control input of one the multiplexers of each pair of multiplexers is connected to the output of a bitwise OR block. The control input of the other one of each pair of multiplexers is connected to the output of a bitwise AND block. The multiplexers used in the tetrahedral interpolator 900 have the capability to select one of eight, eight bit values using a three bit control input. The bitwise OR blocks and the bitwise AND blocks each perform, respectively, bit by bit OR operations or AND operations on the values input to them. For this d=3 implementation of tetrahedral interpolator 900, each of the inputs to the bitwise OR blocks and bitwise AND is a 3 bit quantity. The output of each of the bitwise OR blocks and bitwise AND blocks to each of the multiplexers is a 3 bit quantity. The adders associated with each pair of multiplexers performs an addition of the selected eight bit values from each of the multiplexers.

As indicated by equation 8, the vertex number corresponding to the vertex value generated is connected to one of the inputs for each corresponding bitwise OR block and bitwise AND block. Because these values are fixed they can be hardwired to the correct values. The other inputs for each corresponding pair of bitwise AND blocks and bitwise OR blocks in a stage are connected to the value of v[i] corresponding to the stage. For the first stage 901, the value is v[3]. For the second stage 902, the value is v[2]. For the third stage 903, the value is v[1]. For the fourth stage 904, the value is v[0].

Interpolation is performed by supplying the vertex values selected using higher order bits 10*a* to the multiplexer inputs of the first stage 900 and supplying the appropriate v[i] values to the bitwise OR blocks and bitwise AND blocks of each stage. The tetrahedral interpolator 900 computes the vertex values for four iterations of sub-cube generation. The values P""(7) through P""(0) are the values of the vertices of the fourth sub-cube generated. In this embodiment, P""(0) is selected, divided by 16, and used as the result of the interpolation. The division by 16 is implemented by shifting bits and is not represented in FIG. 17.

One of ordinary skill in the art will recognize that one of the other computed values P""(7) through P""(1) may be selected, divided by 16, and used as the result of the interpolation. Using values corresponding to different vertices of the final sub-cube to generate the interpolation result will bias the result of the interpolation differently. This is a consideration in selecting which vertex value of the final sub-cube generated will be divided by 16 to generate the result of the interpolation.

Figure 18:
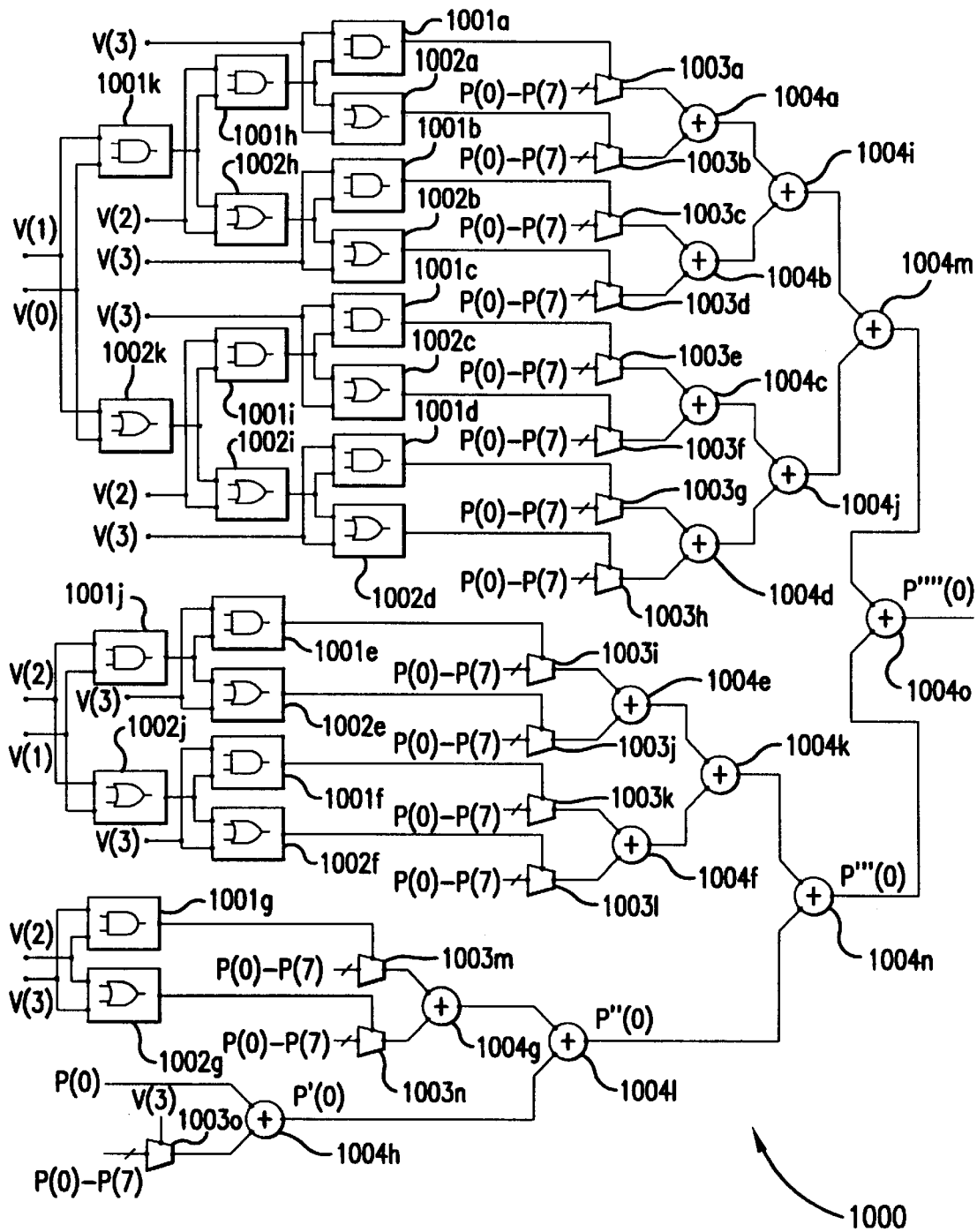
FIG. 18 shows a hardware implementation of pruned tetrahedral interpolation.

Shown in FIG. 18 is a hardware implementation of a pruned tetrahedral interpolator 1000 for conversion of input color space values 10 to a component of output color space values 11. This same hardware could be used repetitively for an additional (D−1) passes to generate the remaining D−1 components of the output color space value 11. Or, there could be an additional (D−1) replications of part of the hardware implementation shown in FIG. 18 to generate each of D components simultaneously. The hardware used for generating multiplexer control inputs could be used for each of the D replications. The pruned tetrahedral interpolator 1000 shown in FIG. 18 corresponds to d=3 and n=4 for the input color space value 10. The pruned tetrahedral interpolator 1000 implements the diagrammatic representation of pruned tetrahedral interpolation shown in FIG. 15 The implementation of pruned tetrahedral interpolator 1000 requires considerably less hardware than the implementation of tetrahedral interpolator 900.

For d=3, bitwise AND blocks 1001*a* through 1001*k* each perform a bit by bit AND operation on three bit input quantities to generate 3 bit output quantities. Likewise, for d=3, bitwise OR blocks 1002*a* through 1002*k* each perform a bit by bit OR operation on 3 bit input quantities to generate 3 bit output quantities. Each of the 3 bit outputs of bitwise AND blocks 1001*a*–1001*g* and bitwise OR blocks 1002*a*–1002*g* is used to control the selection of one of eight, 8 bit quantities in the corresponding of multiplexers 1003*a* through 1003*n*. The outputs of each of multiplexers 1003*a*–1003*o* are connected to the inputs of adders 1004*a*–1004*h*.

An interpolation operation is performed using pruned tetrahedral interpolator 1000 by supplying the vertex values selected using higher order bits 10*a* to the inputs of multiplexers 1003*a*–1003*o* and supplying the computed values of v[i] to the inputs of bitwise OR blocks 1002a–1002k and bitwise AND blocks 1001a–1001k as shown in FIG. 18. In addition, a vertex value selected using higher order bits 10a is supplied to the input of adder 1004h. Using the computed values of v[i], the bitwise AND blocks 1001a–1001k and the bitwise OR blocks 1002a–1002k compute the values input to the control inputs of multiplexers 1003a–1003n. Multiplexer 1003o uses v[3] directly. The values selected by multiplexers 1003a–1003o are those necessary to compute the interpolation result according to the diagrammatic representation of pruned tetrahedral interpolation shown in FIG. 15. The vertex values selected by y multiplexers 1003a–1003o are sent to the inputs of adders 1004a–1004h for summation. The output of the last adder in the chain of additions is divided by 16 and used as the result of the interpolation. The division by 16 is accomplished by bit shifting and is not shown in FIG. 18.

The pruned tetrahedral interpolator shown in FIG. 18 is implemented for d=3 and n=4. For some applications, less than four iterations of interpolation may be sufficient. Other applications may require more than four iterations of interpolation. The hardware implementation of pruned tetrahedral interpolation for d=3 and n=1 would use only a single adder and a single multiplexer to generate P'(0), as shown in FIG. 18. The hardware implementations for n=2 and n=3 to generate, respectively, P"(0) and P'"(0) as shown in FIG. 18, require more bitwise AND blocks, bitwise OR blocks, multiplexers, and adders.

Figure 19:
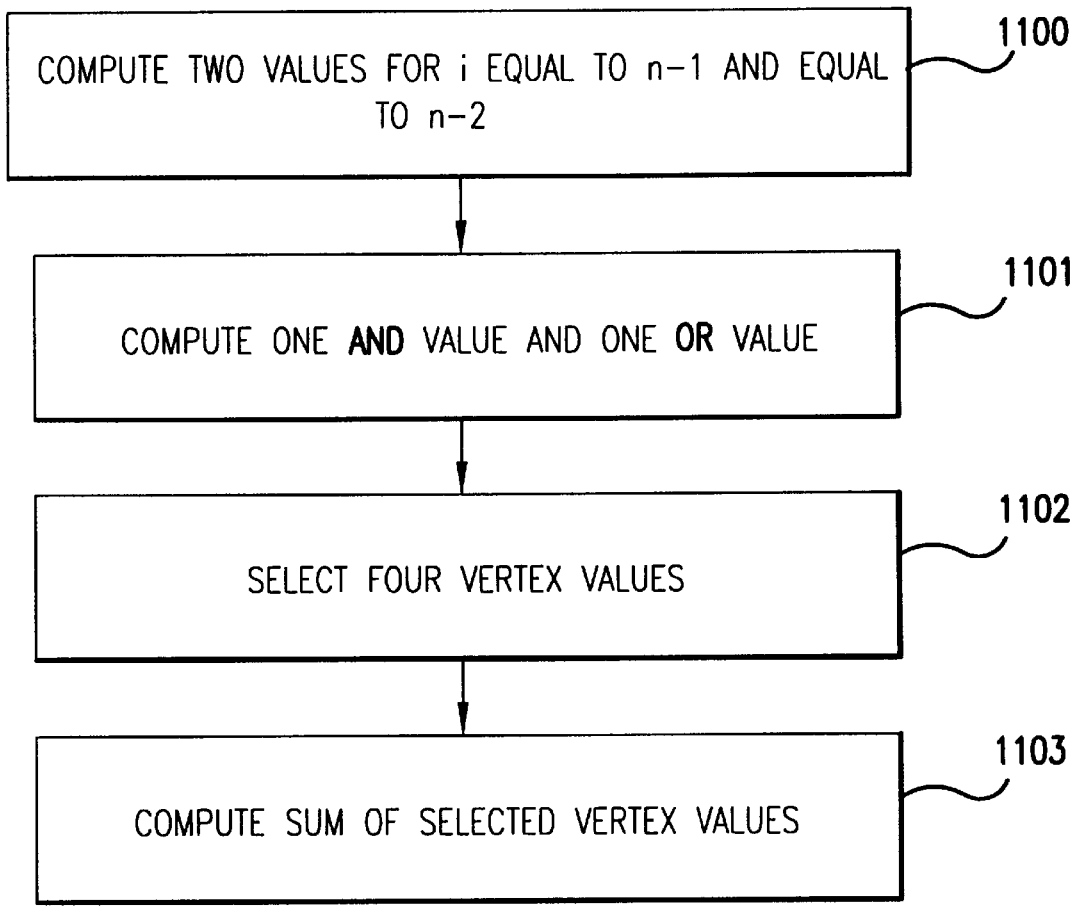
FIG. 19 is a high level flow diagram of a generalized method for performing pruned tetrahedral interpolation.

Shown in FIG. 19 is a high level flow diagram of a generalized method for performing pruned tetrahedral interpolation. For this method, the input color space values 10 are formed of d components. Each of the d components is partitioned into a set of higher order bits 10a and lower order bits 10b. Each of the d sets of lower order bits 10b is formed of n bits. The d sets of lower order bits are each designated as $1b_1, 1b_2, 1b_3, \ldots, 1b_d$. The bit position of each of the lower order bits is designated from the most significant bit to the least significant bit by a value of i ranging, correspondingly from n−1 to 0. First, $2^n$−2 values are computed 1100 according to the types of bitwise AND and bitwise OR operations shown in FIG. 15 with $v[i]=2^{d-1} \times 1b_1[i]+2^{d-2} \times 1b_2[i]+2^{d-3} \times 1b_3[i]+ \ldots +2^{d-d} \times 1b_d[i]$ for i ranging from n−1 to 0. Next, the minimum of $2^n$ and $2^d$ of interpolation data values are selected 1101 using unique ones of the $2^n$−2 values computed in step 1100, a value of v[n−1], and higher order bits 10a. Then, the sum of the interpolation data values selected in step 1101 is computed 1102.

The method shown in FIG. 19 is for n iterations of pruned tetrahedral interpolation. The sum computed in step 1102 is divided by $2^n$ to generate the result. This division is not shown in FIG. 19.

Figure 20:
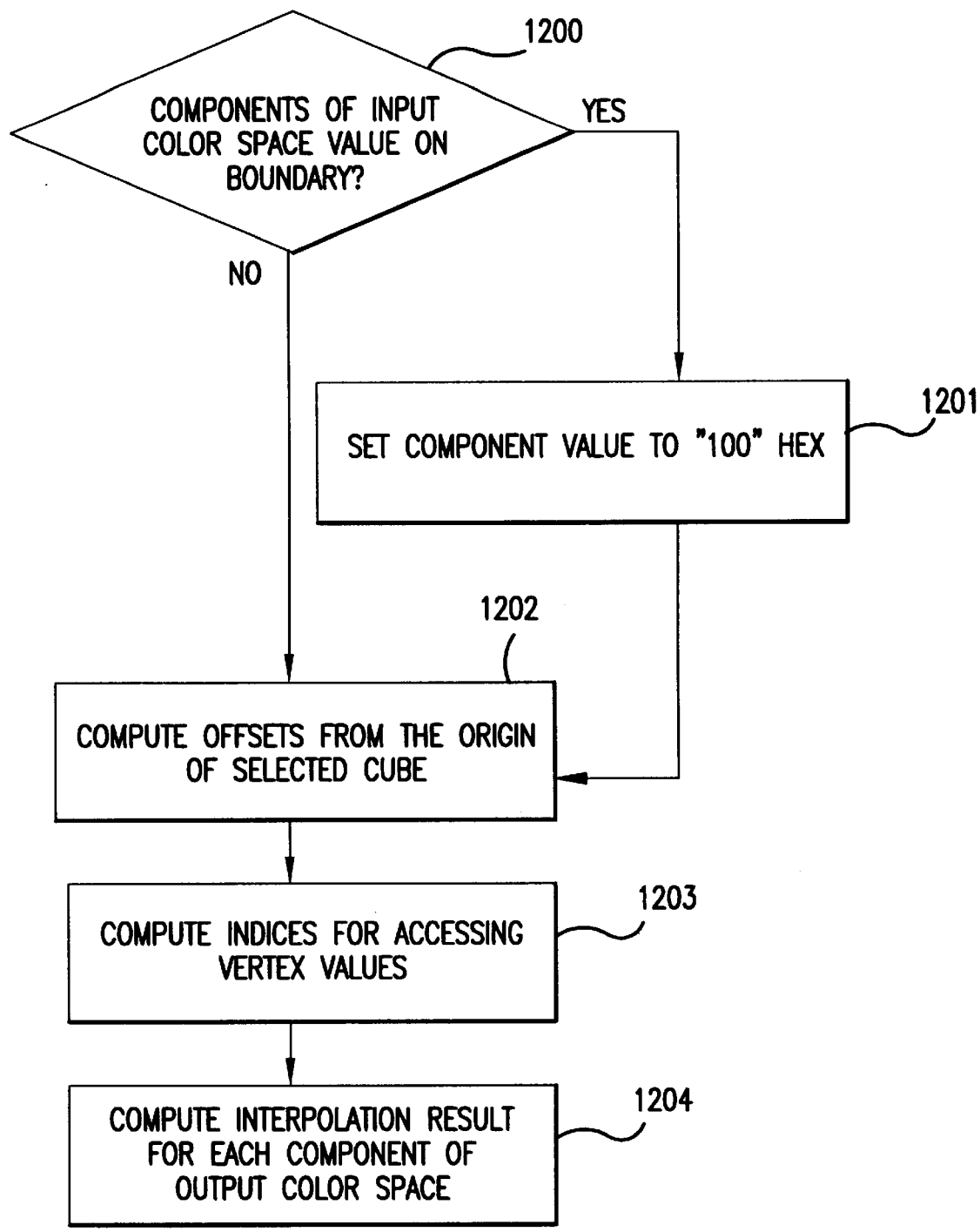
FIG. 20 is a high level flow diagram of a method for implement in software for performing pruned tetrahedral interpolation.

Shown in FIG. 20 is a high level flow diagram of a method implemented in software to perform pruned tetrahedral interpolation. First, a determination 1200 is made if any one of the components of the input color space value (a, b, c) 10 corresponds to a location on an outer boundary of the cubic lattice 1. This is the case if any one or more of the components of the input color space value has a value of FF hexadecimal. If this is the case, then, for purposes of generating the index into the cubic lattice 1 to retrieve the necessary vertex values, the components of the input color space value 10 which have a value of FF hexadecimal are assigned 1201 a value of 100 hexadecimal.

Next, the offsets from the origin of the cube in cubic lattice 1 accessed using higher order bits 10a and the sub-cubes generated during the pruned tetrahedral interpolation are computed 1202 using the relationships shown in the diagrammatic representation of the pruned tetrahedral interpolation of FIG. 15. Then, the indices used to access the values corresponding to the required vertices of the selected cube in cubic lattice in a look-up table are computed 1203. Finally, the values for each component of the output color space value (x, y, z) 11 are computed 1204. Provided in FIG. 40 of this specification is the code of an implementation in C, for n=4, of the high level method of pruned tetrahedral interpolation shown in FIG. 20.

It is also possible to implement pruned tetrahedral interpolation in hardware. The computational efficiencies which existed in the software implementation of pruned tetrahedral interpolation are present in the hardware implementation as reduced hardware requirements. As previously mentioned, shifts and concatenations are implemented without requiring additional hardware elements. The hardware functional blocks required to perform the pruned tetrahedral interpolation include adders, AND gates, OR gates, and multiplexers. With D dimensions in the output color space, d dimensions in the input color space, and n bits representing each group of lower order bits 10b of the input color space value, the requirements of the hardware implementation of the pruned subdivision interpolation can be computed as:

# of Adders=$D \times 2^n$  eqn. 11 # of Multiplexers=$D \times (2^n-1)$  eqn. 12

$$\text{\# of Additional AND/OR Gates} = d \times \left\{ 2 \times \left[ \left( \sum_{i=1}^{n-1} (2^i - 1) \right) \right] \right\} \quad \text{eqn. 13}$$

To generate the gate level design necessary to implement the pruned radial interpolation in hardware, a commonly used hardware description language, such as VHDL, may be used. Included in FIG. 41 is a listing of the VHDL code which can generate a hardware implementation of pruned radial interpolation.

As previously discussed, radial interpolation can result in print artifacts in conversions between the RGB and CMY color spaces for certain input color space values. Because of these print artifacts, a tetrahedral interpolation may yield more desirable results. To reduce complexity, the tetrahedral interpolation can be implemented using pruned tetrahedral interpolation, although this interpolation technique is still more computationally intensive than the radial interpolation.

However, for conversions between other color spaces (such as CieLab, LUV, or $YC_bC_r$) the radial interpolation may be preferable because it yields adequate results and is very computationally efficient. Additionally, it is possible that radial interpolation may actually produce more pleasing results than tetrahedral interpolation in some cases. If the interpolation methods are implemented in software, using alternative methods is easily done by calling different routines. However, implementing different interpolation methods in hardware can require separate logic. Because the separate hardware implementations of the two interpolation techniques are under utilized, this solution is expensive.

Figure 21:
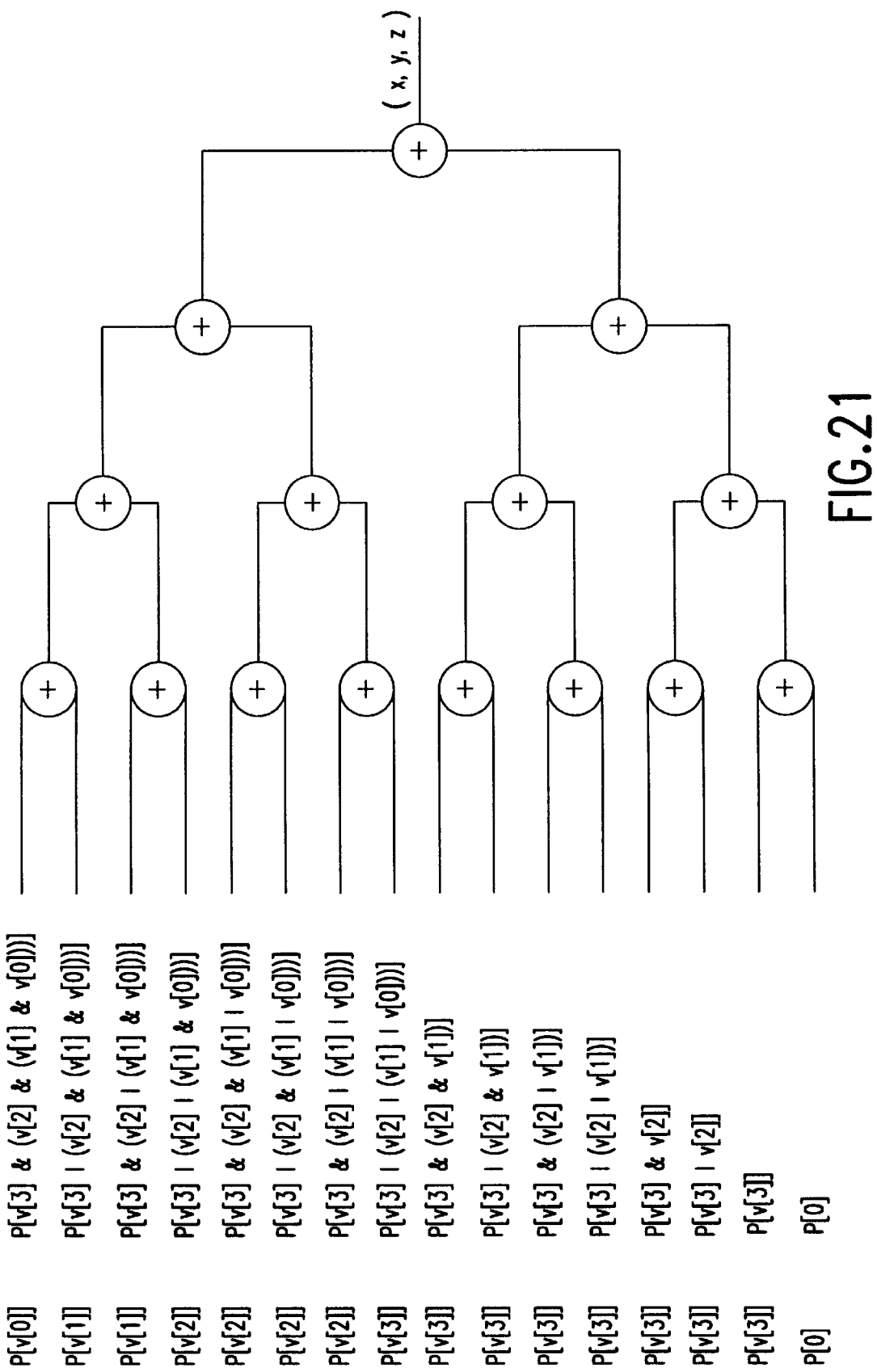
FIG. 21 is a diagrammatic representation of a common radial interpolation and pruned tetrahedral interpolation implementation.

A common hardware implementation provides the capability for alternatively performing radial interpolation and pruned tetrahedral interpolation with less hardware than a separate hardware implementation of these interpolation techniques. Shown in FIG. 21 is a diagrammatic representation of a common radial interpolation and pruned tetrahedral interpolation implementation. As indicated in FIG. 21, the interpolation technique performed is determined by the vertex values which are input to the hardware. Usually, the number of bits used to express each v(i) term is fewer than the number of bits used to express each of the P[v(i)] terms. Because of this, it is generally less complex to multiplex the v(i) terms prior to the memory access to retrieve the values associated with the P[v(i)] terms.

It should be noted from FIG. 21 that two of the vertex values used for both the radial interpolation and the pruned tetrahedral interpolation are the same for all values of n. Therefore, a common hardware implementation of radial interpolation and pruned tetrahedral interpolation requires an additional $2^n-2$ multiplexers (each having d control bits) to be added to the hardware implementation of the pruned tetrahedral interpolation. Included in FIG. 42 is the VHDL code for a hardware implementation of common radial interpolation and pruned tetrahedral interpolation.

Figure 22:
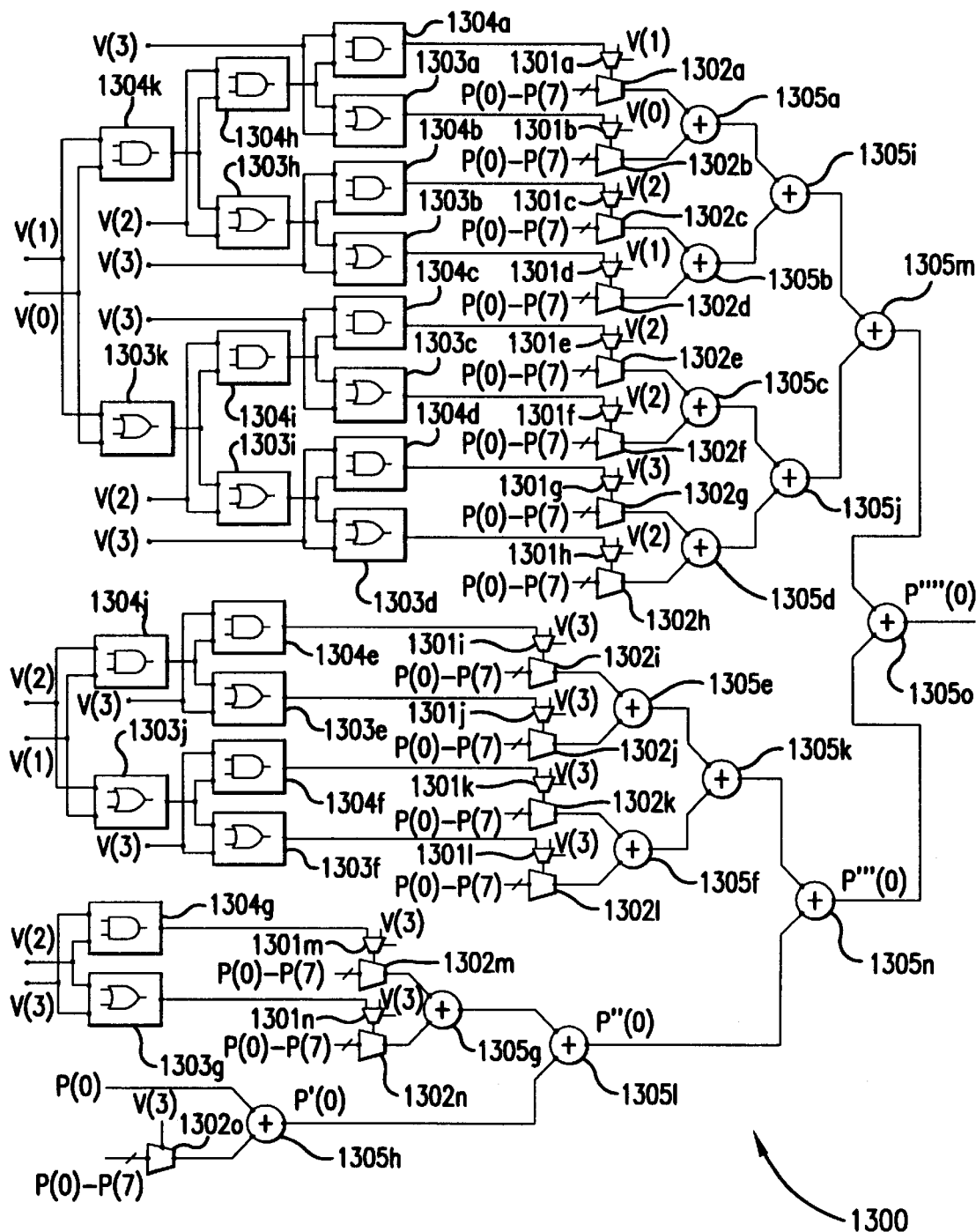
FIG. 22 shows a hardware implementation of common pruned radial and pruned tetrahedral interpolation.

Shown in FIG. 22 is a hardware implementation of a common pruned radial and pruned tetrahedral interpolator 1300. The hardware implementation of common pruned radial and pruned tetrahedral interpolation is similar to that of pruned tetrahedral interpolation. The difference is the addition of 14 multiplexers 1301a–1301n used to select the data to the control inputs of multiplexers 1302a–1302n. A single bit is used to control the selection of the data at the inputs of multiplexers 1301a–1301n. The single bit controls whether the multiplexer control inputs to multiplexers 1302a–1302n are for pruned tetrahedral interpolation or for pruned radial interpolation. The multiplexer control input for multiplexers 1302a–1302n determines which of the interpolation data values are coupled to the adders. With the bit in the first of its two states, the hardware of FIG. 22 performs as a pruned radial interpolator. With the bit in the second of its two states, the hardware of FIG. 22 performs as a pruned tetrahedral interpolator.

The control bit for multiplexers 1301a–1301n is used to select between values of v(i) and values computed using bitwise OR blocks 1303a1303k and bitwise AND blocks 1304a1304k. Adders 1305a1305o sum the outputs of multiplexers 1302a–1302o. By shifting bits, the resulting sum is divided by 16 (not shown in FIG. 22) to generate the result.

The hardware of FIG. 22 could be used repeatitively for an additional (D−1) passes to generate the remaining D−1 components of the output color space value 11. Or, there could be an additional (D−1) replications of part of the hardware implementation shown in FIG. 22 to generate each of D components simultaneously. The hardware used for generating multiplexer control inputs could be used for each of the D replications. The common pruned radial and pruned tetrahedral interpolator 1300 shown in FIG. 22 corresponds to d=3 and n=4 for the input color space value 10. The common pruned radial and pruned tetrahedral interpolator 1300 implements the diagrammatic representation of common pruned radial and pruned tetrahedral interpolation shown in FIG. 21.

In the interpolation process, the higher order bits 10a of an input color space value 10 form an index used to access interpolation data values. The interpolation is performed using the lower order bits 10b of the input color space value. As previously mentioned, the accessed values correspond to the vertices of a cube in a cubic lattice 1. Depending upon the characteristics of the output color space, the values associated with the vertices of the accessed cube may vary at rates dependent upon the dimension of cubic lattice 1 or dependent upon the region of the cubic lattice 1 in which the selected cube is located. Because of this possibility, improved interpolation results may be produced by varying the interpolation resolution between values of the vertices throughout cubic lattice 1 corresponding to the varying rates of change between vertex values. Adjusting the interpolation resolution based upon the location of the selected cube within cubic lattice 1 can be implemented by allowing the partitioning of the input color space value 10 into upper order bits 10a and lower order bits 10b to vary. In regions of cubic lattice 1 having high non-linear rates of change in the values of the vertices, the differences between the values of the vertices would be relatively large using a number of bits not adapted to the color space characteristics to represent each component of the upper order bits 10a. To reduce the values between the vertices, a larger number of bits are used to represent the components of the higher order bits 10a. Consequently, in these regions a smaller number of bits are used to represent the lower order bits 10b. For regions of cubic lattice 1 having lower rates of change or more linear rates of change in the values of the vertices, the differences between the values of the vertices using a number of bits not adapted to the color space characteristics to represent each component of the upper order bits 10a would be relatively small or relatively linear. To increase the values between the vertices a smaller number of bits are used to represent the components of the higher order bits 10a.

To implement an interpolation technique which can support a varying interpolation resolution over the output color space represented by cubic lattice 1, the interpolation technique must accommodate the changing number of bits used to represent the components of the lower order bits 10b. To accomplish this, a value, (n, p, q), is defined so that n bits are used to interpolate between lattice points in the "a" dimension, p bits are used to interpolate between lattice points in the b dimension, and q bits are used to interpolate between lattice points in the c dimension. It is possible to constrain the values of each of the n, p, and q so that they are fixed over the entirety of cubic lattice 1 or to permit each of the values of the n, p, and q to vary independently or co-dependently throughout regions of the cubic lattice 1.

Shown in FIG. 23a through FIG. 23e is a graphical representation of a non-symmetric radial interpolation process that uses 4 bits to represent the a, component, 3 bits to represent the $b_l$ component, and 2 bits to represent the $c_l$ component of the lower order bits 10b of the input color space value. The first iteration of the cube subdivision is the selection of a sub-cube occupying one half of the cube selected by the higher order bits 10a using the bit from a, corresponding to the i=3 position. There are no bits present for the $b_l$ and the $c_l$ for the i=3 position. The second iteration of cube subdivision is the selection of a sub-cube occupying one fourth of the previous sub-cube using one bit each from $a_l$ and from $b_l$. The third iteration of cube subdivision is the selection of a sub-cube occupying one eighth of the previous sub-cube using one bit each from $a_l$, $b_l$, and $c_l$. The fourth iteration of cube subdivision is also the selection of a sub-cube occupying one eighth of the previous sub-cube using one bit each from $a_l$, $b_l$, and $c_l$. As can be seen from this, the number of bits of the components of the lower order bits 10b available to generate the sub-cube determines the fraction of the cube used to generate the sub-cube occupied by the sub-cube.

Shown in Table 4 and equations 14 through 19 are the relationships necessary to calculate the values of the sub-cube vertices for each iteration of radial sub-cube generation. Equations 14 through 19 generate the values used in the relationships shown in table 4 so that the correct sub-cube vertex values will be generated with or without the corresponding bits of $a_l$, $b_l$, and $c_l$ present for that iteration of sub-cube generation. If for a given iteration of sub-cube generation, a bit in any one or more of $a_l$, $b_l$, or $c_l$ is not present, equation 19 will generate the number of the vertex of the cube used in generating a vertex value of the sub-cube to compensate for the missing bit(s).

TABLE 4

| | |
|---|---|
| $Mask_a=(2^n-1)$ | eqn. 14 |
| $Mask_b=(2^p-1)$ | eqn. 15 |
| $Mask_c=(2^q-1)$ | eqn. 16 |
| $m[i]=(4\times Mask_a[i])+(2\times Mask_b[i])+Mask_c[i]$ | eqn. 17 |
| $v[i]=m[i] \& \{(4\times a[i])+(2\times b[i])+c[i]\}$ | eqn. 18 |
| $f(N,i)=v[i](N\& \sim m[i])$ | eqn. 19 |
| $P'[7]=\{P[7]+P[f(7,\ i)]\}\div 2$ | |
| $P'[6]=\{P[6]+P[f(6,\ i)]\}\div 2$ | |
| $P'[5]=\{P[5]+P[f(5,\ i)]\}\div 2$ | |
| $P'[4]=\{P[4]+P[f(4,\ i)]\}\div 2$ | |
| $P'[3]=\{P[3]+P[f(3,\ i)]\}\div 2$ | |
| $P'[2]=\{P[2]+P[f(2,\ i)]\}\div 2$ | |
| $P'[1]=\{P[1]+P[f(1,\ i)]\}\div 2$ | |
| $P'[0]=\{P[0]+P[f(0,\ i)]\}\div 2$ | |

Figure 24:
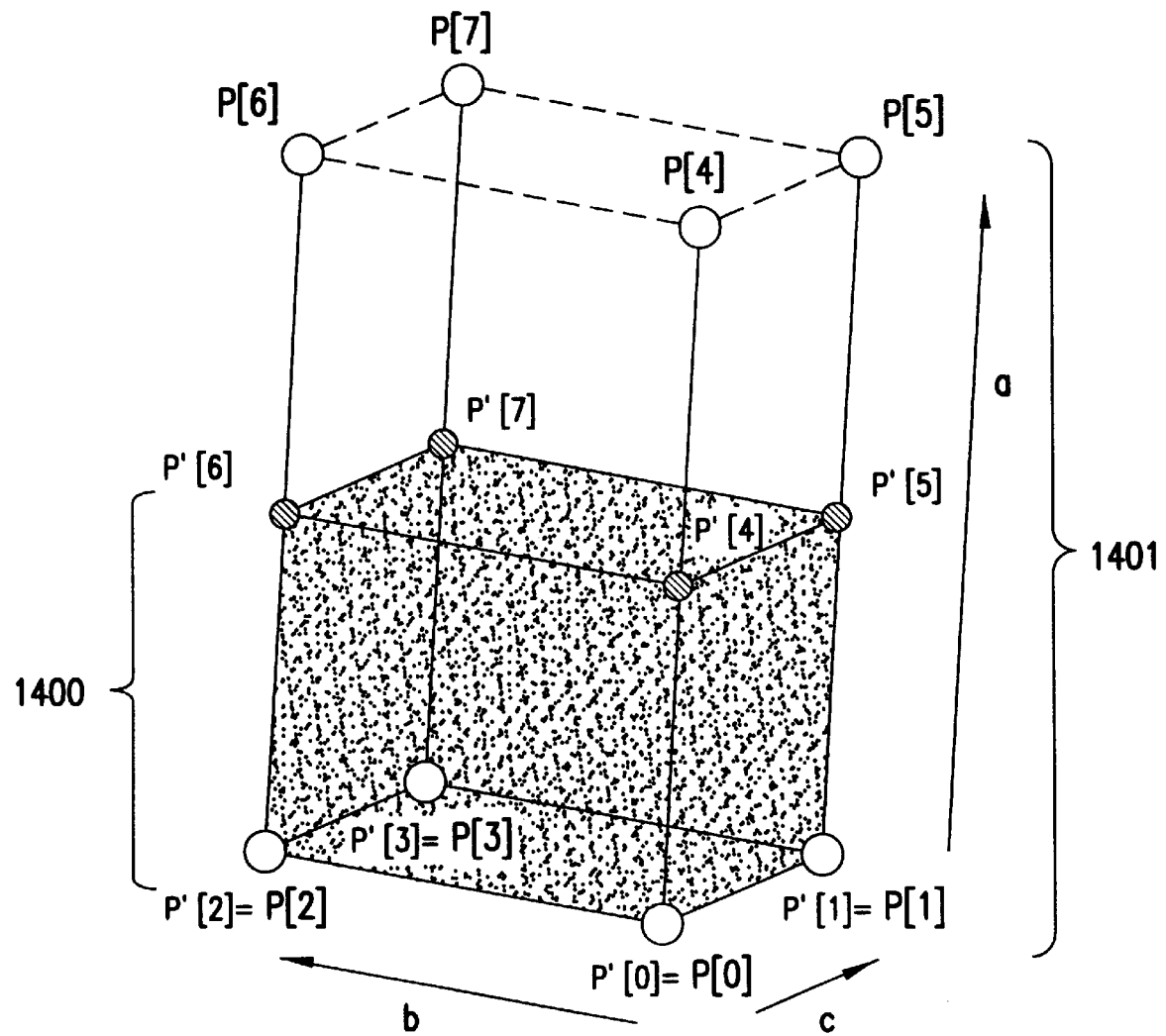
FIG. 24 shows a graphical representation of the generation of a sub-cube from a cube using non-symmetric sub-cube generation.

Shown in FIG. 24 is a graphical representation of the generation of a sub-cube 1400 from a cube 1401 using non-symmetric radial sub-cube generation. On the particular iteration of the sub-cube generation shown in FIG. 15, the bit corresponding to the iteration for components b, and cl is not present. Therefore, the relationships in table 4, with f(N,i) calculated for the bits of $b_I$ and $c_I$ corresponding to the iteration not present, dictate that the vertex values P'[7], P'[6], P'[5], and P'[4] are calculated as the average of the values of the two vertices vertically aligned with each of P'[7], P'[6], P'[5], and P'[4]. The computation of vertex values for other combinations in which each of $a_I$, $b_I$, or $c_I$ are present or not present is handled analogously by equation 19.

Figure 25:
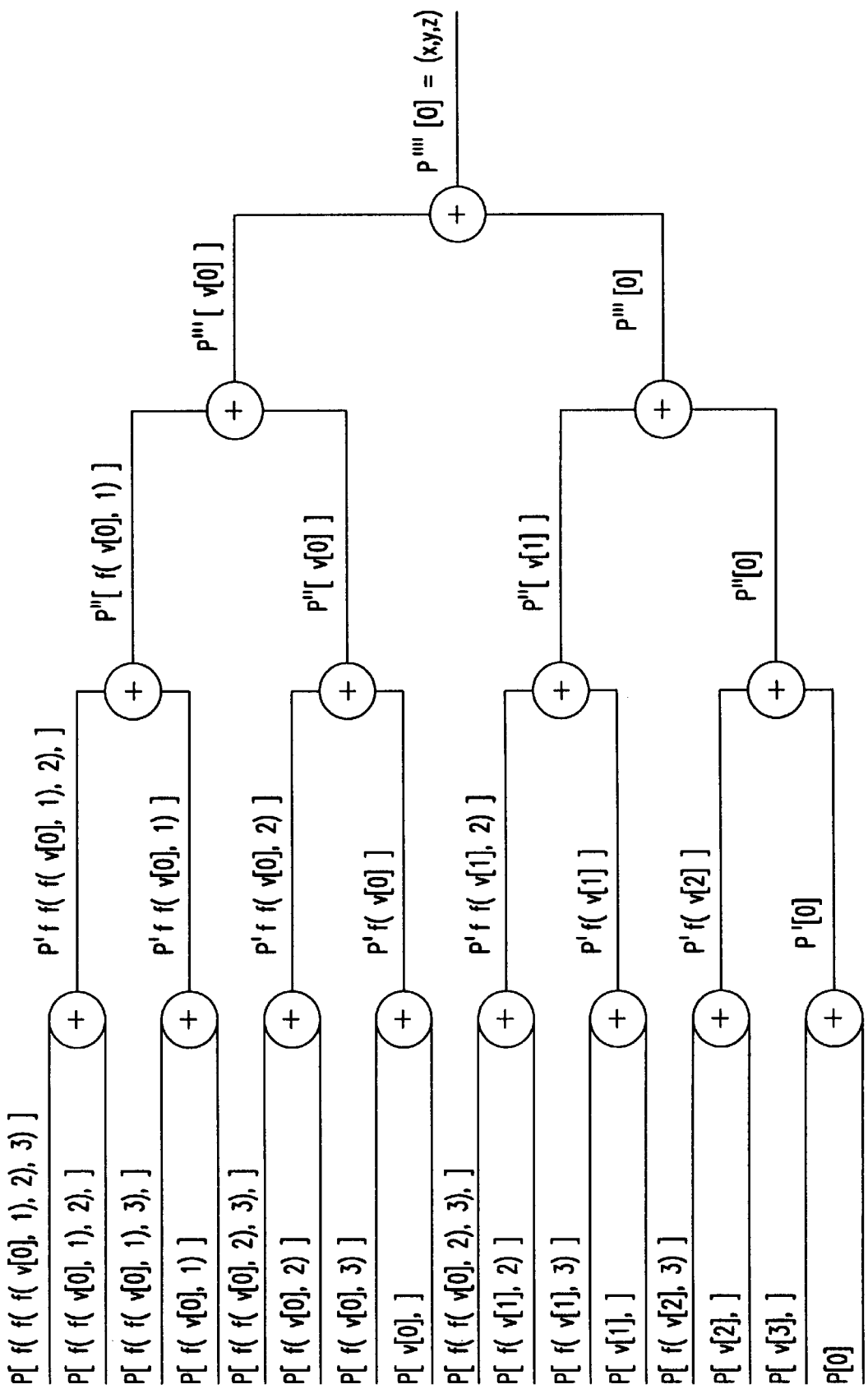
FIG. 25 is a diagrammatic representation of the non-symmetric radial interpolation process.

Shown in FIG. 25 is a diagrammatic representation of the non-symmetric pruned radial interpolation computation. The number of computations required to perform the non-symmetric pruned radial interpolation is computed as:

ALU Operations = $\qquad$ eqn. 20

$$\{n\times[(4\times d)-1]\} + \left\{3\times\left[2^{n-1}\times\sum_{i=1}^{n-1}(1-2^i)\right] + [D\times(2^n+1)]\right.$$

In FIG. 25, $2^n$ memory references are shown. However, a selected cube has a maximum of $2^d$ vertex values, where d is the number of dimensions of the input color space value 10. Therefore, some of the $2^n$ (16 values for n=4) values shown at the inputs to the diagram of FIG. 25 are redundant. It follows that for $2^n$ greater than $2^d$, the number of memory accesses performed can be limited to the number of vertices in the cube for each dimension of the output of color space. Therefore, the number of memory accesses required for D dimensions in the output color space is:

Memory accesses=$D\times\min(2^d, 2^n)$ $\qquad$ eqn. 21

Figure 26:
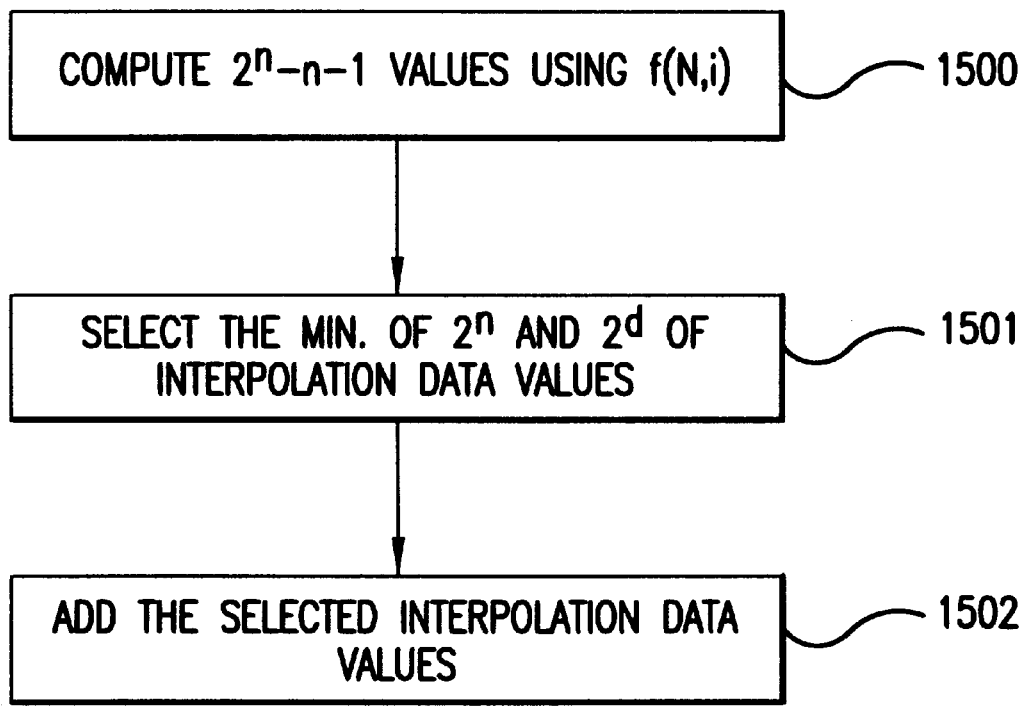
FIG. 26 is a high level flow diagram of a method for performing non-symmetric radial interpolation.

Shown in FIG. 26 is a high level flow diagram of a generalized method for performing non-symmetric pruned radial interpolation. For this method, the input color space values 10 are formed of d components. Each of the d components is partitioned into a set of higher order bits 10a and lower order bits 10b. The d sets of lower order bits are each designated as $1b_1, 1b_2, 1b_3, \ldots, 1b_d$. Each of the d sets of lower order bits 10b is formed from, respectively, of $n_1$, $n_2, n_3, \ldots n_d$ bits. The bit position of each of the d sets of lower order bits is designated from the most significant bit to the least significant bit by corresponding values of $i_1$, $i_2$, $i_3$... $i_d$ each ranging, correspondingly, from $n_1$–1 to 0, $n_2$–1 to 0, $n_3$–1 to 0, ... $n_d$–1 to 0. First, a set of $2^n$–n–1 values is computed 1500 using f (N, i)=v[i](N & ~m[i]), where $m[i]=2^{d-1}\times Mask_1[i]+2^{d-2}\times Mask_2[i]+2^{d-3}\times Mask_3[i]+ \ldots +2^{d-d}\times Mask_d[i]$. For this computation the values of $Mask_j=2^k-1$ are each computed for a value k selected from $n_1, n_2, n_3, \ldots n_d$ with the value of j corresponding to the value of the subscript of the selected one of $n_1, n_2, n_3, \ldots n_d$. The values of j range from 1 to d. The values of v[i] are computed as m[i] & $(2^{d-1}\times 1b_1[i]+2^{d-2}\times 1b_2[i]+2^{d-3}\times 1b_3[i]+ \ldots +2^{d-d}\times 1b_d[i])$ for values of i ranging from n–1 to 0, where n equals the greatest of $n_1, n_2, n_3, \ldots n_d$. The value of N corresponds to the vertex numbers ranging from 1 to $2^d$. Next, a number of interpolation data values, equal to the minimum of $2^n$ and $2^d$ are selected 1501 using the unique values in the set of $2^n$–n–1 values, values of v[i] for i ranging from n–1 to 0, and the d sets of higher order bits. Finally, the selected interpolation data values are added 1502 to generate a sum. To avoid roundoff error the generated sum is divided by $2^n$. This step is not shown in FIG. 26.

Figure 27:
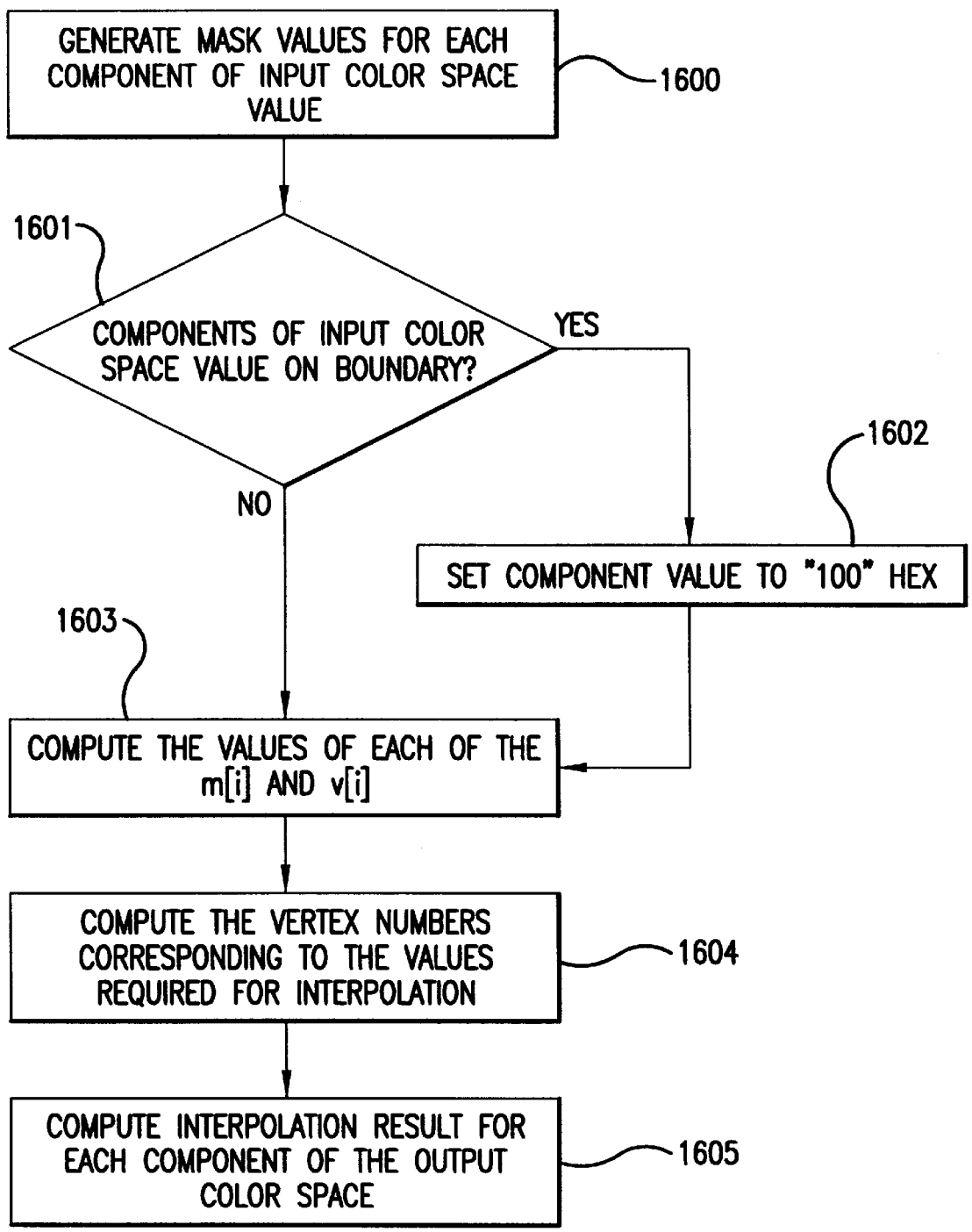
FIG. 27 is a high level flow diagram of a method implemented in software for performing non-symmetric pruned radial interpolation.

Shown in FIG. 27 is a high level flow diagram of method implemented in software to perform non-symmetric radial interpolation. First, the mask values are generated 1600 for each component of the input color space value 10. Next, a determination 1601 is made if any one of the components of the input color space value (a, b, c) 10 corresponds to a location on an outer boundary of the cubic lattice 1. This is the case if any one or more of the components of the input color space value has a value of FF hexadecimal. If this is the case, then, for purposes of generating the indices to retrieve the necessary vertex values, the components of the input color space value 10 which have a value of FF hexadecimal are assigned 1602 a value of 100 hexadecimal. Then, the values of each of the m[i] and v[i] are computed 1603. Next, the indices used to access each of the vertex values used for the interpolation are computed 1604. Finally, each of the components of the output color space value are computed 1605 using the values accessed by the indices computed in step 1604.

Included in FIG. 43 is a listing in C of the code for a software implementation of non-symmetric radial interpolation. For the non-symmetric radial interpolation, the computed indices correspond to offsets from the origin of the cube selected by the higher order bits 10a. Because of the changing resolution used throughout the output color space, the values of the vertices for three cubes (one cube for each dimension of the output color space) selected by the higher order bits 10a is passed into the routine of FIG. 43 each time color space conversion is performed on an input color space value 10. This is different than the code for the pruned radial and pruned tetrahedral interpolation in which the color table is passed as an array into the routine and indices into this table are computed in the routine.

It is also possible to implement non-symmetric radial interpolation in hardware. As previously mentioned, shifts and concatenations are implemented without requiring additional hardware elements. The hardware functional blocks required to perform the non-symmetric radial interpolation include adders, AND gates, OR gates, and multiplexers. With D dimensions in the output color space, d dimensions in the input color space, and n bits representing the maximum number of bits used to represent one of the components of the input color space value, the requirements of the hardware implementation of the non-symmetric radial interpolation can be computed as:

$$\text{\# of Adders} = D \times [(2^n-1)+1] \qquad \text{eqn. 22}$$

$$\text{\# of Multiplexers} = D \times (2^n-1) \qquad \text{eqn. 23}$$

$$\text{\# of additional AND/OR Gates} = \qquad \text{eqn. 24}$$

$$(3 \times d) \times \left\{ (2^n - 1) \times \sum_{i=1}^{n-1} (1 - 2^i) \right\}$$

To generate the gate level design necessary to implement the non-symmetric pruned radial interpolation in hardware, a commonly used hardware description language, such as VHDL, may be used. Included in FIG. 44 is a listing of the VHDL code which can generate a hardware implementation of non-symmetric pruned radial interpolation.

Figure 28:
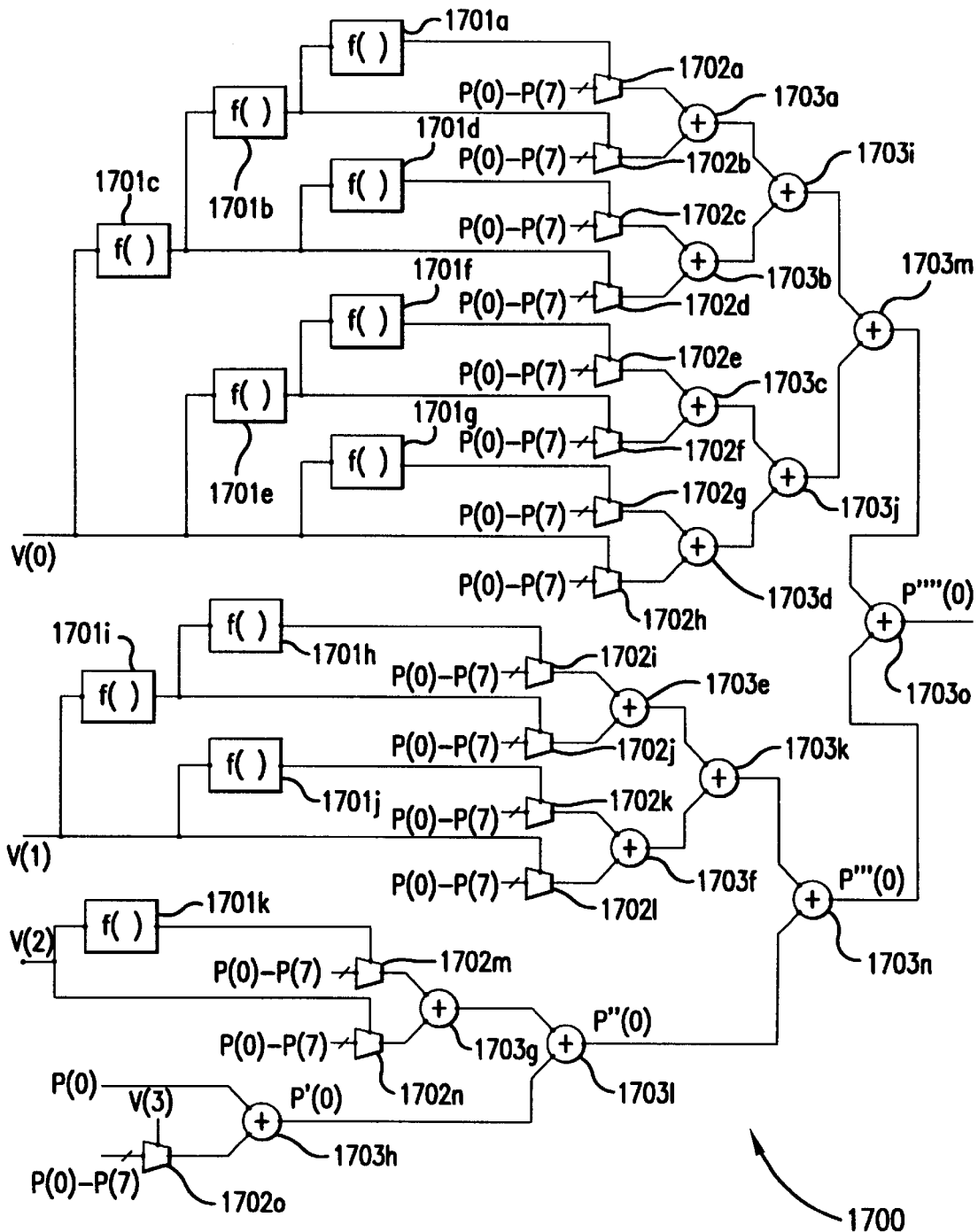
FIG. 28 shows a hardware implementation of non-symmetric pruned radial interpolation.

Shown in FIG. 28 is a hardware implementation of a non-symmetric pruned radial interpolator 1700. Control input computation blocks 1701a–1701k compute the values used by the control inputs of multiplexers 1702a–1702o that are coupled to control input computation blocks 1701a–1701k. Each of control input computation blocks 1701a–1701k performs the computations of equations 14–19 on the input to that control input computation block. As shown in FIG. 28, some of the control inputs of multiplexers 1702a–1702o use values of v[i]. Adders 1703a–1703o sum the outputs of multiplexers 1702a–1702o. This sum is divided by $2^n$ through bit shifting (not shown in FIG. 28) to generate the interpolation result.

The hardware of FIG. 28 could be used repeatitively for an additional (D−1) passes to generate the remaining D−1 components of the output color space value 11. Or, there could be an additional (D−1) replications of part of the hardware implementation shown in FIG. 28 to generate each of D components simultaneously. The hardware used for generating multiplexer control inputs could be used for each of the D replications. The non-symmetric pruned radial interpolator 1700 shown in FIG. 28 corresponds to d=3 and the maximum one of $n_1, n_2, n_3, \ldots n_d$ equal to 4 for the input color space value 10. The non-symmetric pruned radial interpolator 1700 implements the diagrammatic representation of pruned tetrahedral interpolation shown in FIG. 25.

Figure 29:
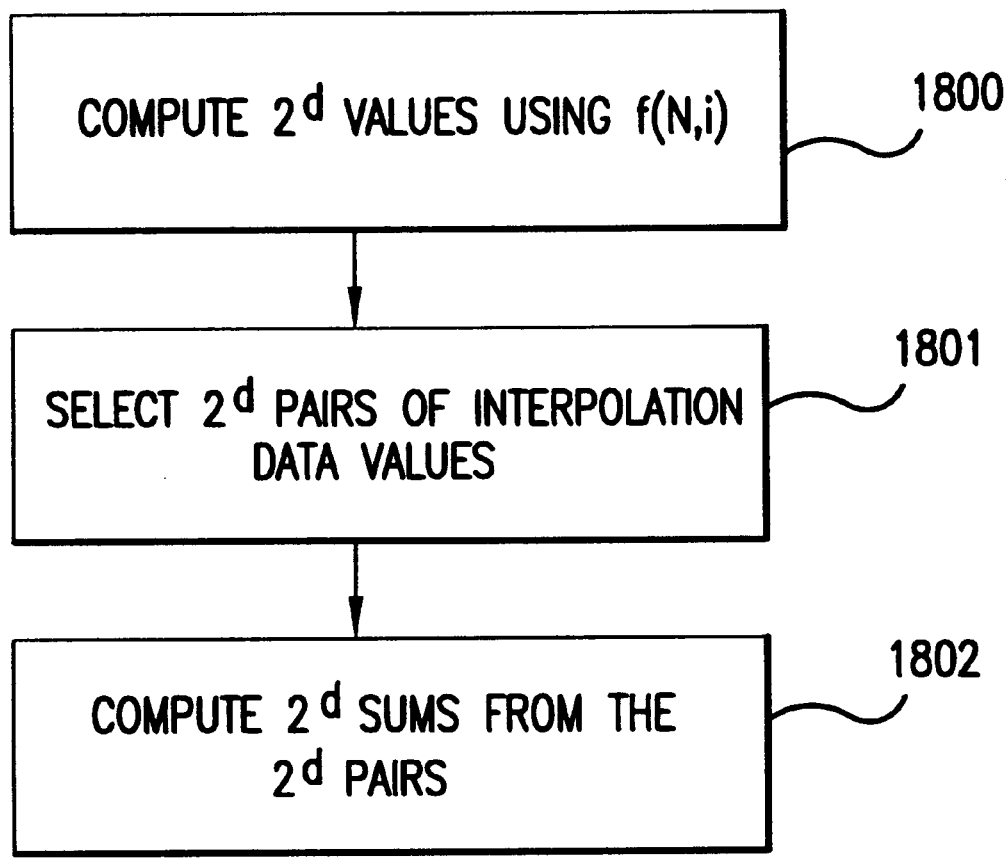
FIG. 29 is a high level flow diagram of a generalized method for performing non-symmetric radial interpolation.

Shown in FIG. 29 is a high level flow diagram of a generalized method for performing non-symmetric radial interpolation using the equations of table 4. First, a first set of $2^d$ values are computed 1800 using f(N, i)=v[i]|(N & ~m[i]). Next, $2^d$ pairs of interpolation data values are selected 1801 with each pair formed from the interpolation data value selected using one of the first set of $2^d$ values and the interpolation data value corresponding the vertex designated by the value of N. Finally, $2^d$ sums are computed 1802 from the selected $2^d$ pairs of interpolation data values.

The method shown in FIG. 29 is for a single iteration of non-symmetric radial interpolation. It should be recognized that further iterations would be performed by repeating the steps of FIG. 29 with the successive sets of $2^d$ values computed using f (N,i) for values of v[i] and m[i] corresponding to successively decremented values of i, selecting successive sets of $2^d$ pairs of values from the previously computed set of $2^d$ sums, and computing successive sets of $2^d$ sums from the successive sets of $2^d$ pairs of values. After performing n iterations, where n equals the greatest of $n_1, n_2, n_3, \ldots n_d$, one of the $2^d$ sums of the last set computed is divided by $2^n$ to generate the result. The division by 2 that could be performed after each iteration is delayed until after the final iteration to avoid round-off error.

Figure 30A:
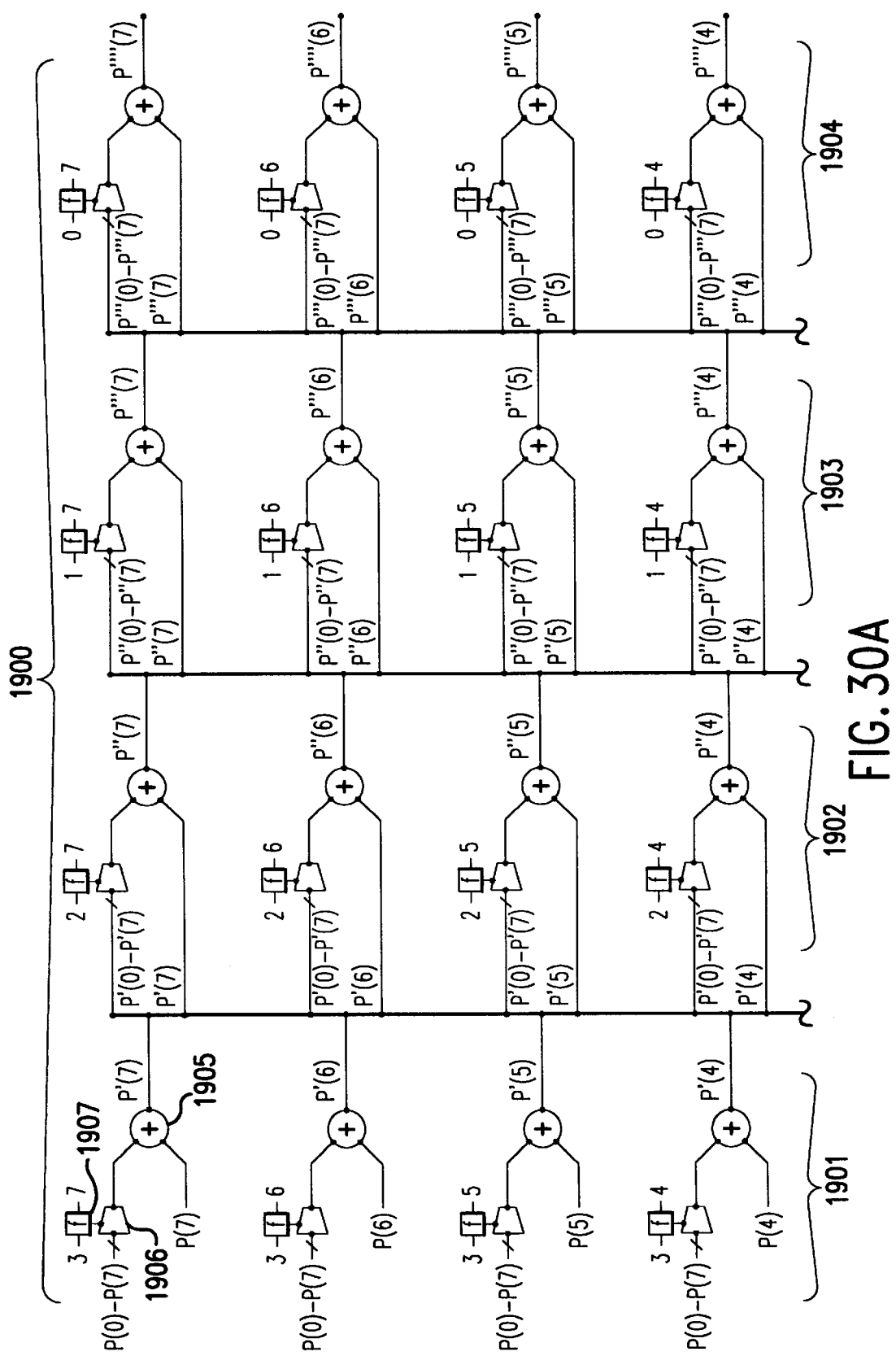
FIGS. 30a and 30b show a hardware implementation of non-symmetric radial interpolation.
Figure 30B:
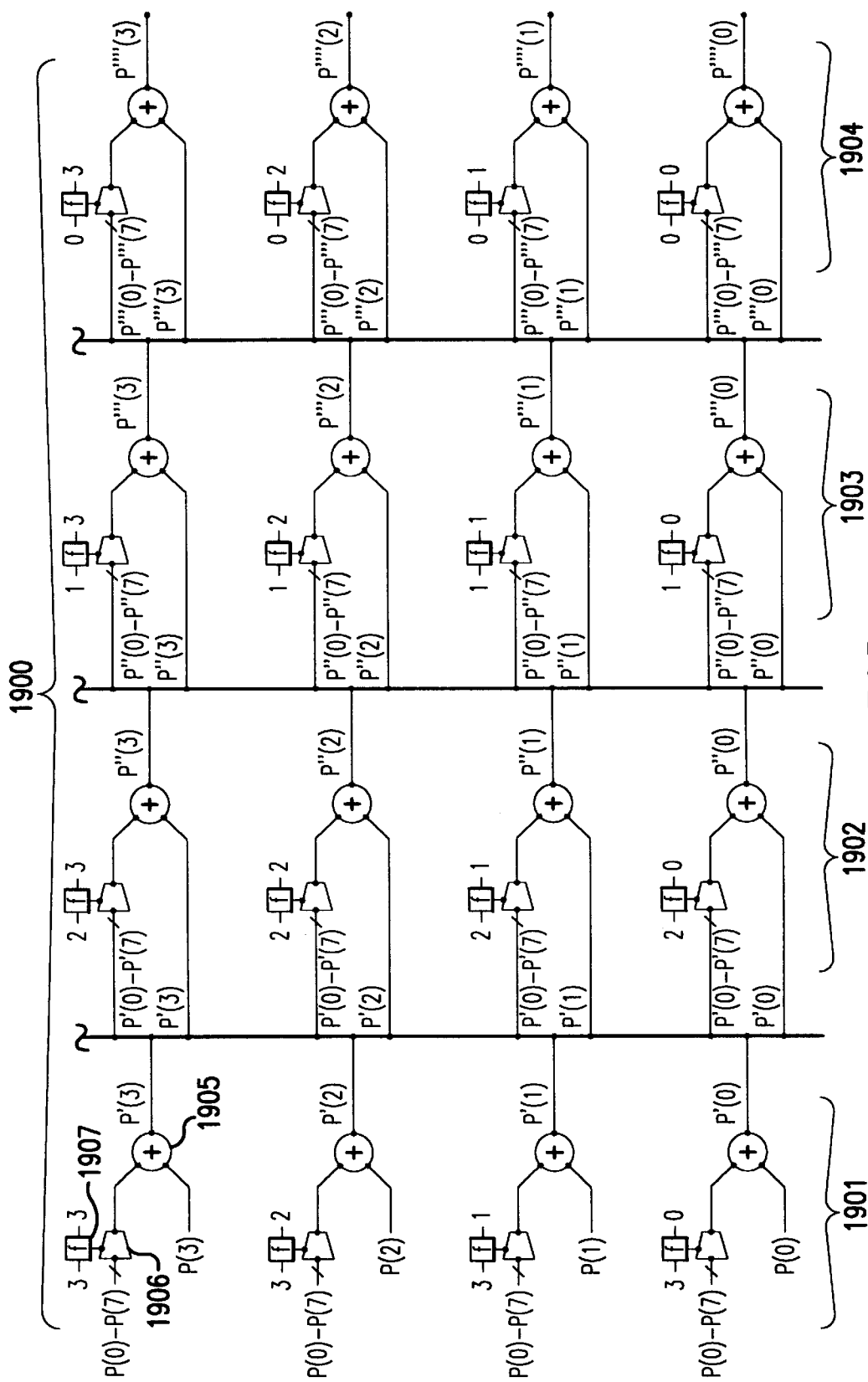

Shown in FIGS. 30a and 30b is a hardware implementation of a non-symmetric radial interpolator 1900 for conversion of input color space values 10 to a component of output color space values 11. This same hardware could be used repeatitively for an additional (D−1) passes to generate the remaining D−1 components of the output color space value 11. Or, there could be an additional (D−1) replications of part of the hardware implementation shown in FIGS. 30a and 30b to generate each of D components simultaneously. The hardware used for generating multiplexer control inputs could be used for each of the D replications. The non-symmetric radial interpolator 1900 shown in FIGS. 30a and 30b corresponds to d=3 and n=4, where n equals the greatest of $n_1, n_2, n_3, \ldots n_d$, for the input color space value 10. The hardware implementation shown in FIGS. 30a and 30b implements equations 14–19 and the equations of table 4 for the generation of the sub-cube vertex values. The non-symmetric radial interpolator 1900 of FIGS. 30a and 30b is formed from a first, second, third, and fourth stage 1901–1904. Each of the four stages 1901–1904 includes $2^3$ adders, one of which is labeled as 1905. Each of the four stages 1901–1904 further includes $2^3$ multiplexers, one of which is labeled as 1906. Finally, each of the four stages 1901–1904 includes $2^3$ control input computation blocks for performing the computations of equations 14–19 with the indicated inputs. One of these control input computations blocks is labeled as 1907.

Each of stages 1901–1904 performs an iteration of interpolation. Some interpolation applications may require that only a single iteration of interpolation be performed. For a single iteration of interpolation n=1. This corresponds to a hardware implementation of non-symmetric radial interpolator 1900 using only first stage 1901. An additional stage would be added for each additional iteration of interpolation required for the particular application.

Each of the inputs of the multiplexers in the first stage 1901 are connected to the eight vertex values selected using higher order bits 10a. The outputs of each multiplexer in first stage 1901 are connected to the first input of the corresponding adder. The second input of the adder is connected to the value corresponding to the number of the vertex equal to one of the inputs of the corresponding control input computation blocks. The output of each of the adders of the first stage 1901 is a vertex value of the first sub-cube. As previously mentioned, the division by two for each iteration of sub-cube generation is deferred until the last sub-cube is generated. The vertex values of the last sub-cube generated are divided by $2^n$, where n corresponds to the number of stages in the non-symmetric radial interpolator. The inputs of each multiplexer for the second, third, and fourth stages 1902–1904 are coupled to the outputs of the adders of the previous stage.

The control input of each multiplexer is connected to the output of the corresponding control input computation block. The multiplexers used in the non-symmetric radial interpolator 1900 have the capability to select one of eight, eight bit values using a three bit control input. For this d=3, n=4 implementation of non-symmetric radial interpolator 1900, each of the inputs to the control input computation blocks is a 3 bit quantity. The output of each of the control input computation blocks is a 3 bit quantity. The adders associated with each multiplexer performs an addition of the selected eight bit values from each of the multiplexers.

Interpolation is performed by supplying the vertex values selected using higher order bits 10a to the multiplexer inputs of the first stage 1901. The inputs to the control input computation blocks are hardwired. The non-symmetric radial interpolator 1900 computes the vertex values for four iterations of sub-cube generation. The values P''''(7) through P''''(0) are the values of the vertices of the fourth sub-cube generated. In this embodiment, P''''(0) is selected, divided by 16, and used as the result of the interpolation. The division by 16 is implemented by shifting bits and is not represented in FIGS. 30a and 30b.

One of ordinary skill in the art will recognize that one of the other computed values P''''(7) through P''''(1) may be selected, divided by 16, and used as the result of the interpolation. Using values corresponding to different vertices of the final sub-cube to generate the interpolation result will bias the result of the interpolation differently. This is a consideration in selecting which vertex value of the final sub-cube generated will be divided by 16 to generate the result of the interpolation.

Pruned tetrahedral interpolation can be adapted for implementation in a color space represented by a non-symmetric cubic lattice. As was the case for pruned tetrahedral interpolation, the vertices of the sub-cube generated are computed using the vertices of a tetrahedron partitioned from the cube used to generate the sub-cube. However, for some iterations of sub-cube generation, the corresponding bits of each of the $a_l$, $b_l$, and $c_l$ components may not be present. For these cases, the computation of the sub-cube vertices must be modified to compensate for the missing corresponding bits in one or more of the $al$, $bl$, and $cl$ components.

Shown in Table 5 and equations 25 and 26 are the relationships necessary to calculate the values of the sub-cube vertices for non-symmetric pruned tetrahedral sub-cube generation. Equations 25 and 26 along with equations 14 through 18 are used to generate the proper values so that in the relationships listed in table 5, the correct sub-cube vertex values will be generated with or without the bits of $a_l$, $b_l$, and $c_l$ corresponding to that iteration of sub-cube generation present. If for a given iteration of sub-cube generation, a bit in any one or more of $a_l$, $b_l$, or $c_l$ is not present, equation 25 and equation 26 will generate the number of the vertex of the cube used in generating a vertex value of the sub-cube so that compensation is made for the missing bit(s).

TABLE 5

$g(N,i)=(v[i]|\sim m[i]\& N)$   eqn. 25

$h(N,i)=(v[i]|N)$   eqn. 26

$P'[7]=\{P[g(7,i)]+P[h(7,i)]\}\div 2$ $P'[6]=\{P[g(6,i)]+P[h(6,i)]\}\div 2$ $P'[5]=\{P[g(5,i)]+P[h(5,i)]\}\div 2$ $P'[4]=\{P[g(4,i)]+P[h(4,i)]\}\div 2$ $P'[3]=\{P[g(3,i)]+P[h(3,i)]\}\div 2$ $P'[2]=\{P[g(2,i)]+P[h(2,i)]\}\div 2$ $P'[1]=\{P[g(1,i)]+P[h(1,i)]\}\div 2$ $P'[0]=\{P[g(0,i)]+P[h(0,i)]\}\div 2$ Although FIG. 24 provides a graphical representation of the generation of a sub-cube 1400 from a cube 1401 using non-symmetric radial sub-cube generation, FIG. 24 can also provide a graphical representation of non-symmetric pruned tetrahedral sub-cube generation. On the particular iteration of the sub-cube generation shown in FIG. 24, the bit corresponding to the iteration for components $b_l$ and $c_l$ is not present. Therefore, the relationships in table 5, with g(N,i) and h(N,i) calculated for the corresponding bits of $b_l$ and $c_l$ not present, dictate that the vertex values P'[7], P'[6], P'[5], and P'[4] are calculated as the average of the values of the two vertices vertically aligned with each of P'[7], P'[6], P'[5], and P'[4]. The computation of vertex values for other combinations in which each of $a_l$, $b_l$, or $c_l$ are present or not present is handled analogously by equations 25 and 26.

Figure 31:
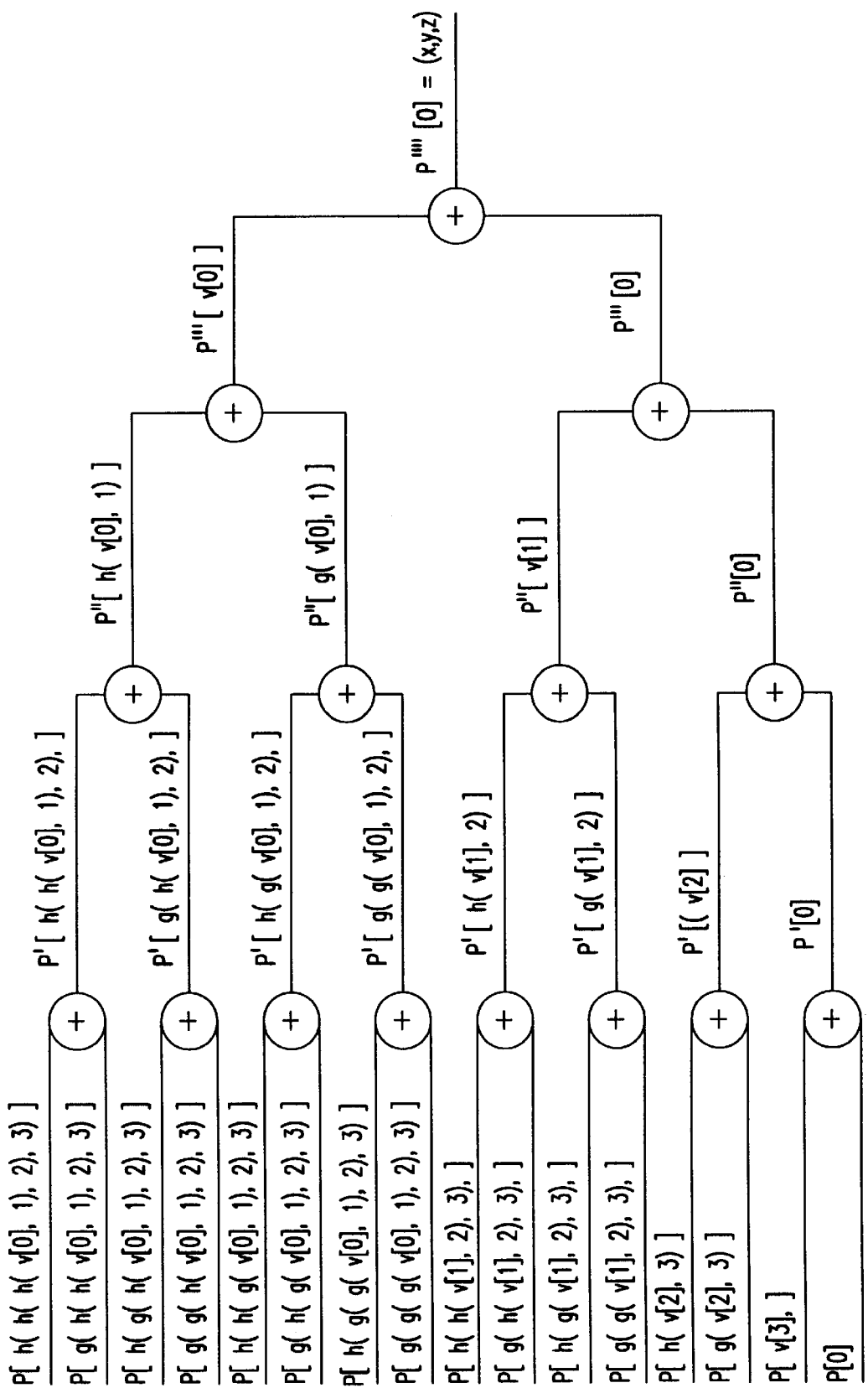
FIG. 31 is a diagrammatic representation of the non-symmetric pruned tetrahedral interpolation process.

Shown in FIG. 31 is a diagrammatic representation of the non-symmetric pruned tetrahedral interpolation computation. The number of computations required to perform the non-symmetric pruned tetrahedral interpolation is computed as:

$$\text{\# of }ALU\text{ operations}=n\times[(4\times d)-1]+4\times\left\{2^{n-1}\times\sum_{i=1}^{n-1}(1-2^i)\right\}$$   eqn. 27

$$\text{\# of Memory accesses}=D(\min(2^d,2^n))$$   eqn. 28

Figure 32:
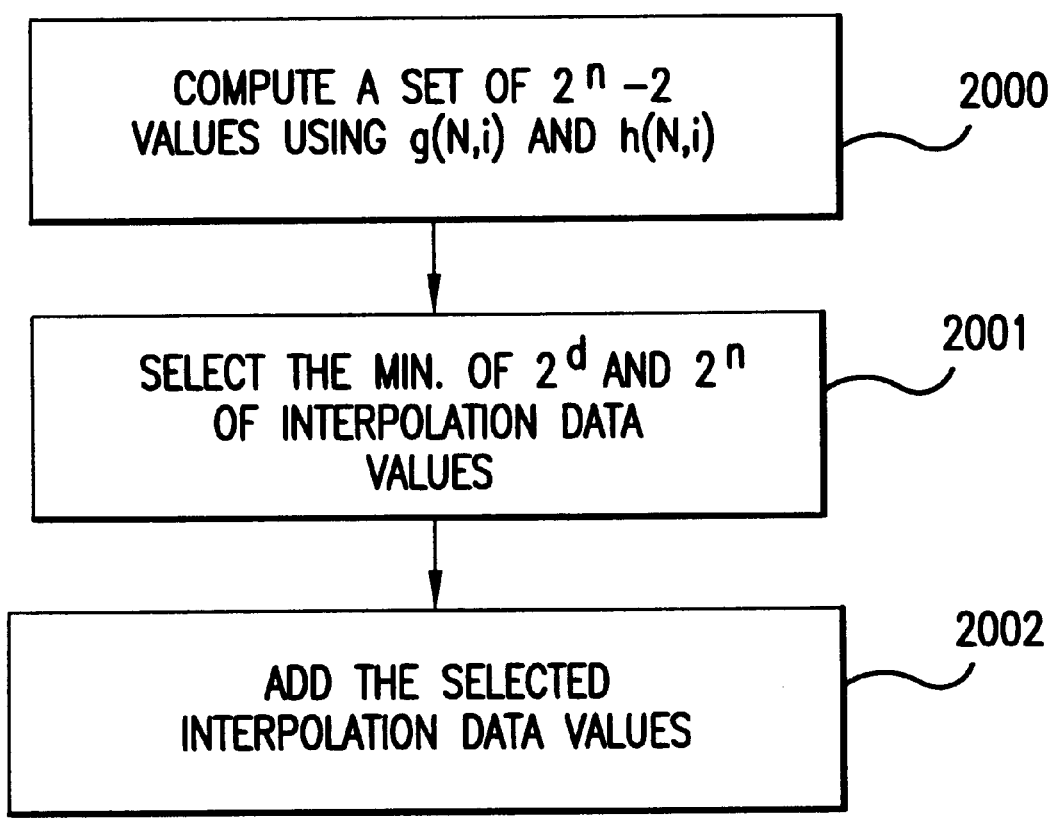
FIG. 32 shows a high level flow diagram of a method for performing non-symmetric pruned tetrahedral interpolation.

Shown in FIG. 32 is a high level flow diagram of a generalized method for performing non-symmetric pruned tetrahedral interpolation. For this method, the input color space values 10 are formed of d components. Each of the d components is partitioned into a set of higher order bits 10a and lower order bits 10b. The d sets of lower order bits are each designated as $1b_1$, $1b_2$, $1b_3$, ..., $1b_d$. Each of the d sets of lower order bits 10b is formed from, respectively, of $n_1$, $n_2$, $n_3$, ... $n_d$ bits. The bit position of each of the d sets of lower order bits is designated from the most significant bit to the least significant bit by corresponding values of $i_1$, $i_2$, $i_3$ ... $i_d$ each ranging, correspondingly, from $n_1-1$ to 0, $n_2-1$ to 0, $n_3-1$ to 0, ... $n_d-1$ to 0.

First, a set of $2^n-2$ values is computed 2000 using g(N, i)=( v[i]|~m[i] & N) and h(N,i)=(v[i]|N), where $m[i]=2^{d-1}\times \text{Mask}_1[i]+2^{d-2}\times\text{Mask}_2[i]+2^{d-3}\times\text{Mask}_3[i]+...+2^{d-d}\times\text{Mask}_d[i]$. For this computation the values of $\text{Mask}_j=2^k-1$ are each computed for a value k selected from $n_1$, $n_2$, $n_3$, ... $n_d$ with the value of j corresponding to the value of the subscript of the selected one of $n_1$, $n_2$, $n_3$, ... $n_d$. The values of j range from 1 to d. The values of v[i] are computed as $m[i]$ & $(2^{d-1}\times 1b_1[i]+2^{d-2}\times 1b_2[i]+2^{d-3}\times 1b_3[i]+...+2^{d-d}\times 1b_d[i])$ for values of i ranging from n−1 to 0, where n equals the greatest of $n_1$, $n_2$, $n_3$, ... $n_d$. The value of N corresponds to the vertex numbers ranging from 1 to $2^d$. Next, a number of interpolation data values, equal to the minimum of $2^n$ and $2^d$ are selected 2001 using the unique values in the set of $2^n-2$ values, a value of v[i] for i in the range from n−1 to 0, and the d sets of higher order bits. Finally, the selected interpolation data values are added 2002 to generate a sum. To avoid roundoff error the generated sum is divided by $2^n$. This step is not shown in FIG. 32.

Figure 33:
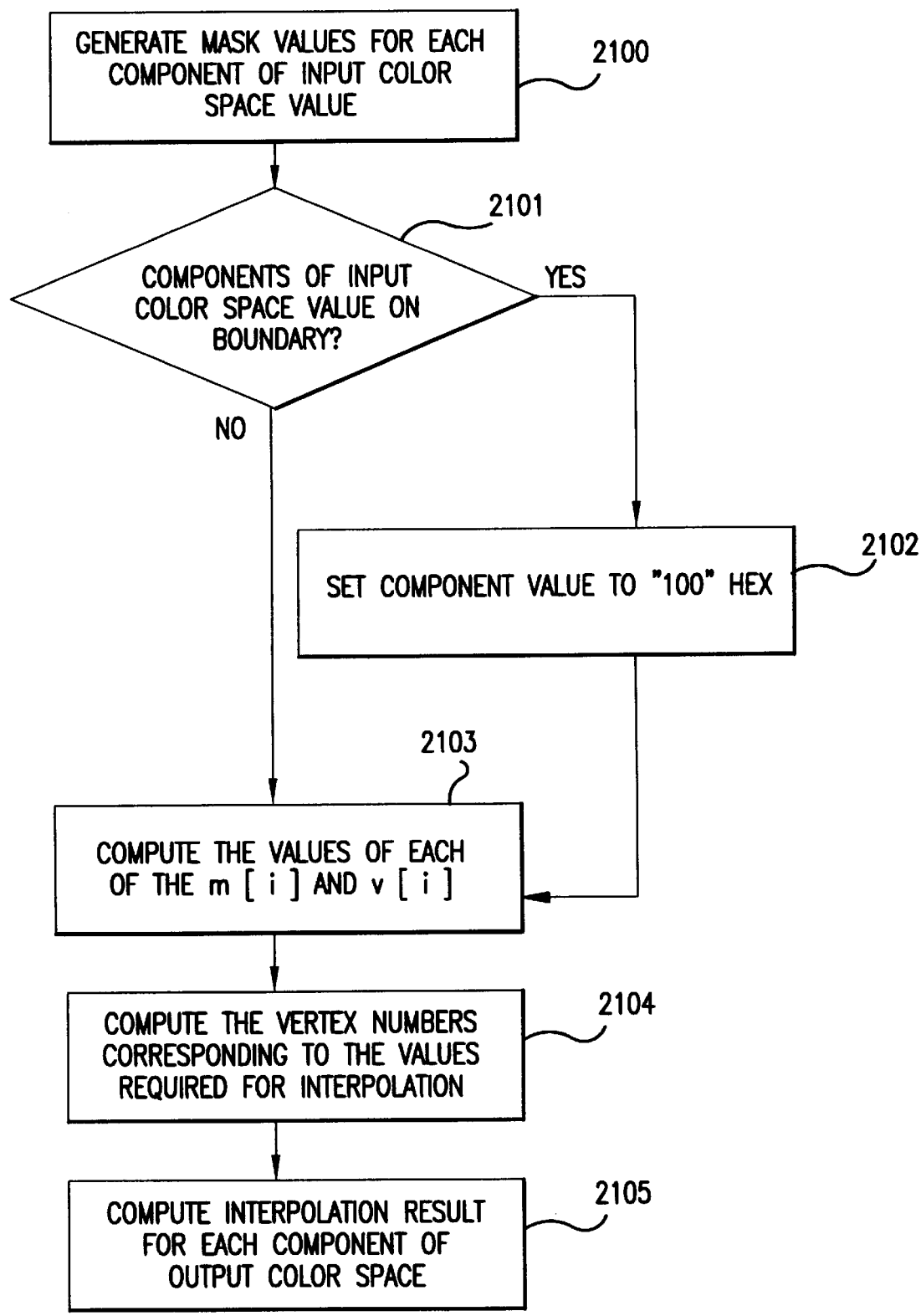
FIG. 33 is a high level flow diagram of a method implemented in software to perform non-symmetric pruned tetrahedral interpolation.

Shown in FIG. 33 is a high level flow diagram of a method implemented in software to perform non-symmetric pruned tetrahedral interpolation. First, the mask values are generated 2100 for each component of the input color space value 10. Next, a determination 2101 is made if any one of the components of the input color space value (a, b, c) 10 corresponds to a location on an outer boundary of the cubic lattice 1. This is the case if any one or more of the components of the input color space value has a value of FF hexadecimal. If this is the case, then, for purposes of generating the index into the cubic lattice 1 to retrieve the necessary vertex values, the components of the input color space value 10 which have a value of FF hexadecimal are assigned 2102 a value of 100 hexadecimal. Then, the values of each of the m[i] and v[i] are computed 2103. Next, the indices used to access each of the vertex values used for the interpolation are computed 2104 using g(N,i) and h(N,i). Finally, each of the components of the output color space value are computed 2105 using the values accessed by the indices computed in step 2104.

Included in FIG. 45 is a listing of the code for a software implementation of non-symmetric pruned tetrahedral interpolation in C. For the non-symmetric pruned tetrahedral interpolation, the computed indices correspond to offsets from the origin of the cube selected by the higher order bits 10a. Because of the changing resolution used throughout the output color space, the values of the vertices for three cubes (one cube for each dimension of the output color space) selected by the higher order bits 10a is passed into the routine of FIG. 45 each time color space conversion is performed on an input color space value 10. This is different than the code for the pruned radial and pruned tetrahedral interpolation in which the color table is passed as an array into the routine and indices into this table are computed in the routine.

It is also possible to implement non-symmetric pruned tetrahedral interpolation in hardware. As previously mentioned, shifts and concatenations are implemented without requiring additional hardware elements. The hardware functional blocks required to perform the non-symmetric pruned tetrahedral interpolation include adders, AND gates, OR gates, and multiplexers. With D dimensions in the output color space, d dimensions in the input color space, and n bits representing the maximum number of bits used to represent one of the components of the input color space value, the requirements of the hardware implementation of the non-symmetric pruned tetrahedral interpolation can be computed as:

# of Adders=$D \times 2^n$     eqn. 29 # of Multiplexers=$D \times (2^n-1)$     eqn. 30 # of Additional AND/OR Gates =     eqn. 31

$$(4 \times d) \times \left\{ 2^{n-1} \times \sum_{i=1}^{n-1} (1 - 2^i) \right\}$$

To generate the gate level design necessary to implement the non-symmetric pruned tetrahedral interpolation in hardware, a commonly used hardware description language, such as VHDL, may be used. Included in FIG. 46 is a listing of the VHDL code which can generate a hardware implementation of non-symmetric pruned tetrahedral interpolation.

Figure 34:
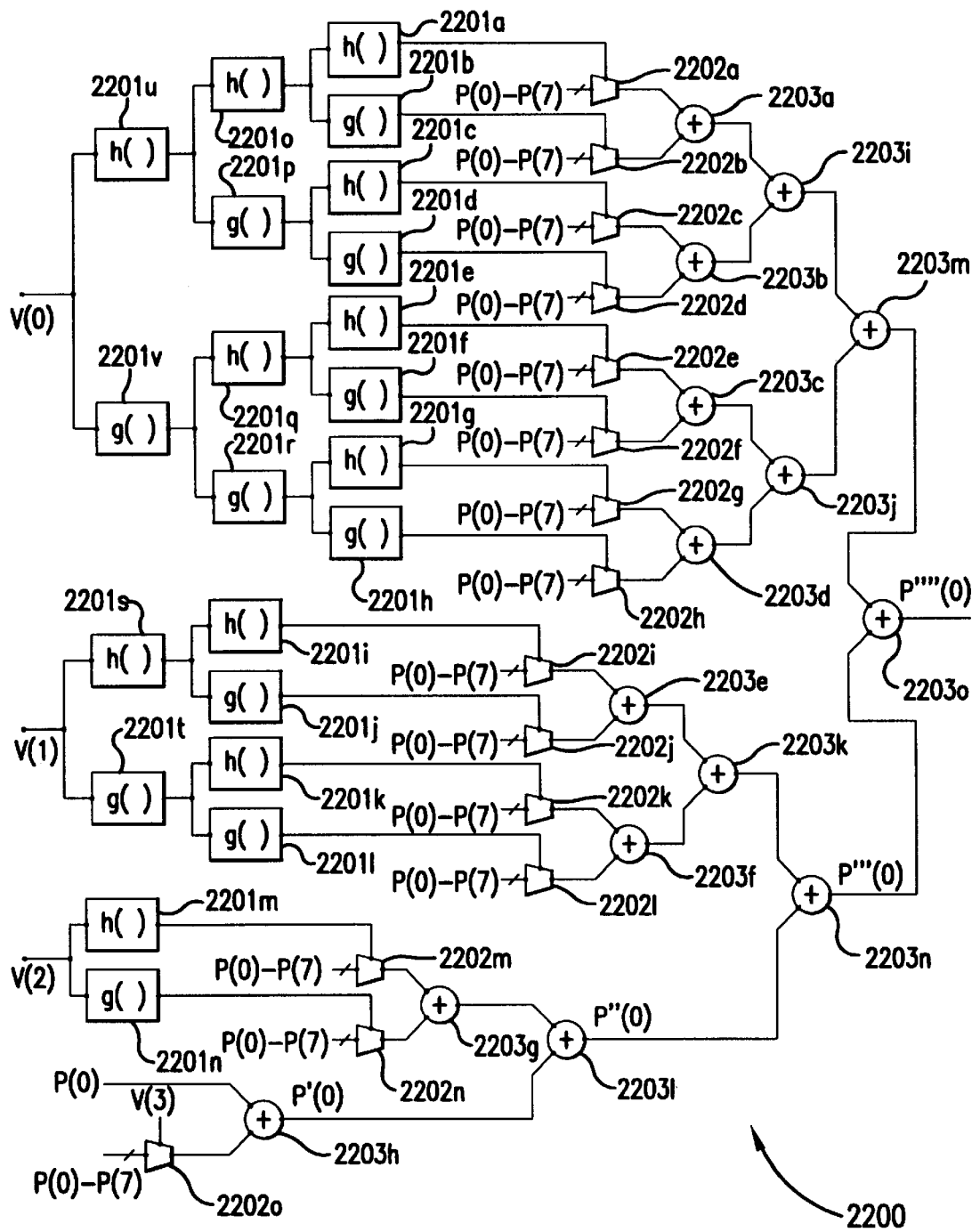
FIG. 34 shows a hardware implementation of non-symmetric pruned tetrahedral interpolation.

Shown in FIG. 34 is a hardware implementation of a non-symmetric pruned tetrahedral interpolator 2200. Control input computation blocks 2201a–2201v compute the values used by the control inputs of multiplexers 2202a–2202n. The control input computation blocks 2201a–2201v apply the functions of equations 25 and 26, as indicated in FIG. 34 to compute the control inputs for multiplexers 2202a–2202n. As shown in FIG. 34, multiplexer 2202o uses a value of v[i] for its control input. Each of multiplexers 2202a–2202o select from eight interpolation data values selected using higher order bits 10a. Adders 2203a–2203o sum the outputs of multiplexers 2202a–2202o. This sum is divided by $2^n$ through bit shifting (not shown in FIG. 34) to generate the interpolation result.

Figure 35:
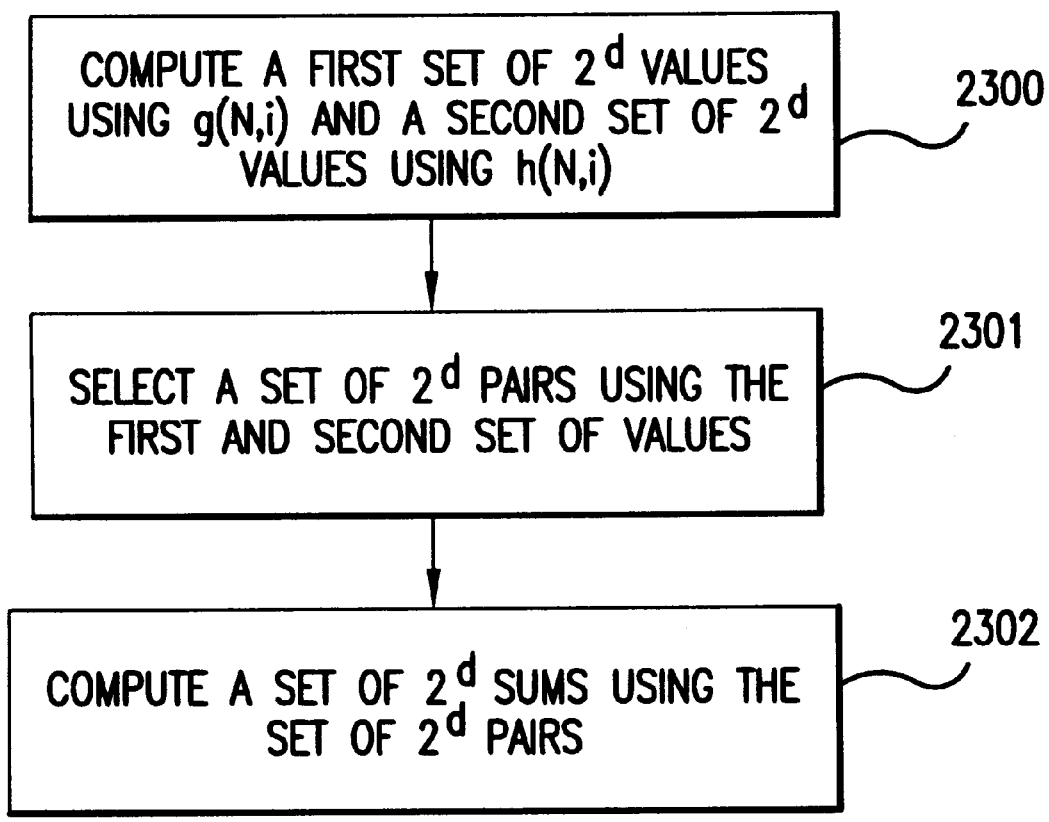
FIG. 35 is a high level flow diagram of a generalized method for implementing non-symmetric tetrahedral interpolation.

The hardware of FIG. 28 could be used repeatitively for an additional (D−1) passes to generate the remaining D−1 components of the output color space value 11. Or, there could be an additional (D−1) replications of part of the hardware implementation shown in FIG. 28 to generate each of D components simultaneously. The hardware used for generating multiplexer control inputs could be used for each of the D replications. The non-symmetric pruned tetrahedral interpolator 2200 shown in FIG. 34 corresponds to d=3 and the maximum one of $n_1, n_2, n_3, \ldots n_d$ equal to 4 for the input color space value 10. The non-symmetric pruned tetrahedral interpolator 2200 implements the diagrammatic representation of non-symmetric pruned tetrahedral interpolation shown in FIG. 31. Shown in FIG. 35 is a high level flow diagram of a generalized method for performing non-symmetric tetrahedral interpolation. First, a first and a second set of $2^d$ values are computed 2300 using, respectively g(N,i) and h(N,i). Next, $2^d$ pairs of interpolation data values are selected 2301 using the first and second set of values. Finally a set of $2^d$ sums are computed 2302 using the $2^d$ pairs of interpolation data values.

The method shown in FIG. 35 is for a single iteration of non-symmetric tetrahedral interpolation. It should be recognized that further iterations would be performed by repeating the steps of FIG. 35 with the successive sets of $2^d$ values computed using g(N,i) and h(N,i) for values of v[i] and m[i] corresponding to successively decremented values of i, selecting successive sets of $2^d$ pairs of values from the previously computed set of $2^d$ sums, and computing successive sets of $2^d$ sums from the successive sets of $2^d$ pairs of values. After performing n iterations, where n equals the greatest of $n_1, n_2, n_3, \ldots n_d$, one of the $2^d$ s of the last set computed is divided by $2^n$ (not shown in FIG. 35) to generate the result. The division by 2 that could be performed after each iteration is delayed until after the final iteration to avoid round-off error.

Figure 36A:
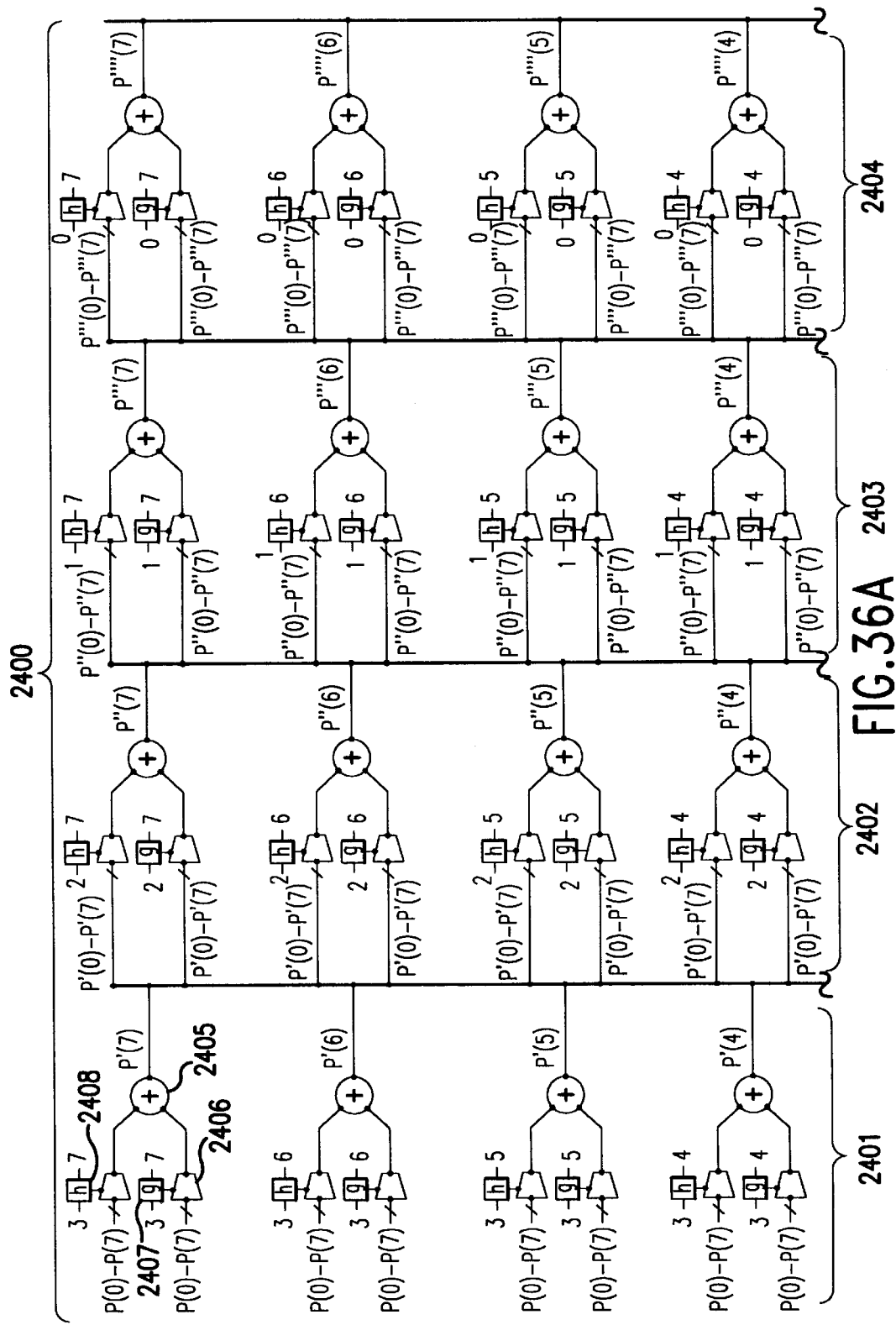
FIGS. 36a and 36b show a hardware implementation of a non-symmetric tetrahedral interpolator.
Figure 36B:
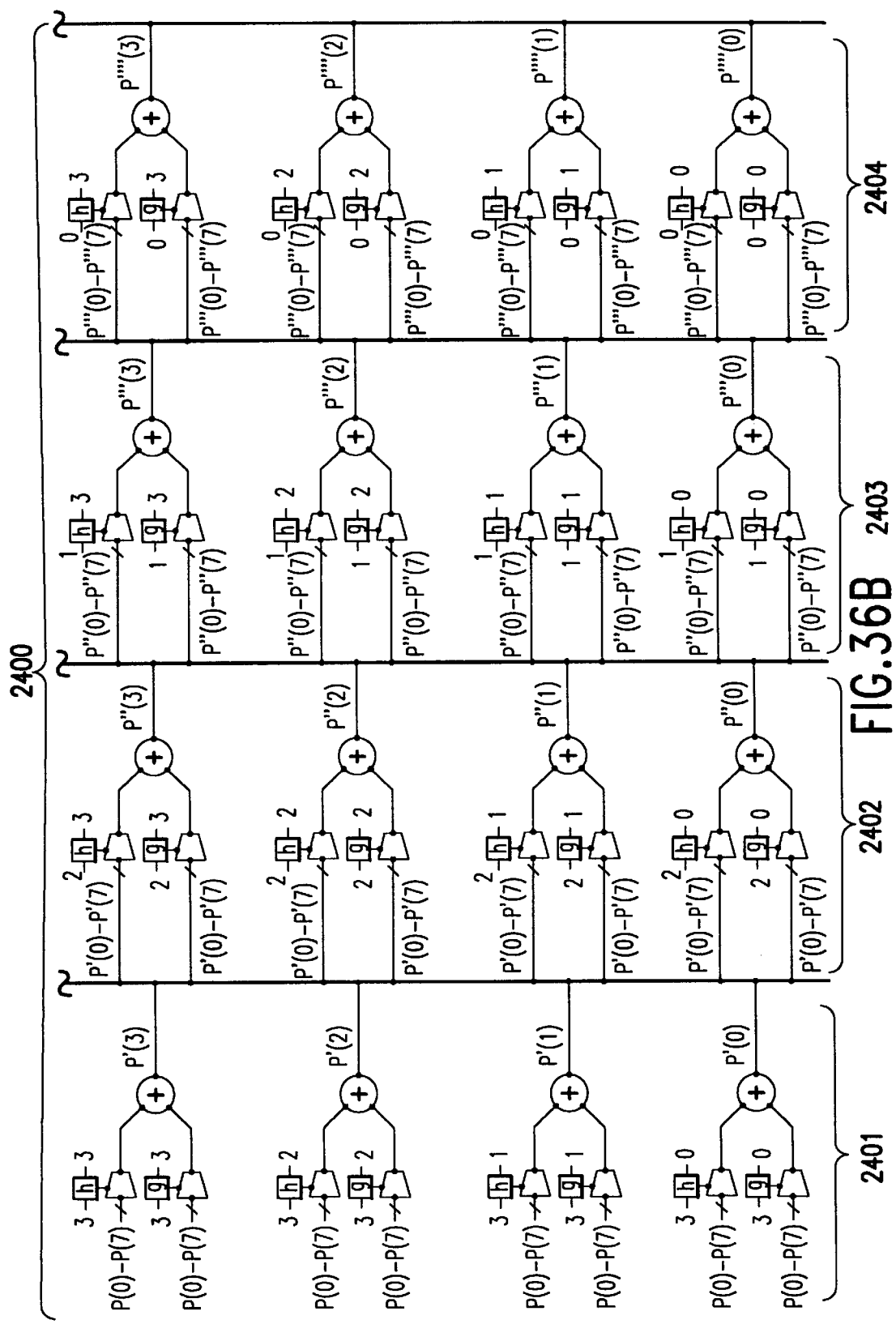

Shown in FIGS. 36a and 36b is a hardware implementation of a non-symmetric tetrahedral interpolator 2400 for conversion of input color space values 10 to a component of output color space values 11. This same hardware could be used repeatitively for an additional (D−1) passes to generate the remaining D−1 components of the output color space value 11. Or, there could be an additional (D−1) replications of part of the hardware implementation shown in FIGS. 36a and 36b to generate each of D components simultaneously. The hardware used for generating multiplexer control inputs could be used for each of the D replications. The non-symmetric tetrahedral interpolator 2400 shown in FIGS. 36a and 36b corresponds to d=3 and n=4, where n equals the greatest of $n_1, n_2, n_3, \ldots n_d$, for the input color space value 10. The hardware implementation shown in FIGS. 36a and 36b implements equations 25 and 26 and the equations of table 5 for the generation of the sub-cube vertex values. The non-symmetric tetrahedral interpolator 2400 of FIG. 36a and 36b is formed from a first, second, third, and fourth stage 2401–2404. Each of the four stages 2401–2404 includes $2^3$ adders, one of which is labeled as 2405. Each of the four stages 1901–1904 further includes $2 \times 2^3$ multiplexers, one of which is labeled as 2406. The multiplexers for each stage are arranged into $2^3$ pairs. Finally, each of the four stages 2401–2404 includes $2^3$ control input computation blocks for computing g(N,i) and $2^3$ control input computation blocks for computing h(N,i). One of the control input computation blocks for computing g(N,i) is labeled as 2407 and one of the control input computation blocks for computing h(N,i) is labeled as 2408.

Each of stages 2401–2404 performs an iteration of interpolation. Some interpolation applications may require that only a single iteration of interpolation be performed. For a single iteration of interpolation n=1. This corresponds to a hardware implementation of non-symmetric tetrahedral interpolator 2400 using only first stage 2401. An additional stage would be added for each additional iteration of interpolation required for the particular application.

Each of the inputs of the multiplexers in the first stage 2401 are connected to the eight vertex values selected using higher order bits 10a. The outputs of each pair of multiplexers in stages 2401–2404 are connected to, respectively, the first and second inputs of the corresponding adder. The output of each of the adders of the first stage 1901 is a vertex value of the first sub-cube. As previously mentioned, the division by 2 for each iteration of sub-cube generation is deferred until the last sub-cube is generated. The vertex values of the last sub-cube generated are divided by $2^n$ (not shown in FIGS. 36a and 36b), where n corresponds to the number of stages in the non-symmetric tetrahedral interpolator. The inputs of each multiplexer for the second, third, and fourth stages 2402–2404 are coupled to the outputs of the adders of the previous stage.

The control input of each multiplexer is connected to the output of the corresponding control input computation block. The multiplexers used in the non-symmetric tetrahedral interpolator 2400 have the capability to select one of eight, eight bit values using a three bit control input. For this d=3 implementation of non-symmetric tetrahedral interpolator 2400, each of the inputs to the control input computation blocks is a 3 bit quantity. The output of each of the control input computation blocks is a 3 bit quantity. The adders associated with each multiplexer performs an addition of the selected eight bit values from each of the multiplexers.

Interpolation is performed by supplying the vertex values selected using higher order bits 10a to the multiplexer inputs of the first stage 2401. The inputs to the control input computation blocks are hardwired. The non-symmetric tetrahedral interpolator 2400 computes the vertex values for four iterations of sub-cube generation. The values P''''(7) through P''''(0) are the values of the vertices of the fourth sub-cube generated. In this embodiment, P''''(0) is selected, divided by 16, and used as the result of the interpolation. The division by 16 is implemented by shifting bits and is not represented in FIGS. 36a and 36b.

One of ordinary skill in the art will recognize that one of the other computed values P''''(7) through P''''(1) may be selected, divided by 16, and used as the result of the interpolation. Using values corresponding to different vertices of the final sub-cube to generate the interpolation result will bias the result of the interpolation differently. This is a consideration in selecting which vertex value of the final sub-cube generated will be divided by 16 to generate the result of the interpolation.

A common hardware implementation of non-symmetric radial interpolation and non-symmetric pruned tetrahedral interpolation is possible. As can be seen from the diagrammatic representations of the non-symmetric radial interpolation and the non-symmetric pruned tetrahedral interpolation in FIG. 25 and FIG. 31, respectively, a common hardware implementation could be accomplished by multiplexing the indices used to access the input vertex values. Included in FIG. 47 is a listing of the VHDL code which can generate a common hardware implementation of non-symmetric radial and non-symmetric pruned tetrahedral interpolation.

Figure 37A:
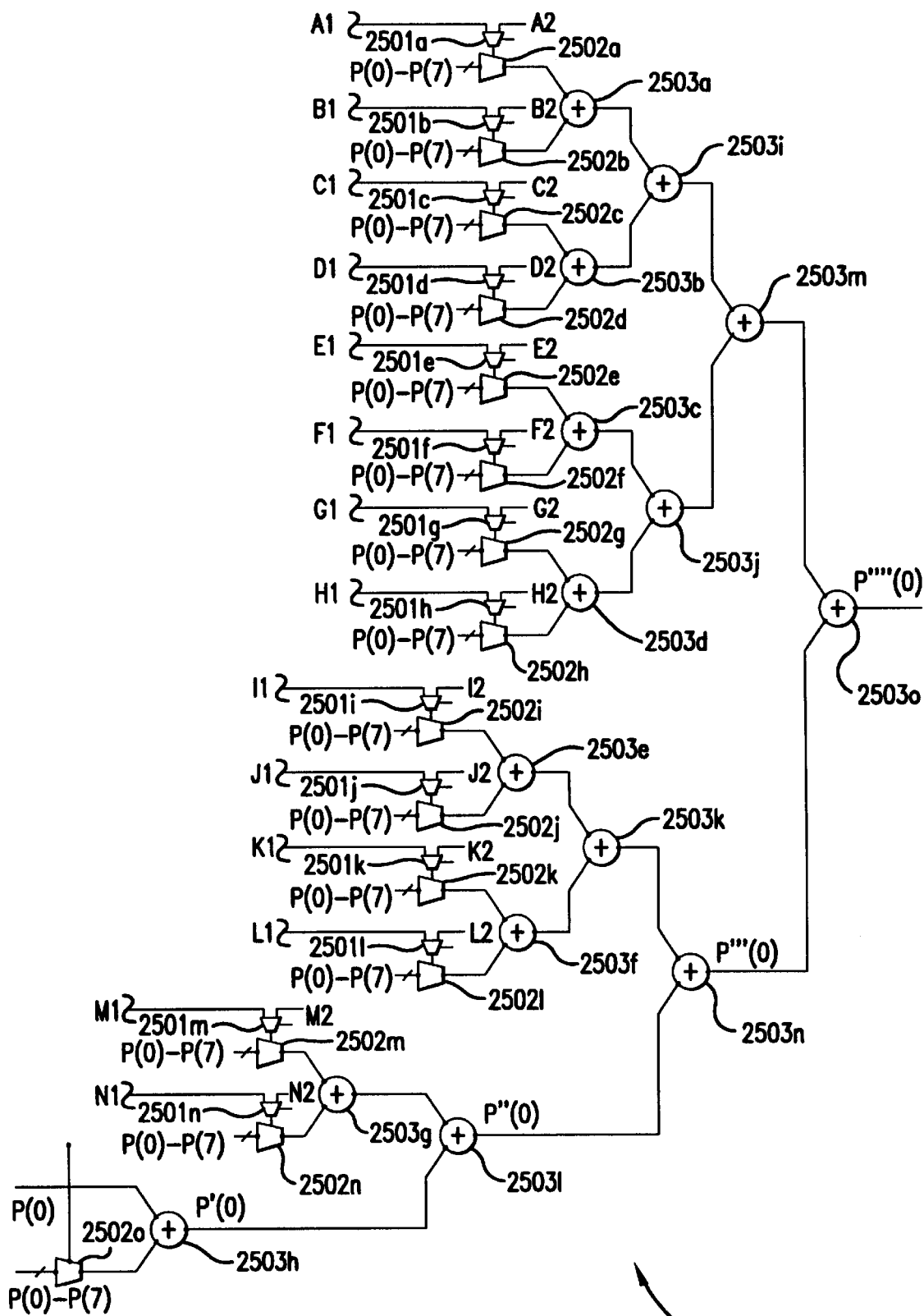
FIGS. 37a, 37b, and 37c show a hardware implementation of a common non-symmetric pruned radial and non-symmetric pruned tetrahedral interpolator.
Figure 37B:
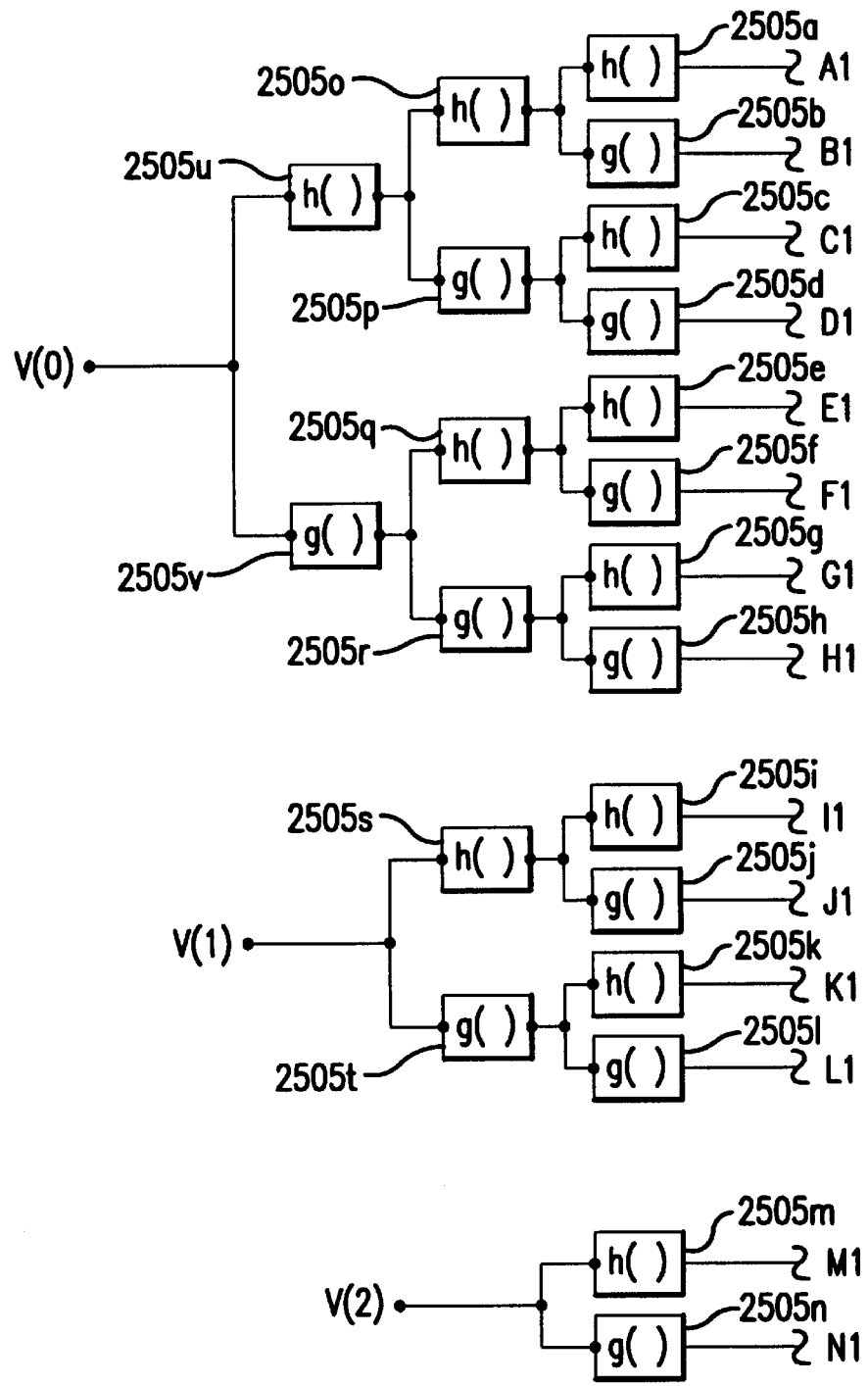
Figure 37C:
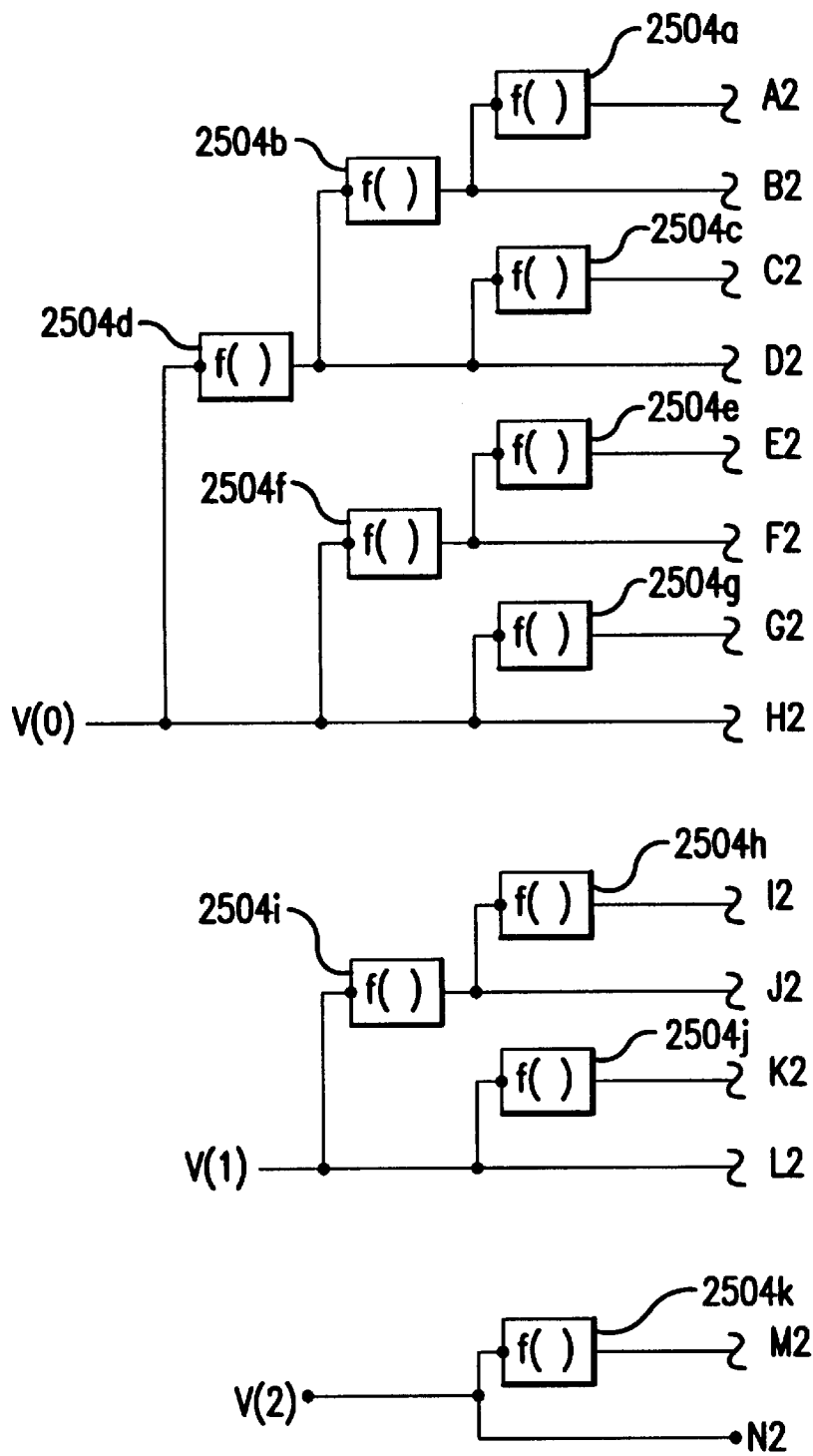

Shown in FIGS. 37a, 37b, and 37c is a hardware implementation of a common non-symmetric pruned radial and non-symmetric pruned tetrahedral interpolator 2500. The hardware implementation of common non-symmetric pruned radial and non-symmetric pruned tetrahedral interpolation incorporates the control input computation blocks of the non-symmetric pruned radial 1700 and non-symmetric pruned tetrahedral 2200 interpolators. Multiplexers 2501a–2501n are used to select data to the control inputs of multiplexers 2502a–2502n. A single bit is used to control the selection of the data at the inputs of multiplexers 2501a–2501n. The single bit controls whether the multiplexer control inputs to multiplexers 2502a–2502n are for non-symmetric pruned tetrahedral interpolation or for non-symmetric pruned radial interpolation. The multiplexer control input for multiplexers 2502a–2502n determines which of the interpolation data values are coupled to the adders. With the bit in the first of its two states, the hardware of FIGS. 37a, 37b, and 37c performs as a non-symmetric pruned radial interpolator. With the bit in the second of its two states, the hardware of FIGS. 37a, 37b, and 37c performs as a non-symmetric pruned tetrahedral interpolator. Adders 2503a–2503o sum the outputs of multiplexers 2502a–2502o. By shifting bits, the resulting sum is divided by 16 (not shown in FIG. 22) to generate the result. Control input computation blocks 2504a–2504k implement equations 14–19 and control input computation blocks 2505a–2505v implement equations 25 and 26.

The hardware of FIGS. 37a, 37b, and 37c could be used repetitively for an additional (D–1) passes to generate the remaining D–1 components of the output color space value 11. Or, there could be an additional (D–1) replications of part of the hardware implementation shown in FIGS. 37a, 37b, and 37c to generate each of D components simultaneously. The hardware used for generating multiplexer control inputs could be used for each of the D replications. The common non-symmetric pruned radial and non-symmetric pruned tetrahedral interpolator 2500 shown in FIGS. 37a, 37b, and 37c corresponds to d=3 and n=4 for the input color space value 10.

It should be recognized that for each of the disclosed hardware embodiments of interpolators, computations are required to supply the multiplexer control inputs. These computations may be implemented in dedicated hardware or performed using a microprocessor under software control. Using a microprocessor to compute the multiplexer control inputs results in a hardware savings at the expense of increasing the time required to perform the multiplexer control input computations.

Although several embodiments of the inventions have been illustrated, and their forms described, it is readily apparent to those of ordinary skill in the art that various modifications may be made therein without departing from the spirit of the invention or from the scope of the appended claims.

What is claimed is:

1. A common non-symmetric pruned radial and non-symmetric pruned tetrahedral interpolator for interpolating between interpolation data values using input data values each having d components to generate output data values, said d components represented, correspondingly, by d sets of bits each partitioned to form d sets of lower order bits each having, respectively, $n_1$, $n_2$, $n_3$, ... $n_d$ of said bits, said common non-symmetric pruned radial and non-symmetric pruned tetrahedral interpolator comprising:

a first set of $2^n-1$ multiplexers each configured for receiving one of a first set of control inputs and having a multiplexer output where n equals the greatest of said $n_1, n_2, n_3, \ldots n_d$, each of said multiplexers of said first set for selecting from said interpolation data values responsive to said one of said first set of control inputs;

a second set of $2^n-2$ multiplexers each having a multiplexer output, each of said multiplexer output of said second set coupled to one of said multiplexers of said first set of multiplexers, said second set of multiplexers to supply $2^n-2$ of said first set of control inputs by each of said second set of multiplexers selecting between one of a first set of values and one of a second set of values, responsive to one of a second set of control inputs, where determining said first set of values includes using a first function and determining said second set of values includes using a second function and a third function; and a means for adding configured for receiving said multiplexer output of said first set of multiplexers.

2. The common non-symmetric pruned radial and non-symmetric pruned tetrahedral interpolator as recited in claim 1, further comprising:

a first set of $2^n n-1$ control input computation blocks with each of said control input computation blocks of said first set coupled to one of said multiplexers of said second set, said first set of control input computation blocks for using said first function to generate $2^n-n-1$ of said first set of values; and a second set of $2^n-2$ control input computation blocks with each of said control input computation blocks of said second set coupled to one of said multiplexers of said second set, said second set of control input computation blocks for using said second function and said third function to generate said second set of values.

3. The common non-symmetric pruned radial and non-symmetric pruned tetrahedral interpolator as recited in claim 2, wherein:

each of said multiplexers of said first set includes $2^d$ of multiplexer inputs for receiving $2^d$ of said interpolation data values;

each of said multiplexers of said second set includes a first multiplexer input and a second multiplexer input configured for receiving, respectively, said one of said first set of values and said one of said second set of values; and each of said multiplexers of said second set includes a configuration for using said one of said second set of control inputs to select between performing non-symmetric pruned radial interpolation and non-symmetric pruned tetrahedral interpolation.

4. The common non-symmetric pruned radial and non-symmetric pruned tetrahedral interpolator as recited in claim 3, wherein:

$1b_1, 1b_2, 1b_3, \ldots, 1b_d$ designate said d sets of lower order bits with a bit position of each bit of said d sets of lower order bits designated from a most significant of said lower order bits to a least significant of said lower order bits by corresponding values of $i_1, i_2, i_3 \ldots i_d$ each ranging, correspondingly, from $n_1-1$ to 0, $n_2-1$ to 0, $n_3-1$ to 0, $\ldots n_d-1$ to 0;

computation of said second set of values includes using $g(N, i)=(v(i)|\sim m(i))$ & N and $h(N,i)=v(i)|N$ for, respectively, said second function and said third function where $m(i)=2^{d-1}\times Mask_1(i)+2^{d-2}\times Mask_2(i)+2^{d-3}\times Mask_3(i)+ \ldots +2^{d-d}\times Mask_d(i)$, each of $Mask_j=2^{d-2}\times Mask_2(i)+2^{d-3}\times Mask_3(i)+ \ldots +2^{d-d}\times Mask_d(i)$, each of $Mask_j=2^k-1$ for one value k selected from said $n_1, n_2, n_3, \ldots n_d$ and for j ranging from 1 to d, $v(i)=m(i)$ & $(2^{d-1}\times 1b_1(i)+2^{d-2}\times 1b_2(i)+2^{d-3}\times 1b_3(i)+ \ldots +2^{d-d}\times 1b_d(i))$ for values of i ranging from n-1 to 0, and where N includes values ranging from 1 to $2^d$;

computation of $2^n-n-1$ of said first set of values includes using $f(N, i)=v(i)|(N \& \sim m(i))$ for said first function; and computation of n-1 of said first set of values includes using v(i) for said values of i ranging from n-2 to 0; and computation of one of said first set of control inputs includes using v(i) for one of said values of i equal to n-1.

5. The common non-symmetric pruned radial and non-symmetric pruned tetrahedral interpolator as recited in claim 4, wherein:

said means for adding includes $2^n-1$ adders each having a first input, a second input, and an output;

$2^{n-1}$ of said adders each have said first input and said second input coupled to one of said multiplexer output of said first set of multiplexers;

said first input of one of said adders includes a configuration for receiving one of said interpolation data values selected using d sets of higher order bits partitioned from said d sets of bits and having said second input coupled to one of said multiplexer output of said first set of multiplexers; and $2^n-(2^{n-1}+1)$ of said adders each have said first input and said second input coupled to said output of another of said adders.

6. The common non-symmetric pruned radial and non-symmetric pruned tetrahedral interpolator as recited in claim 5, wherein:

each of said interpolation data values includes D interpolation data value components; and each of said D interpolation data value components corresponds to a dimension of an output color space and each of said d components of said input data values corresponds to a dimension of an input color space.

7. The common non-symmetric pruned radial and non-symmetric pruned tetrahedral interpolator as recited in claim 6, wherein:

a printing device includes said common non-symmetric pruned radial and non-symmetric pruned tetrahedral interpolator for performing a color space conversion.

8. The common non-symmetric pruned radial and non-symmetric pruned tetrahedral interpolator as recited in claim 7, wherein:

D equals 3, d equals 3, and n equals 4, said output color space includes a color space selected from the group consisting of a RGB, a Lab, a XYZ, a HSV, a Luv, a HLS, and a CMY color space and said input color space includes a color space selected from the group consisting of a RGB, a Lab, a XYZ, a HSV, a Luv, a HLS, and a CMY color space.

9. The common non-symmetric pruned radial and non-symmetric pruned tetrahedral interpolator as recited in claim 7, wherein:

D equals 4, d equals 3, and n equals 4, said output color space includes a CMYK color space and said input color space includes a color space selected from the group consisting of a RGB, a Lab, a XYZ, a HSV, a Luv, a HLS, and a CMY color space.

10. A common non-symmetric pruned radial and non-symmetric pruned tetrahedral interpolator for interpolating between interpolation data values using input data values each having three components to generate output data values, said components represented by three sets of bits each partitioned to form three sets of lower order bits, each having, respectively, $n_1$, $n_2$, $n_3$ of said bits, and three sets of higher order bits, said common non-symmetric pruned radial and non-symmetric pruned tetrahedral interpolator comprising:

- a first multiplexer having a first multiplexer output and configured for receiving a first control input and said interpolation data values, said first multiplexer for selecting from said interpolation data values responsive to said first control input;
- a second multiplexer having a second multiplexer output and configured for receiving a second control input and said interpolation data values, said second multiplexer for selecting from said interpolation data values responsive to said second control input;
- a third multiplexer having a third multiplexer output and configured for receiving a third control input and said interpolation data values, said third multiplexer for selecting from said interpolation data values responsive to said third control input;
- a fourth multiplexer having a fourth multiplexer output coupled to said second multiplexer to supply said second control input, said fourth multiplexer for selecting from a first value determined from a first function and a second value determined from a second function and a third function;
- a fifth multiplexer having a fifth multiplexer output coupled to said third multiplexer to supply said third control input, said fifth multiplexer for selecting from a third value determined from said first function and a fourth value determined from said second function and said third function; and
- a means for adding coupled to said first, said second, and said third multiplexer output and configured for receiving one of said interpolation data values determined from said three sets of higher order bits.

11. The common non-symmetric pruned radial and non-symmetric pruned tetrahedral interpolator as recited in claim 10, further comprising:
- a first control input computation block for generating said first value and coupled to said fourth multiplexer;
- a second control input computation block for generating said second value and coupled to said fourth multiplexer;
- a third control input computation block for generating said third value and coupled to said fifth multiplexer; and
- a fourth control input computation block for generating said fourth value and coupled to said fifth multiplexer.

12. The common non-symmetric pruned radial and non-symmetric pruned tetrahedral interpolator as recited in claim 11, wherein:
said means for adding includes a first, a second, and a third adder each having a first input, a second input, and an output, said first input of said first adder coupled to said first multiplexer output, said second input of said first adder arranged for receiving said one of said interpolation data values determined from said three sets of higher order bits, said first input of said second adder coupled to said second multiplexer output, said second input of said second adder coupled to said third multiplexer output, said first and said second input of said third adder coupled to, respectively, said output of said first adder and said output of said second adder.

13. The common non-symmetric pruned radial and non-symmetric pruned tetrahedral interpolator as recited in claim 12, wherein:

$1b_1$, $1b_2$, $1b_3$ designate said three sets of lower order bits with a bit position of each bit of said d sets of lower order bits designated from a most significant of said lower order bits to a least significant of said lower order bits by corresponding values of $i_1$, $i_2$, $i_3$ each ranging, correspondingly, from $n_1-1$ to 0, $n_2-1$ to 0, $n_3-1$ to 0;

computation of said first value includes using v(i) for a value of i equal to 2, where $v(i)=m(i)$ & $(2^2 \times 1b_1(i) + 2^1 \times 1b_2(i) + 2^0 \times 1b_3(i))$, where $m(i)=2^2 \times Mask_1(i) + 2^1 \times Mask_2(i) + 2^0 \times Mask_3(i)$ with each of $Mask_j=2^k-1$ for one value of k selected from said $n_1$, $n_2$, $n_3$ and for j ranging from 1 to 3;

computation of said second value includes using $g(N, i) = (v(i)|\sim m(i))$ & N for said second function with a value of N equal to 3 and said value of i equal to 2;

computation of said third value includes using $f(N, i) = v(i)|(N$ & $\sim m(i))$ for said first function with said value of N equal to 3 and said value of i equal to 2; and computation of said fourth value includes using $h(N, i) = v(i)|N$ for said third function with said value of N equal to 3 and said value of i equal to 2.

14. The common non-symmetric pruned radial and non-symmetric pruned tetrahedral interpolator as recited in claim 13, wherein:

eight interpolation data values selected using said three sets of higher order bits form said interpolation data values received by each of said first, said second, and said third multiplexers.

15. The common non-symmetric pruned radial and non-symmetric pruned tetrahedral interpolator as recited in claim 14, wherein:

each of said interpolation data values includes D interpolation data value components; and each of said D interpolation data value components corresponds to a dimension of an output color space and each of said three components of said input data values corresponds to a dimension of an input color space.

16. The common non-symmetric pruned radial and non-symmetric pruned tetrahedral interpolator as recited in claim 15, wherein:

a printing device includes said common non-symmetric pruned radial and non-symmetric pruned tetrahedral interpolator for performing a color space conversion.

17. The common non-symmetric pruned radial and non-symmetric pruned tetrahedral interpolator as recited in claim 16, wherein:

D equals 3 and said output color space includes a color space selected from the group consisting of a RGB, a Lab, a XYZ, a HSV, a Luv, a HLS, and a CMY color space and said input color space includes a color space selected from the group consisting of a RGB, a Lab, a XYZ, a HSV, a Luv, a HLS, and a CMY color space.

18. The common non-symmetric pruned radial and non-symmetric pruned tetrahedral interpolator as recited in claim 16, wherein:

D equals 4 and said output color space includes a CMYK color space and said input color space includes a color space selected from the group consisting of a RGB, a Lab, a XYZ, a HSV, a Luv, a HLS, and a CMY color space.

* * * * *